United States Patent
Ito

(10) Patent No.: US 8,432,581 B2
(45) Date of Patent: Apr. 30, 2013

(54) IMAGE PROCESSING APPARATUS AND METHOD

(75) Inventor: Yasuhiro Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/556,055

(22) Filed: Sep. 9, 2009

(65) Prior Publication Data

US 2010/0060957 A1 Mar. 11, 2010

(30) Foreign Application Priority Data

Sep. 10, 2008 (JP) .................................. 2008-232397

(51) Int. Cl.
*H04N 1/405* (2006.01)
*H04N 1/46* (2006.01)
*H04N 1/60* (2006.01)
*H04N 1/40* (2006.01)
*H04N 5/228* (2006.01)
*B41J 29/38* (2006.01)

(52) U.S. Cl.
USPC ............ 358/3.06; 358/505; 358/2.1; 358/1.9; 347/9; 347/16; 348/222.1

(58) Field of Classification Search .................. 358/505, 358/2.1, 3.06, 1.9; 347/9, 16; 348/222.1
See application file for complete search history.

(56) References Cited

U.S. PATENT DOCUMENTS

| | | | |
|---|---|---|---|
| 6,307,645 B1 * | 10/2001 | Mantell et al. | 358/1.9 |
| 6,511,143 B1 | 1/2003 | Ishikawa | |
| 2006/0082831 A1 * | 4/2006 | Gotoh et al. | 358/3.06 |
| 2006/0274374 A1 * | 12/2006 | Murakami | 358/3.03 |
| 2011/0181897 A1 * | 7/2011 | Noguchi et al. | 358/1.9 |

FOREIGN PATENT DOCUMENTS

| | | |
|---|---|---|
| JP | 11-254663 A | 9/1999 |
| JP | 2005-169940 A | 6/2005 |
| JP | 2008-188805 A | 8/2008 |

* cited by examiner

*Primary Examiner* — Charlotte M Baker
*Assistant Examiner* — Rury Grisham
(74) *Attorney, Agent, or Firm* — Canon USA, Inc., I.P. Division

(57) ABSTRACT

An image processing apparatus controls a formation of dots in a recording element configured to perform scanning on a sheet-like recording medium to form dots of different colors on a surface of the recording medium. The image processing apparatus makes a constraint according to cyan and magenta constraint information applied to a same scanning operation stronger than a constraint according to cyan and magenta constraint information applied to mutually adjacent scanning operations.

8 Claims, 46 Drawing Sheets

| 0.08 | 0.12 | 0.08 |
|---|---|---|
| 0.12 | 0.20 | 0.12 |
| 0.08 | 0.12 | 0.08 |

2001

F_m
σx(0.1) = 1.0
σy(0.1) = 1.0

IF t ≥ 0.1

| 0.004 | 0.012 | 0.021 | 0.012 | 0.004 |
|---|---|---|---|---|
| 0.012 | 0.054 | 0.091 | 0.054 | 0.012 |
| 0.021 | 0.091 | 0.222 | 0.091 | 0.021 |
| 0.012 | 0.054 | 0.091 | 0.054 | 0.012 |
| 0.004 | 0.012 | 0.021 | 0.012 | 0.004 |

| 0.08 | 0.12 | 0.08 |
|---|---|---|
| 0.12 | 0.20 | 0.12 |
| 0.08 | 0.12 | 0.08 |

2002

LPF_b
σx(0.1) = 1.0
σy(0.1) = 1.0

IF t ≥ 0.1

| 0.004 | 0.012 | 0.021 | 0.012 | 0.004 |
|---|---|---|---|---|
| 0.012 | 0.054 | 0.091 | 0.054 | 0.012 |
| 0.021 | 0.091 | 0.222 | 0.091 | 0.021 |
| 0.012 | 0.054 | 0.091 | 0.054 | 0.012 |
| 0.004 | 0.012 | 0.021 | 0.012 | 0.004 |

2004

LPF_b
σx(1) = 2.0
σy(1) = 2.0

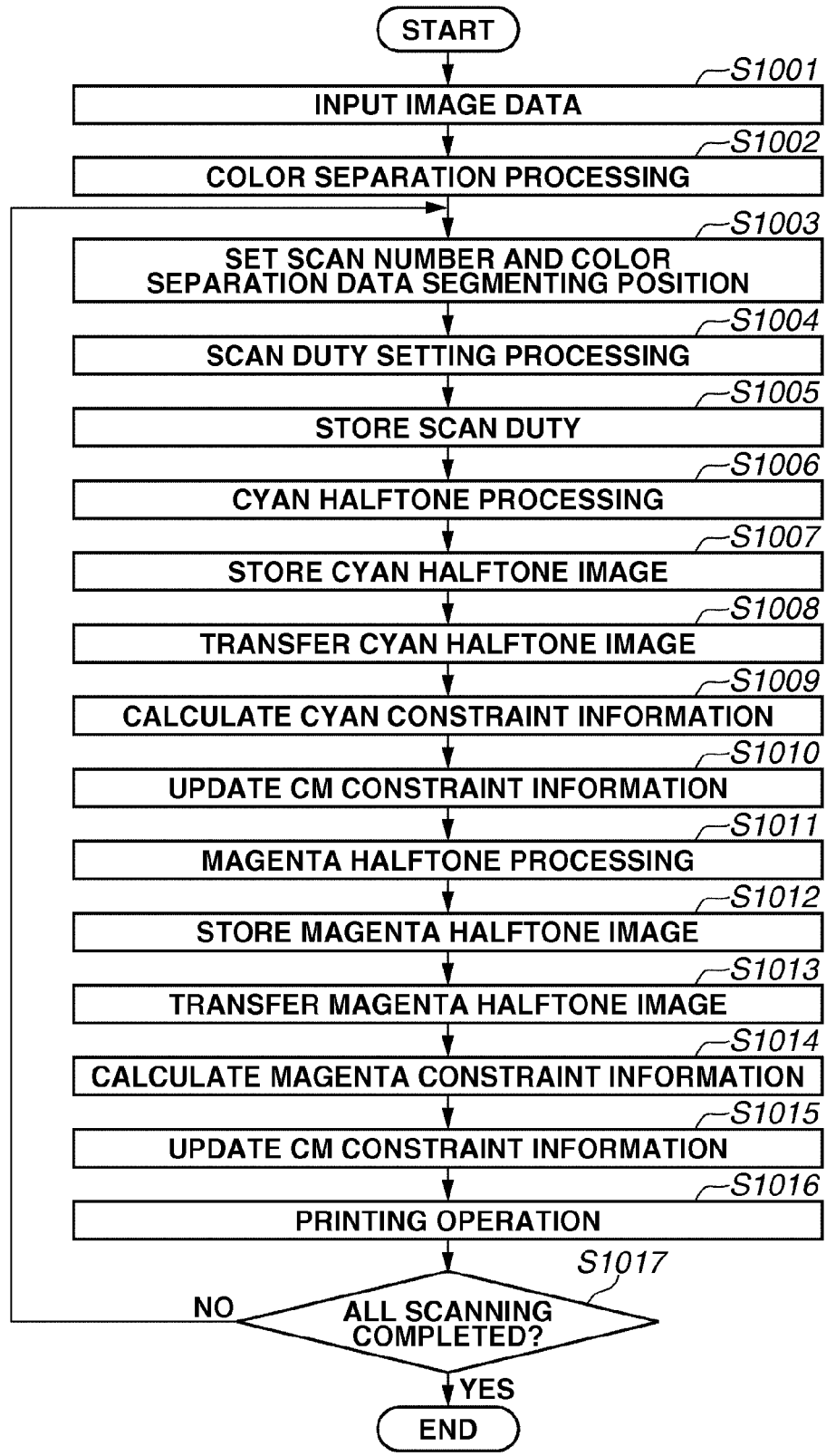

IMAGE PROCESSING APPARATUS AND METHOD

BACKGROUND OF THE INVENTION

1. Field of the Invention

The present invention relates to dot formation control for a recording element that performs scanning on a sheet-like recording medium to form dots of different colors on a surface of the recording medium.

2. Description of the Related Art

To improve recording performances including recording speed, an inkjet type recording apparatus includes a nozzle group of a plurality of ink discharge ports (nozzles) assembled in a predetermined pattern and capable of discharging an ink droplet of a predetermined color at a predetermined density. Further, to improve image quality, an inkjet type recording apparatus may include a nozzle group capable of changing the density of ink to be discharged from respective nozzles. Furthermore, another inkjet type recording apparatus may include a nozzle group capable of changing in a stepwise fashion an amount of ink of a predetermined color discharged from respective nozzles at a predetermined density.

An error diffusion method is known as a quantization processing method for converting multi-valued input image data into a binary image (or an N-value image: N is a gradation number equal to or greater than 2 and smaller than a gradation number of the input image data) to control dots to be recorded by a recording apparatus. The error diffusion method includes diffusing a quantization error caused in a target pixel to a plurality of pixels surrounding the target pixel to realize a pseudo-gradational expression.

As a method different from the error diffusion method, a dither method is usable to convert multi-valued input image data into a binary (or N-value) image. The dither method includes quantizing a multi-valued input data by comparing the input data with a threshold matrix prepared beforehand to realize a pseudo-gradational expression. The dither method is simple in processing compared to the error diffusion method. Therefore, the dither method can realize speedy processing.

As discussed in U.S. Pat. No. 6,511,143, when an image quantized by the above-described error diffusion method or the dither method is actually formed on a recording medium, it is useful to determine an image formation order and a dot layout. The above-described conventional technique can eliminate deterioration in image quality (e.g., unevenness in density) by applying the error diffusion method in each scanning, even in a case where registration in each scanning is changed.

More specifically, a recording head performs main scanning operations two or more times in a predetermined main scanning recording area of a predetermined recording medium using different nozzle groups. In each main scanning operation, a binary (or N-value) image is formed using the error diffusion method. In a case where binary images are generated in this manner by performing the error diffusion method in each main scanning operation, dispersion of dots in the main scanning operation can be improved. Accordingly, granularity does not change even in a case where a physical registration (e.g., recording medium feeding amount, recording element position, etc.) is changed when the main scanning is performed plural times to form an image. Further, there is less correlation in dot layout between two or more scanning operations. Therefore, even when the registration is changed, variation in dot coverage rate relative to a recording medium surface can be reduced and also unevenness in density can be reduced.

However, according to the conventional technique, presence of a plurality of scanning directions (e.g., a forward path and a rearward path in a reciprocal printing) is not taken into consideration. Therefore, if a dot layout method is inappropriate, neighboring dots may be positioned very closely when the scanning operation is performed plural times in different directions (e.g., in the forward path and in the rearward path), bleeding of different color inks may occur.

SUMMARY OF THE INVENTION

Exemplary embodiments of the present invention are directed to an image processing apparatus that can appropriately dispose dots on a sheet-like recording medium.

According to an aspect of the present invention, an image processing apparatus controls a formation of dots in a recording element configured to perform scanning on a sheet-like recording medium to form dots of different colors on a surface of the recording medium. The image processing apparatus includes a constraint information generation unit configured to generate constraint information indicating a constraint for preventing the dots of different colors from being positioned mutually close individually for each color; and a dot pattern generation unit configured to perform N-valuing processing (N is an integer equal to or greater than 2) on input image data, based on the constraint information generated by the constraint information generation unit, to generate a dot pattern individually for each color for forming an image based on the image data on the surface of the recording medium. The constraint information generation unit generates the constraint information in such a way as to make the constraint applied to a same scanning operation performed by the recording element stronger than the constraint applied to mutually adjacent scanning operations performed by the recording element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIGS. 16A and 16B schematically illustrate an example of storage areas of a cumulative error line buffer.

FIGS. 21A and 21B illustrate examples of a two-dimensional Gaussian filter.

FIG. 46 illustrates an example of image forming processing that can be performed by an image processing apparatus.

DESCRIPTION OF THE EMBODIMENTS

Various exemplary embodiments, features, and aspects of the invention will be described in detail below with reference to the drawings.

Figure 1:
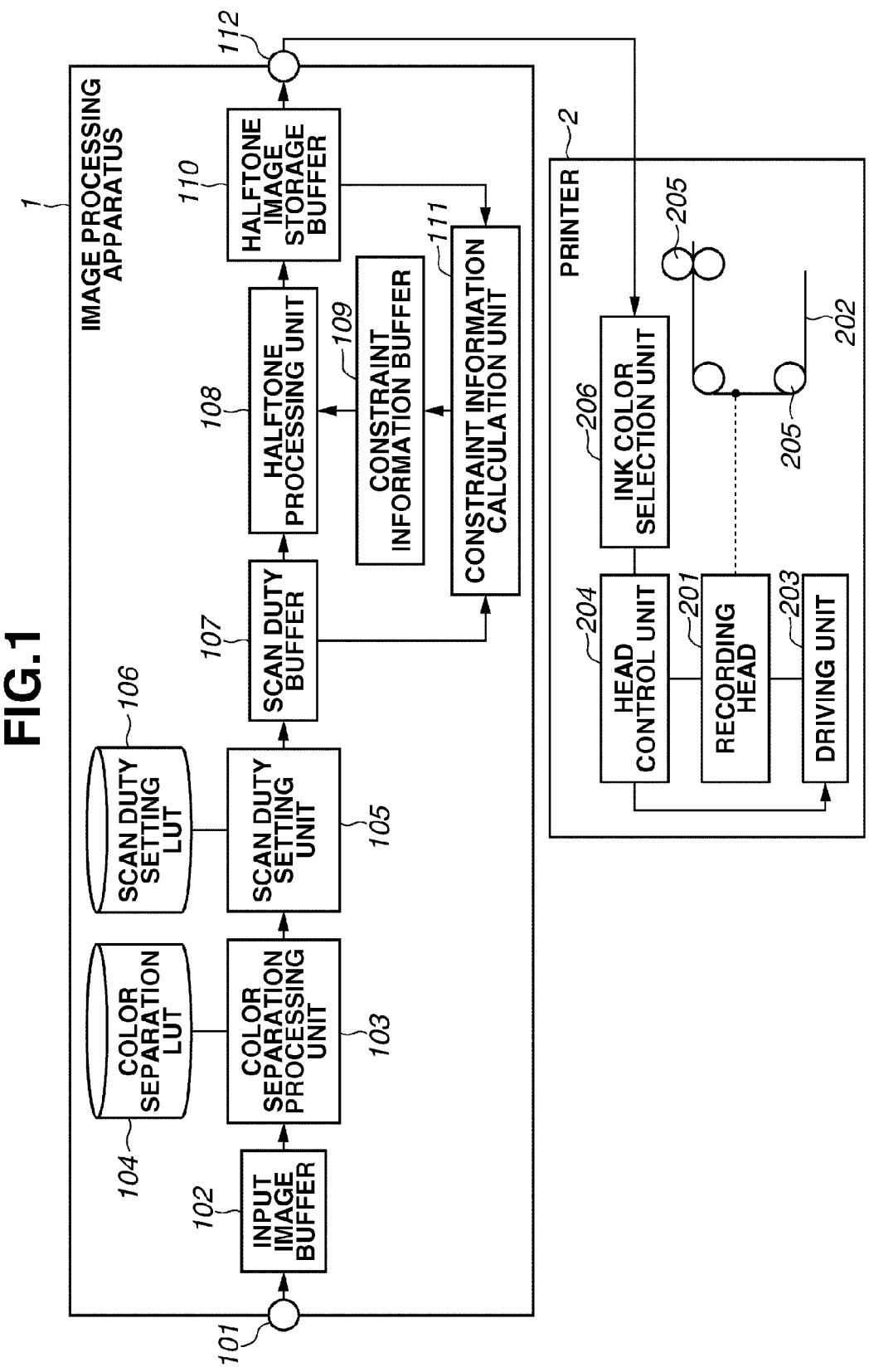
FIG. 1 is a block diagram illustrating an example of a configuration of an image forming system according to a first exemplary embodiment.

FIG. 1 is a block diagram illustrating an example of a configuration of an image forming system. In FIG. 1, an image processing apparatus 1 can be realized by a printer driver installed on a general personal computer. For example, when the printer driver is installed on a computer, the computer executes a program corresponding to each functional unit of the image processing apparatus 1. Alternatively, for example, a printer 2 may be configured to function as the image processing apparatus 1.

The image processing apparatus 1 inputs image data of an object to be printed via an image input terminal 101 and stores the input image data in an input image buffer 102. A color separation processing unit 103 can convert the input image data into ink colors of the printer 2 referring to a color separation look-up table (LUT) 104. A scan duty setting unit 105 can convert each ink color value converted by the color separation processing unit 103 into each ink color value for each scan referring to a scan duty setting LUT 106, and can store the converted value in a scan duty buffer 107. In the present exemplary embodiment, scan duty data indicates an amount of recording ink in each scanning. A halftone processing unit 108 can convert multi-valued data of each ink color for each scan obtained by the scan duty setting unit 105 into binary image data referring to constraint information stored in a constraint information buffer 109.

The constraint information stored in the constraint information buffer 109 indicates whether a dot is likely to be formed at an address of an image to be recorded. In the present exemplary embodiment, the constraint information buffer 109 can be commonly used for cyan (C) and magenta (M) colors. The image processing apparatus 1 includes another constraint information buffer that can be commonly used for yellow (Y) and black (K) colors. A halftone image storage buffer 110 can store binary image data of each ink color output from the halftone processing unit 108. A constraint information calculation unit 111 can update the constraint information based on the binary image data stored in the halftone image storage buffer 110 and the "multi-valued data of each ink color for each scan" stored in the scan duty buffer 107. The binary image data stored in the halftone image storage buffer 110 can be output via an image output terminal 112 to the printer 2.

The printer 2 performs printing on a recording medium 202 (e.g., a paper sheet) by moving a recording head 201 in vertical and horizontal directions relative to the recording medium 202 to form an image corresponding to the binary image data on the recording medium 202. A driving unit 203 can move the recording head 201 based on a control signal supplied from a head control unit 204. A transportation unit 205 can convey the recording medium 202 based on a control signal supplied from the head control unit 204. An ink color selection unit 206 can select an ink color from a plurality of color inks mounted on the recording head 201.

Figure 2:
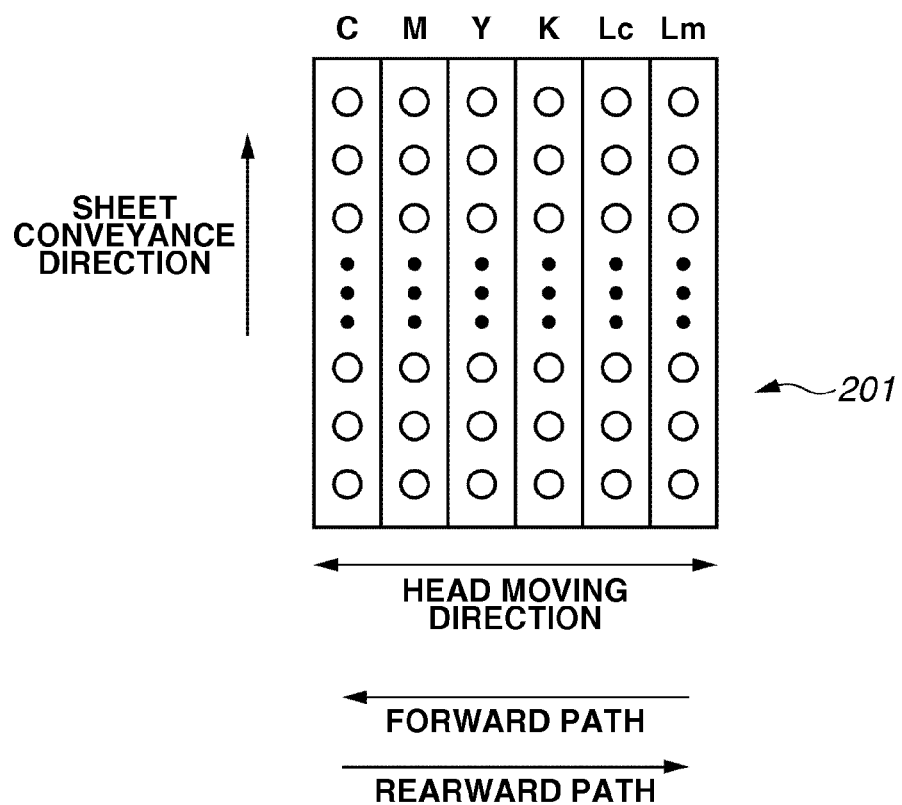
FIG. 2 illustrates an example of a configuration of a recording head.

FIG. 2 illustrates an example of a configuration of the recording head 201. In the present exemplary embodiment, the recording head 201 includes nozzles corresponding to six color inks including light cyan (Lc) and light magenta (Lm), which have relatively low ink densities, in addition to the above-described four color (e.g., C, M, Y, and K) inks.

The recording head 201 according to the present exemplary embodiment discharges ink droplets while moving forward and backward in a main scanning operation. More specifically, the printer 2 performs forward path printing and rearward path printing during a printing operation. When the printer 2 performs the forward path printing (i.e., forward path scanning), the recording head 201 moves from right to left while it discharges ink droplets. When the printer 2 performs the rearward path printing (i.e., rearward path scanning), the recording head 201 moves from left to right while it discharges ink droplets.

In the present exemplary embodiment, the nozzles of the recording head 201 are arrayed in the order of cyan, magenta, . . . , from the left in the main scanning direction. Therefore, when the printer 2 performs the forward path scanning, the recording head 201 discharges ink droplets in the order of cyan, magenta, . . . . On the other hand, when the printer 2 performs the rearward path scanning, the recording head 201 discharges ink droplets in the order of magenta, cyan, . . . (i.e., in the reversed order in the main scanning direction). In other words, halftone processing to be performed in the rearward path scanning is required to be reversed in order of colors to be processed compared to halftone processing to be performed in the forward path scanning.

To simplify the following description, FIG. 2 illustrates a row of same color nozzles disposed straight in a sheet conveyance direction. However, the total number and the layout of the nozzles can be arbitrarily changed. For example, the recording head 201 may include a row of nozzles of the same color but different in discharge amount, or may include a plurality of rows of nozzles having a same discharge amount, or may include nozzles disposed in a zigzag pattern.

Figure 3:
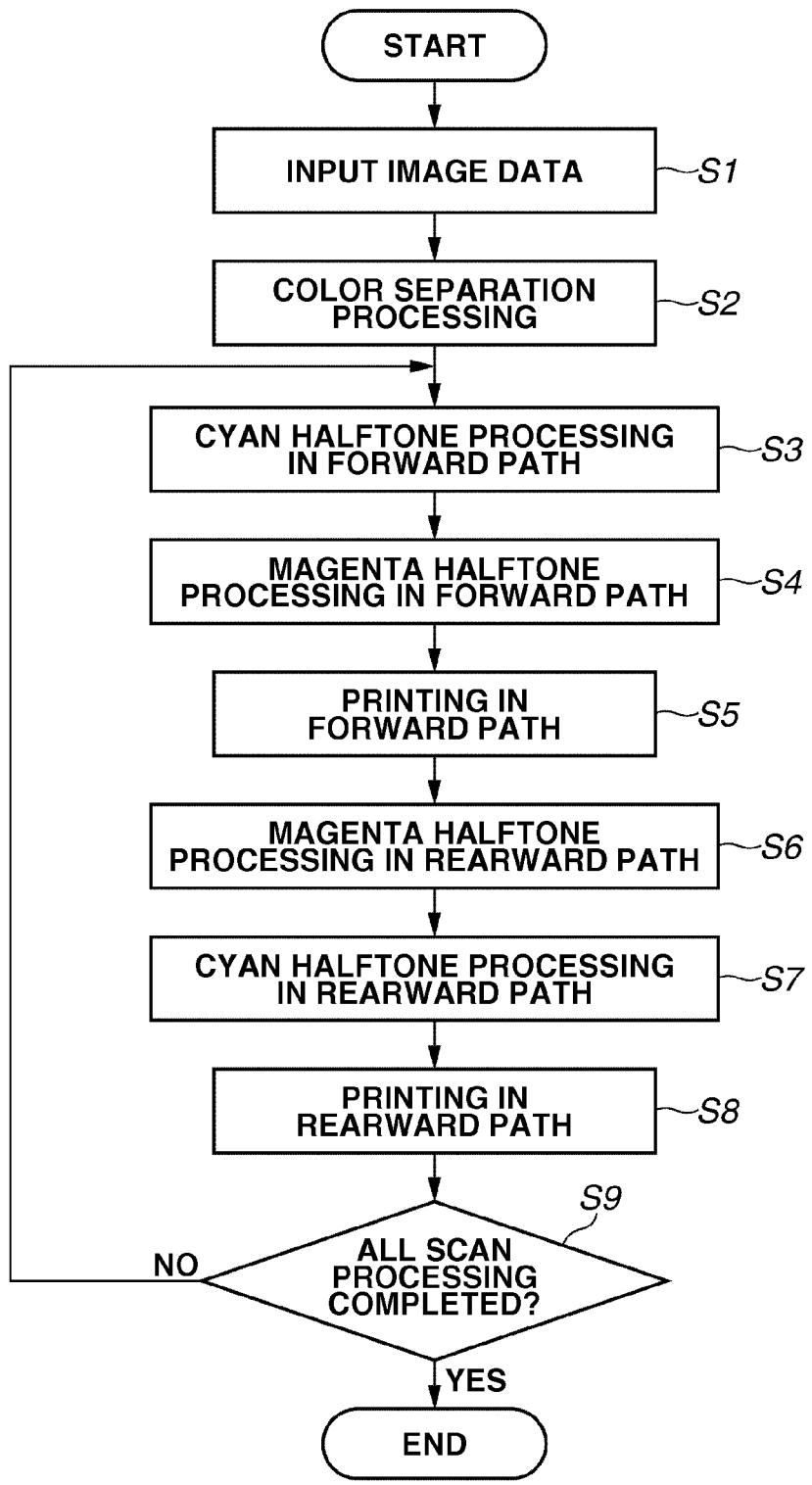
FIG. 3 is a flowchart illustrating an example of schematic image forming processing.

An example of image forming processing that can be performed by the image processing apparatus 1 is described below with reference to a flowchart illustrated in FIG. 3. In the following description, cyan and magenta print processing is chiefly explained referring to FIG. 3 and subsequent drawings, although the print processing according to the present exemplary embodiment can be equally applied to other colors.

In step S1, the image input terminal 101 inputs multi-gradational color image data and stores the inputs image data in the input image buffer 102.

In step S2, the color separation processing unit 103 converts the input color image data into ink colors referring to the color separation look-up table (LUT) 104.

In step S3, the scan duty setting unit 107 and the halftone processing unit 108 perform cyan halftone processing in the forward path scanning and determine dots to be printed in the forward path scanning. In step S4, the scan duty setting unit 107 and the halftone processing unit 108 perform magenta halftone processing in the forward path scanning based on the result of the cyan halftone processing in the forward path scanning, and determine dots to be printed in the forward path scanning.

In step S5, the printer 2 performs printing in the forward path based on the processing results in steps S3 and S4. In step S6, the scan duty setting unit 107 and the halftone processing unit 108 perform magenta halftone processing in the rearward path scanning and determine dots to be printed in the rearward path scanning. In step S7, the scan duty setting unit 107 and the halftone processing unit 108 perform cyan halftone processing in the rearward path scanning based on the result of the magenta halftone processing in the rearward path scanning, and determine dots to be printed in the rearward path scanning.

In step S8, the printer 2 performs printing in the rearward path referring to the processing results in steps S6 and S7. In step S9, the halftone processing unit 108 determines whether all scan processing is completed. If it is determined that all scan processing is completed (YES in step S9), then the printer 2 terminates the processing of the flowchart illustrated in FIG. 3. If it is determined that not all scan processing is completed (NO in step S9), the processing returns to step S3.

An example of the image forming processing that can be performed by the image processing apparatus 1 is described in more detail with reference to a flowchart illustrated in FIG. 4. The flowchart illustrated in FIG. 4 corresponds to details of the flowchart illustrated in FIG. 3.

First, in step S101, the image input terminal 101 inputs multi-gradational color image data and stores the input image data in the input image buffer 102. In the present exemplary embodiment, the input color image data include three color components of red (R), green (G), and blue (B). In step S102, the color separation processing unit 103 converts the multi-gradational RGB image data stored in the input image buffer 102 into 6-color (i.e., CMYK and LcLm) ink color data referring to the color separation LUT 104. In the present exemplary embodiment, the ink color data of each color is 8-bit data. However, the ink color data of each color may be converted into a gradation number exceeding 8 bits. The recording head 201 according to the present exemplary embodiment includes nozzles corresponding to the above-described six kinds of ink colors.

Figure 5:
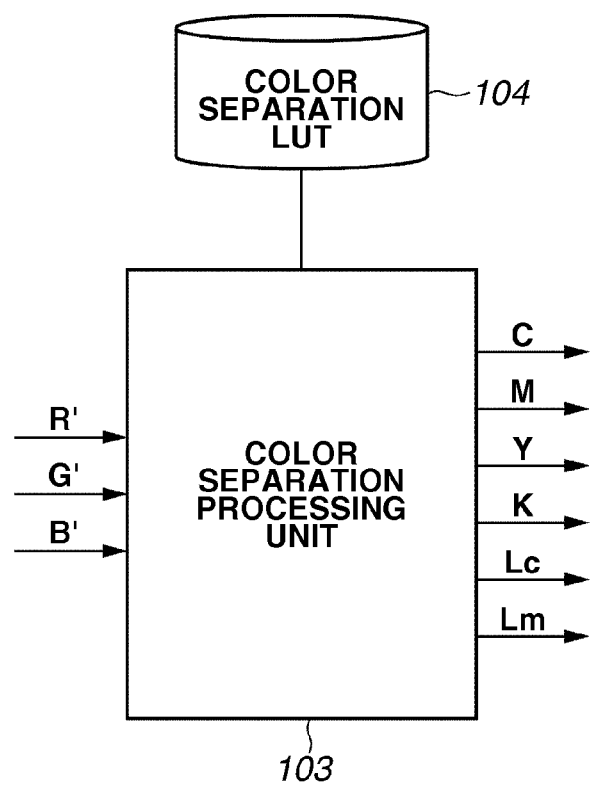
FIG. 5 illustrates an example of detailed image data input to a color separation processing unit and image data output from the color separation processing unit.

FIG. 5 illustrates an example of color separation processing according to the present exemplary embodiment. As illustrated in FIG. 5, the color separation processing unit 103 converts input color image data R', G', and B' into six image data of C, M, Y, K, Lc, and Lm according to the following formulae (1) to (6) referring to the color separation LUT 104.

$$C = C\_LUT\_3D(R', G', B') \quad (1)$$

$$K = M\_LUT\_3D(R', G', B') \quad (2)$$

$$Y = Y\_LUT\_3D(R', G', B') \quad (3)$$

$$K = K\_LUT\_3D(R', G', B') \quad (4)$$

$$Lc = Lc\_LUT\_3D(R', G', B') \quad (5)$$

$$Lm = Lm\_LUT\_3D(R', G', B') \quad (6)$$

Each defined function on the right side of respective formulas (1) to (6) corresponds to the content of the color separation LUT 104. The color separation processing unit 103 can refer to the color separation LUT 104 to obtain output values of respective ink colors corresponding to three input values red (R), green (G), and blue (B).

Referring back to FIG. 4, in step S103, the scan duty setting unit 105 sets a scan number k and a segmenting position Ycut(k) of the image data obtained in the color separation processing. In the following description, the image data obtained by the color separation processing may be referred to as color separated image data. The segmenting position Ycut (k) indicates a segmenting position of the color separated image data corresponding to the scan number k. The segmenting position Ycut(k) represents a Y-axis coordinate (i.e., coordinate in the vertical direction) and corresponds to the coordinate of the uppermost nozzle of the recording head 201. The scan number k takes 1 as an initial value and is incremented by one in each processing loop. In the present exemplary embodiment, the recording head 201 performs printing in both forward and rearward directions. In other words, the recording head 201 selectively performs forward path printing and rearward path printing depending on the scan number k. In the present exemplary embodiment, the recording head 201 performs the forward path printing and the rearward path printing depending on the scan number k in the following manner.

k=1, 3, 5, . . . forward path k=2, 4, 6, . . . rearward path

Figure 6:
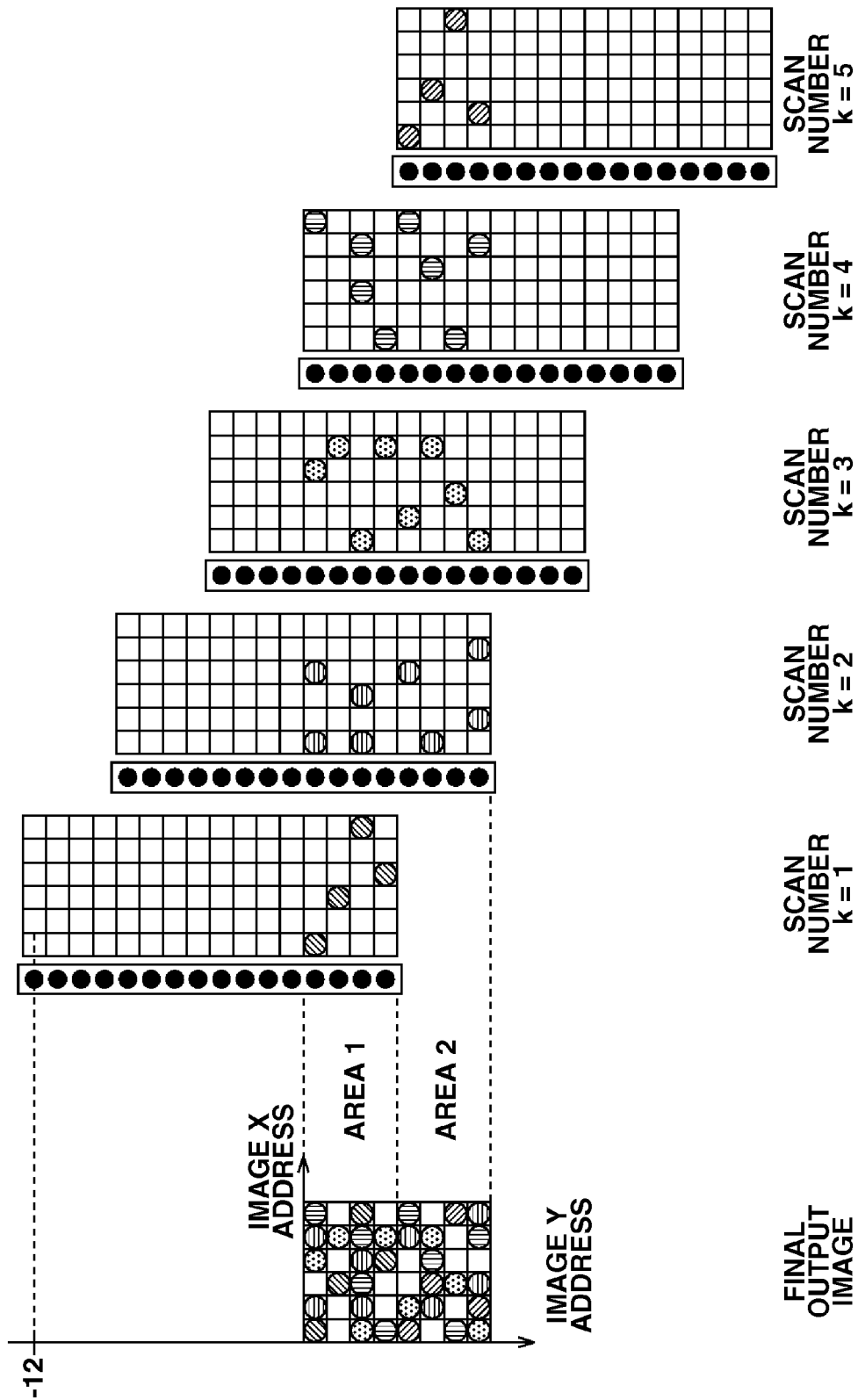
FIG. 6 illustrates an example of a color separation data segmenting position setting method.

In the present exemplary embodiment, the recording head 201 includes a total of 16 nozzles (i.e., a nozzle array of 16 nozzles) arrayed in the Y-axis direction. The recording head 201 can form an image by performing scanning four times (i.e., 4-pass printing) on a same recording area of the image. FIG. 6 illustrates an example of a method for setting the segmenting position Ycut (k). In general, the recording head 201 performs the 4-pass printing in the following manner. First, when the scan number k is set to the initial value (i.e., k=1), the recording head 201 performs the first scanning operation to form a first part of an image by using only four nozzles (i.e., a quarter of the 16 nozzles) located at the lower end, as illustrated in FIG. 6.

When the scan number k is set to 2, the transportation unit 205 conveys a recording medium downward relative to the first scanning position (i.e., the position corresponding to the scan number k=1) by an amount equivalent to the length of the quarter of the 16 nozzles of the recording head 201 (i.e., the length corresponding to four nozzles), and the recording head 201 performs the second scanning operation to form a second part of the image. When the scan number is set to 3, the transportation unit 205 further conveys the recording medium downward relative to the second scanning portion by an amount equivalent to the length of the quarter of the 16 nozzles of the recording head 201 (i.e., the length corresponding to four nozzles), and the recording head 201 performs the third scanning operation to form a third part of the image. By repeating the above-described image formation and sheet conveyance operations, the printer 2 can form a finally output image (i.e., a final output image). Therefore, in a case where the scan number k is 1, a segmenting position Ycut(1) is equal to a position (=−12) corresponding to a Y-axis coordinate value (i.e., a coordinate value in the vertical direction) of the uppermost nozzle of the 16 nozzles equipped in the recording head 201.

From the foregoing, the segmenting position Ycut(k) can be generally expressed using the following formula (7). In formula (7), Nzzl represents a total number of nozzles of the recording head 201 disposed in a line in the Y-axis direction, Pass represents a pass number (i.e., number of scans performed in the same main scanning recording area), and k represents the scan number.

$$Ycut(k) = -Nzzl + (Nzzl/Pass) \times k \quad (7)$$

Figure 4:
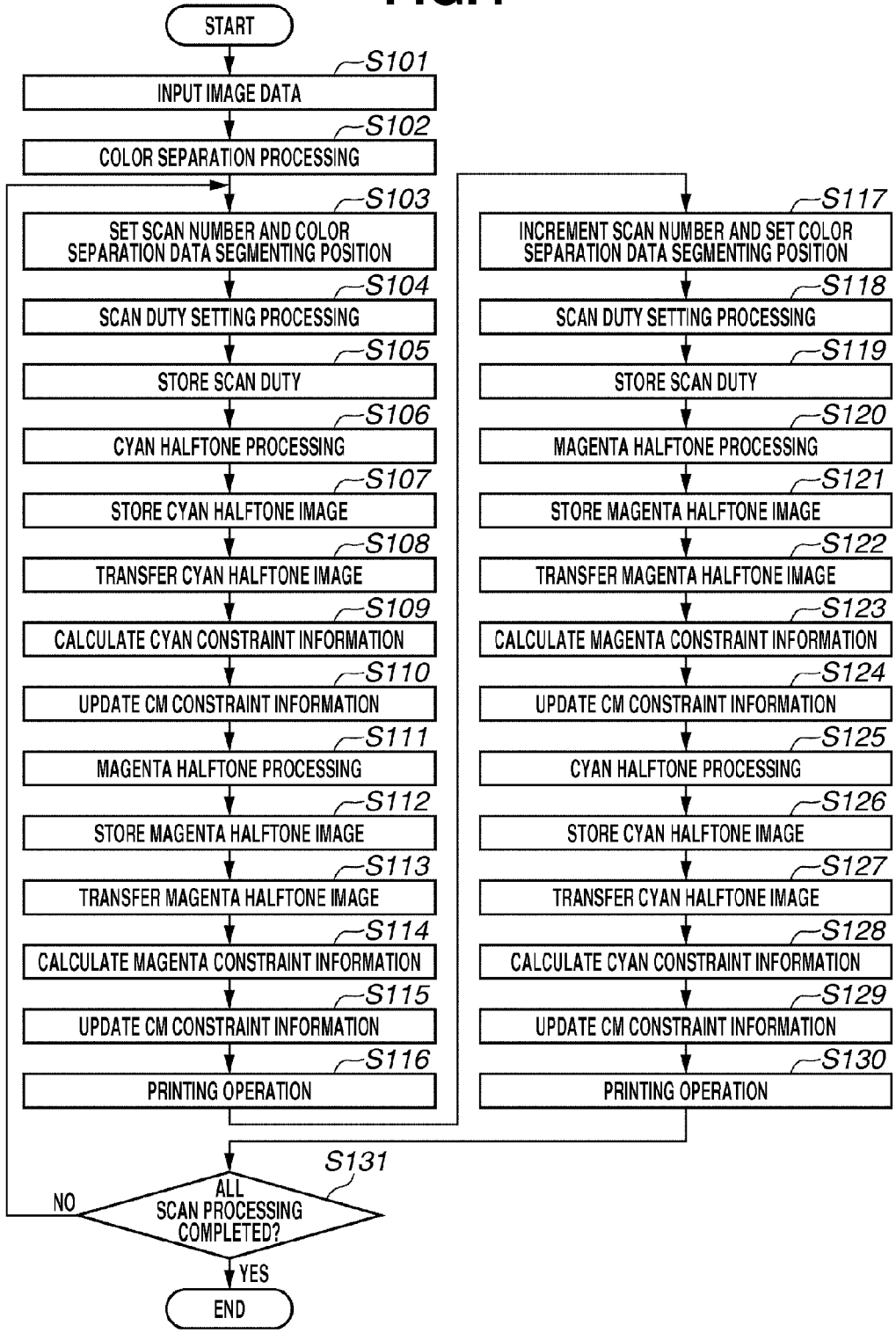
FIG. 4 is a flowchart illustrating an example of detailed image forming processing.
Figure 7:
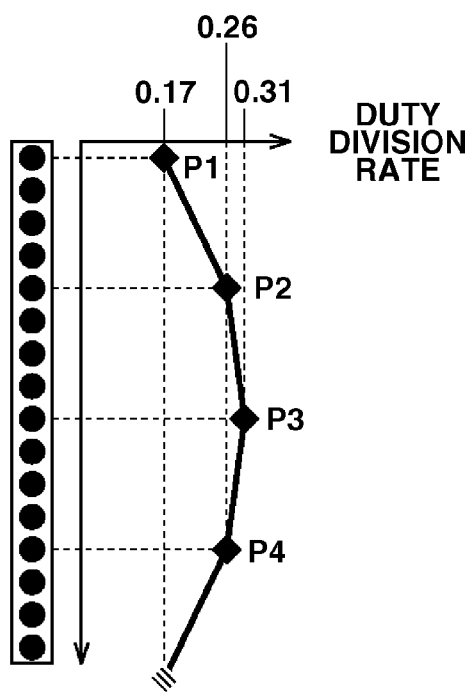
FIG. 7 schematically illustrates an example of values given to a scan duty setting look-up table (LUT).

Referring back to step S104 in FIG. 4, namely, after the color separation data segmenting position Ycut(k) is set as described above, the scan duty setting unit 105 sets a duty value for the forward path scanning based on the scan duty setting LUT 106 and the color separated image data. FIG. 7 schematically illustrates an example of values given to the scan duty setting LUT 106. The scan duty setting LUT 106 stores the values illustrated in FIG. 7 for the 4-pass printing using the nozzle array of 16 nozzles. In FIG. 7, the ordinate axis represents a nozzle position and the abscissa axis represents a duty division rate. As illustrated in FIG. 7, in the present exemplary embodiment, four inflection points P1 to P4 are set for each four nozzles to be used in each pass and duty division rates of 16 nozzles can be obtained by linearly interpolating respective inflection points P1 to P4. Then, the obtained duty division rates of 16 nozzles are stored in the scan duty setting LUT 106. The numerical values of the inflection points P1 to P4 satisfy the following formula (8).

$$P1 + P2 + P3 + P4 = 1.0 \quad (8)$$

The method for obtaining the values of the scan duty setting LUT 106 is not limited to the above-described setting method. For example, it is useful to set the inflection points more finely and the duty division rate can be directly designated for each nozzle.

Figure 8:
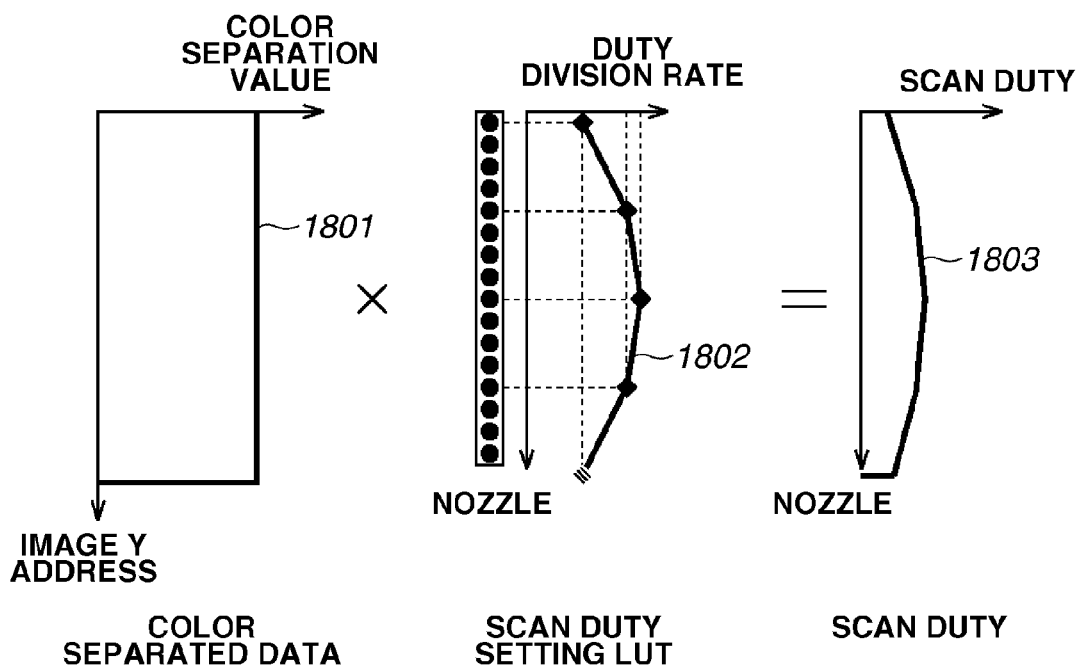
FIG. 8 illustrates an example of a scan duty setting method.

FIG. 8 illustrates an example of a scan duty setting method. As illustrated in FIG. 8, the scan duty to be set in step S104 can be set as a product of a value of the scan duty setting LUT 106 and color separated image data. More specifically, as illustrated in FIG. 8, color separated image data 1801 is multiplied by a duty division rate 1802 set for each nozzle to obtain a scan duty 1803 for each nozzle. In an actual scanning operation, each nozzle discharges an ink droplet corresponding to a scan duty buffer 803 to form an image corresponding to target color separated image data.

Figure 9:
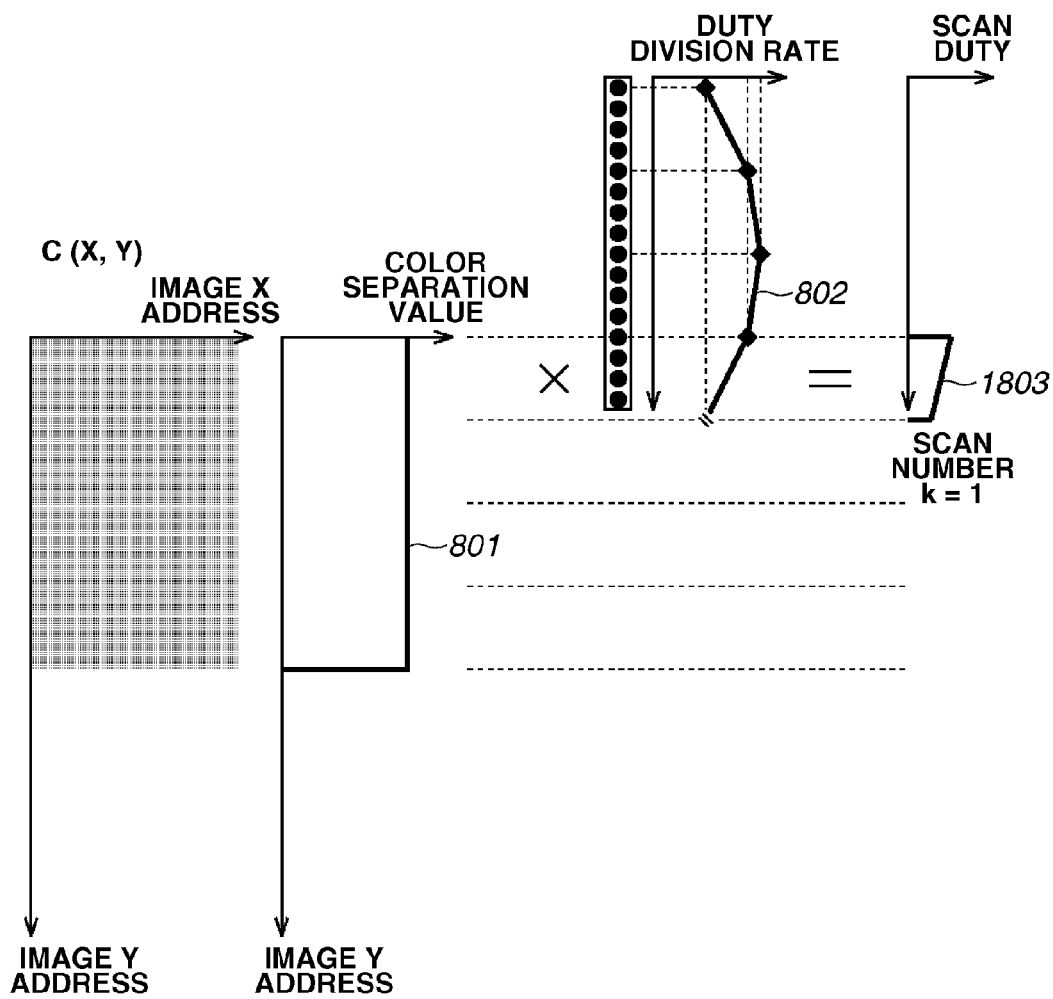
FIG. 9 illustrates an example of a scan duty calculation method in a case where a scan number is 1.

In the present exemplary embodiment, if a corresponding nozzle is positioned outside an address area of the image in the Y-axis direction, the scan duty value is set to 0. FIG. 9 illustrates an example of a scan duty calculation method in a case where the scan number k is 1. As illustrated in FIG. 9, in a case where the scan number k is 1, an "image address in the Y-axis direction (i.e., image Y address)" for the upper twelve nozzles (i.e., three quarters of the 16 nozzles of the nozzle array) becomes zero. Therefore, the scan duty for the upper twelve nozzles is set to 0 and the scan duty for the lower four nozzles (i.e., a quarter of the 16 nozzles of the nozzle array) is set to a significant value.

Figure 10:
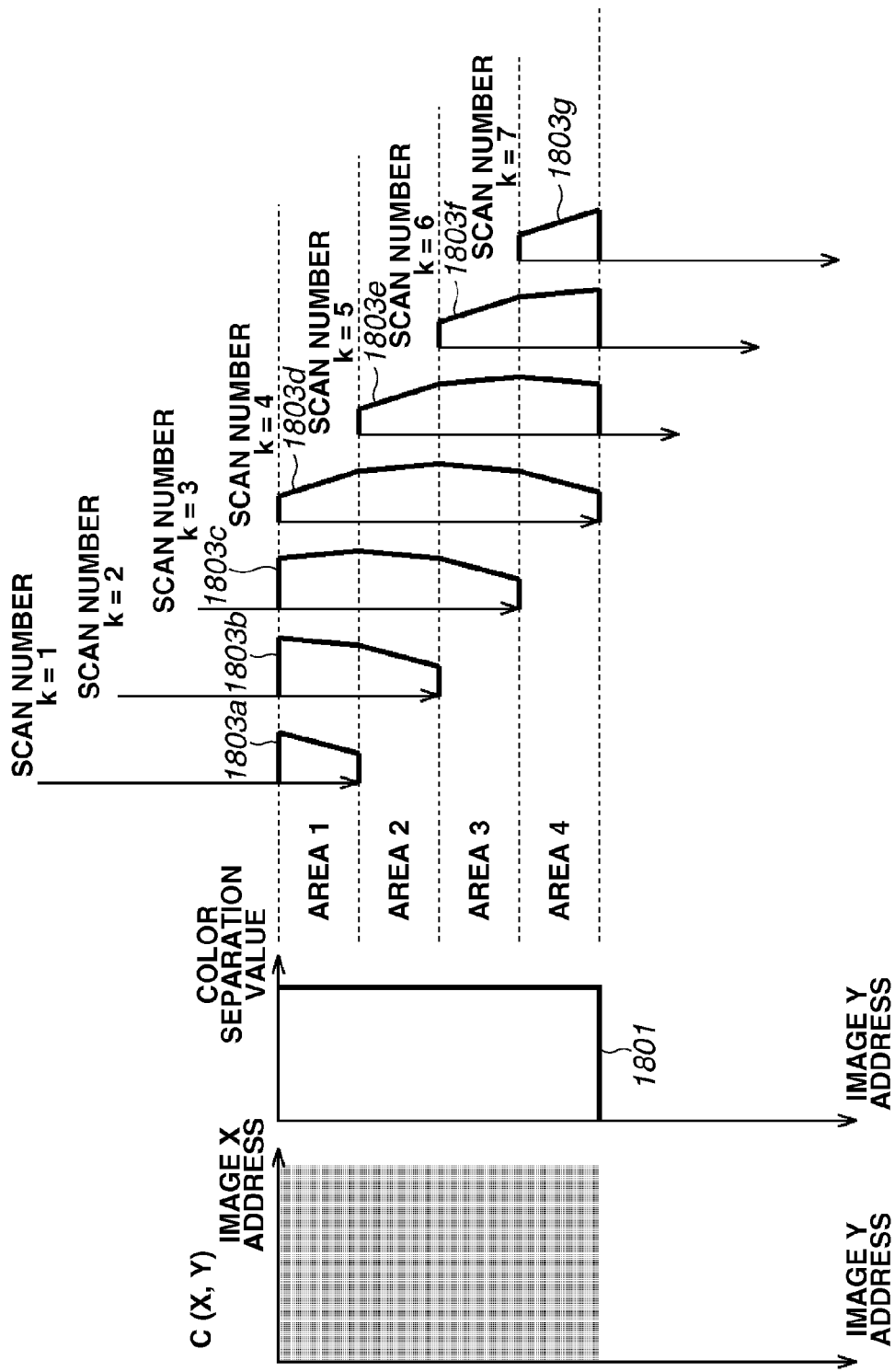
FIG. 10 illustrates examples of the scan duty in a case where the scan number ranges from 1 to 7.

FIG. 10 illustrates examples of the scan duty in a case where the scan number k ranges from 1 to 7. The color separation data segmenting position Ycut(k) is determined dependent on the scan number k. Therefore, in a case where the scan number k ranges from 1 to 7, the scan duty 1803 can be determined as illustrated in FIG. 10.

As apparent from scan duty examples 1803a to 1803g corresponding to each scan number (k=1 to 7) illustrated in FIG. 10, the scan duty is variable depending on the scan number k. Respective scan duty examples 1803a to 1803g illustrated in FIG. 10 are determined as a product of the color separated image data 1801 and the duty division rate 1802 stored in the scan duty setting LUT 106. Therefore, if these products are obtained by conveying a recording medium, at an area 1 illustrated in FIG. 10, a sum value of one raster to be formed during four repetitive scanning operations corresponding to the scan numbers k=1 to k=4 becomes identical to the color separated image data 1801. Similarly, in respective areas 2, 3, and 4, the sum value of one raster becomes identical to the color separated image data.

Then, in the present exemplary embodiment, the color separated image data 1801 is compared with a duty separation threshold D_Th3 that can be prepared beforehand. If it is determined that the color separated image data 1801 is smaller than the duty separation threshold D_Th3 (corresponding to the following formulae (10) to (15)), the recording head 201 is controlled to form an image by scanning one to three times (not four times).

The above-described setting of the scan duty 1803 performed by the scan duty setting unit 105 can be expressed for cyan C(X, Y) using the following formulae (9) to (15). In the exemplary embodiment, C_d(X, Y) indicates a scan duty at an address (X, Y) and S_LUT(Y) indicates a value of the scan duty setting LUT 106 at an address Y. Further, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied. Moreover, in addition to the above-described threshold D_Th3, smaller thresholds D_Th2 and D_Th1 (D_Th3>D_Th2>D_Th1) are defined as another duty separation threshold.

First, if C(nx, Ycut(k)+ny)>D_Th3, then a scan duty C_d (nx, ny) can be defined by the following formula (9).

$$C\_d(nx,ny)=C(nx,Ycut(k)+ny)\times S\_LUT(ny) \quad (9)$$

If C(nx, Ycut(k)+ny)≦D_Th1, then the scan duty C_d(nx, ny) can be defined by the following formulae (10) and (11). More specifically, when the scan number k is "1, 5, . . . , 4n+1 (n is an integer equal to or greater than 0)", the scan duty C_d(nx, ny) can be defined by the following formula (10).

$$C\_d(nx,ny)=C(nx,Ycut(k)+ny) \quad (10)$$

On the other hand, when the scan number k is other than the above-described values, the scan duty C_d(nx, ny) can be defined by the following formula (11).

$$C\_d(nx,ny)=0 \quad (11)$$

Further, if C(nx, Ycut(k)+ny)≦D_Th2, then the scan duty C_d(nx, ny) can be defined by the following formulae (12) and (13). More specifically, when the scan number k is "1, 5, . . . , 4n+1 (n is an integer equal to or greater than 0)" or "2, 6, . . . , 4n+2 (n is an integer equal to or greater than 0)", the scan duty C_d(nx, ny) can be defined by the following formula (12).

$$C\_d(nx,ny)=C(nx,Ycut(k)+ny)/2 \quad (12)$$

On the other hand, when the scan number k is other than the above-described values, the scan duty C_d(nx, ny) can be defined by the following formula (13).

$$C\_d(nx,ny)=0 \quad (13)$$

Furthermore, if C(nx, Ycut(k)+ny)≦D_Th3, then the scan duty C_d(nx, ny) can be defined by the following formulae (14) and (15). More specifically, when the scan number k is "1, 5, . . . , 4n+1 (n is an integer equal to or greater than 0)", "2, 6, . . . , 4n+2 (n is an integer equal to or greater than 0)", or "3, 7, . . . , 4n+3 (n is an integer equal to or greater than 0)", the scan duty C_d(nx, ny) can be defined by the following formula (14).

$$C\_d(nx,ny)=C(nx,Ycut(k)+ny)/3 \quad (14)$$

On the other hand, when the scan number k is other than the above-described values, the scan duty C_d(nx, ny) can be defined by the following formula (15).

$$C\_d(nx,ny)=0 \quad (15)$$

The scan duty C_d(nx, ny) defined by formula (9) is a scan duty value in ordinary duty separation processing. The scan duty C_d(nx, ny) defined by any one of formulae (10) to (15) is a scan duty value in an exceptional duty separation processing. When the value of the color separated image data is equal to or less than the duty separation threshold D_Th1, the recording head 201 is controlled to form an image by scanning one time as indicated by formulae (10) and (11). Further, when the value of the color separated image data is equal to or less than the duty separation threshold D_Th2, the recording head 201 is controlled to form an image by scanning two times as indicated by formulae (12) and (13). Furthermore, when the value of the color separated image data is equal to or less than the duty separation threshold D_Th3, the recording head 201 is controlled to form an image by scanning three times as indicated by formulae (14) and (15). Similarly, scan duty separation for Lc(X, Y), M(X, Y), Lm(X, Y), Y(X, Y), and K(X, Y) can be performed according to the above-described formulae.

As described above, in the present exemplary embodiment, scan duty values in the exceptional duty separation processing are set according to formulae (10) to (15) for the 4-pass printing. However, if any printing other than the 4-pass printing is performed, scan duty values in the exceptional duty separation processing can be set similarly. For example, if an 8-pass printing is performed, it is required to set duty separation thresholds D_Th1 to D_Th7 and set scan duty values in the exceptional duty separation processing.

Figure 11:
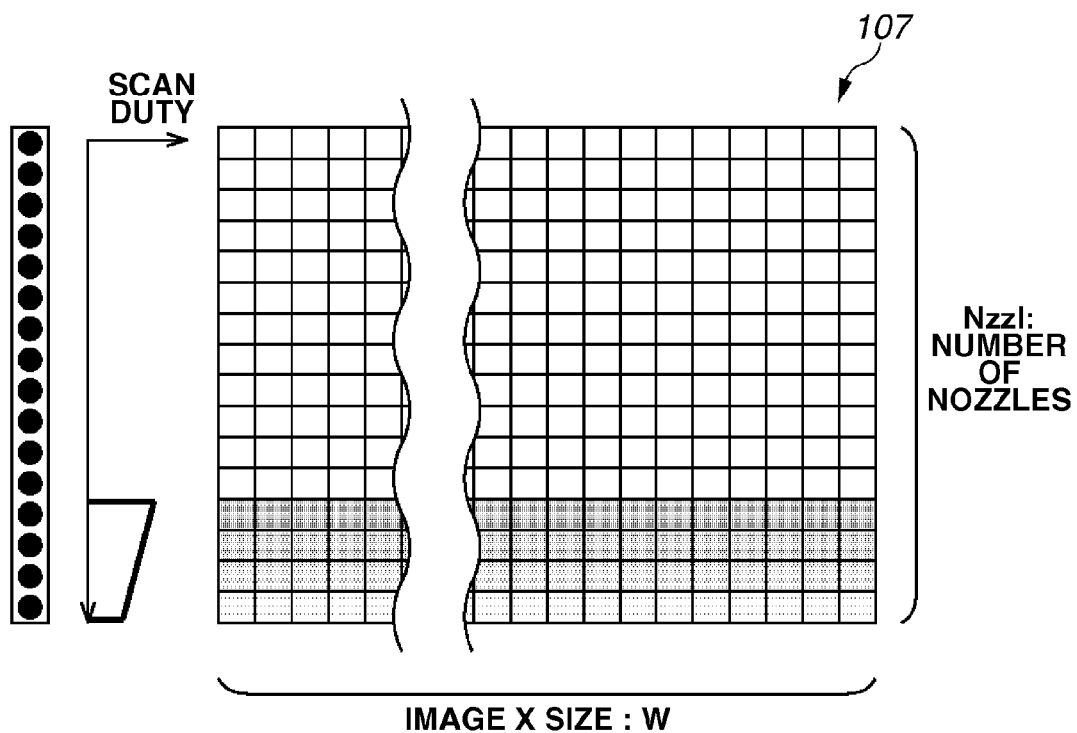
FIG. 11 schematically illustrates an example of scan duty data stored in a scan duty buffer.

As described above, in step S105, the scan duty data set by the scan duty setting unit 105 is stored in the scan duty buffer 107. FIG. 11 schematically illustrates an example of the scan duty data stored in the scan duty buffer 107. As illustrated in FIG. 11, the scan duty buffer 107 stores band-like scan duty data for each color, in which a Y-axis direction (i.e., the vertical direction) indicates the number of nozzles and an X-axis direction (i.e., the horizontal direction) indicates the size of an image in the X-axis direction (i.e., image X size).

Referring back to FIG. 4, in step S106, the halftone processing unit 108 performs cyan halftone processing. The cyan halftone processing is performed for converting a sum value of "cyan scan duty data" stored in the scan duty buffer 107 and the constraint information stored in the constraint information buffer 109 into a 2-level gradation value (i.e., binary data) FIG. 12 schematically illustrates constraint information data stored in the constraint information buffer 109.

Figure 12:
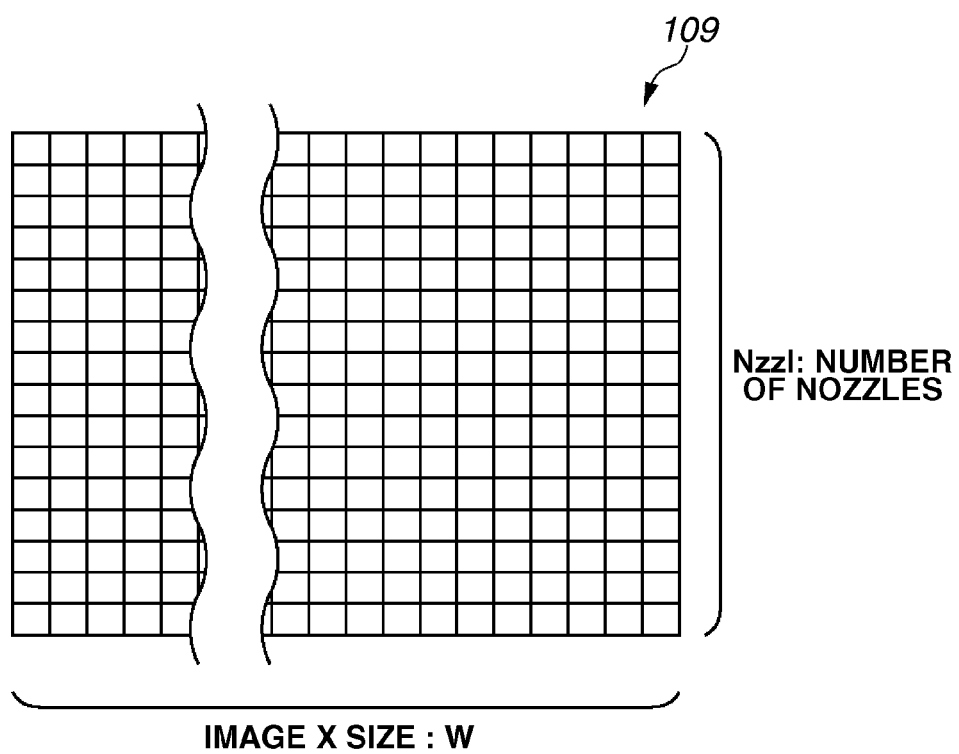
FIG. 12 schematically illustrates an example of constraint information data stored in a constraint information buffer.

As illustrated in FIG. 12, the constraint information buffer 109 stores band-like constraint information data, whose Y-axis direction (i.e., the vertical direction) indicates the number of nozzles and whose X-axis direction (i.e., the horizontal direction) indicates the image size in the X-axis direction (image X size). In the present exemplary embodiment, the above-described constraint information data can be commonly used for image data of cyan and magenta. The constraint information stored in the constraint information buffer 109 indicates whether a binary image is likely to be formed at an address on a recorded image. The constraint information can be updated for each scan number k. However, in the processing starting when the scan number is 1, all initial values of the constraint information are set to 0.

More specifically, when the constraint information is commonly used for cyan and magenta data, five pieces of the constraint information CM_r(X,Y), Lc_r(X,Y), Lm_r(X,Y), Y_r(X,Y), and K_r(X,Y) are present at the address (X,Y). These initial values can be expressed using the following formulae (16) to (20). In this case, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied.

$$CM\_r(nx,ny)=0 \quad (16)$$

$$Lc\_r(nx,ny)=0 \quad (17)$$

$$Lm\_r(nx,ny)=0 \quad (18)$$

$$Y\_r(nx,ny)=0 \quad (19)$$

$$K\_r(nx,ny)=0 \quad (20)$$

Therefore, when the scan number k is equal to or greater than 2 (k≧2), respective values of the constraint information Lc_r, Lm_r, Y_r, and K_r are updated to significant values. On the other hand, the constraint information CM_r commonly used for cyan and magenta data is updated when the scan number remains the same. The update of the constraint information CM_r commonly used for cyan and magenta data is described below in more detail.

The halftone processing according to the present exemplary embodiment uses an error diffusion method as processing for converting multi-valued color image data into a binary image (or an image having a gradation number of two or more, which is less than a gradation number of input color image data). Needless to say, instead of using the error diffusion method, a minimized average error or dither method can be used.

Figure 13:
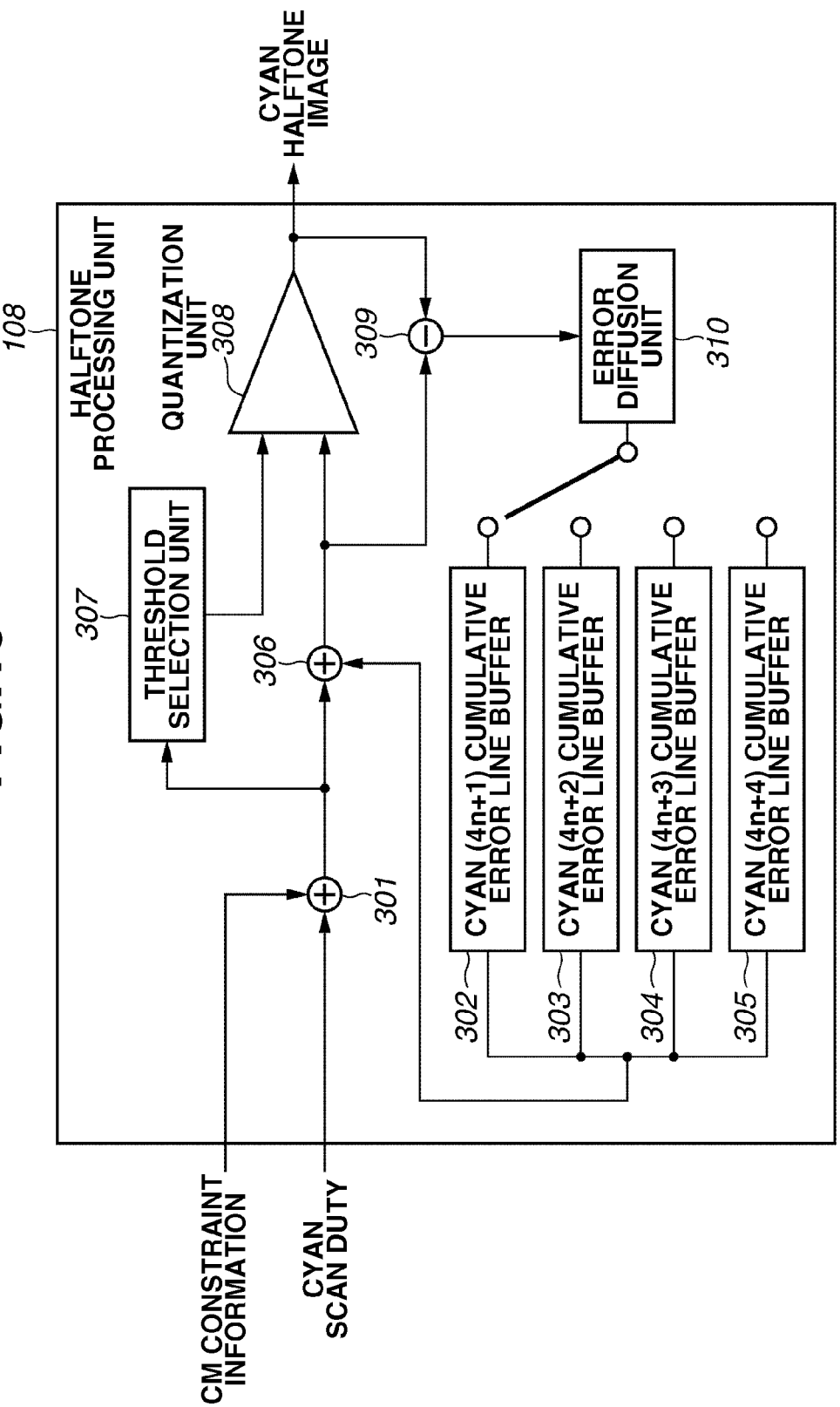
FIG. 13 illustrates an example of a detailed configuration of cyan halftone processing that can be performed by a halftone processing unit.
Figure 14:
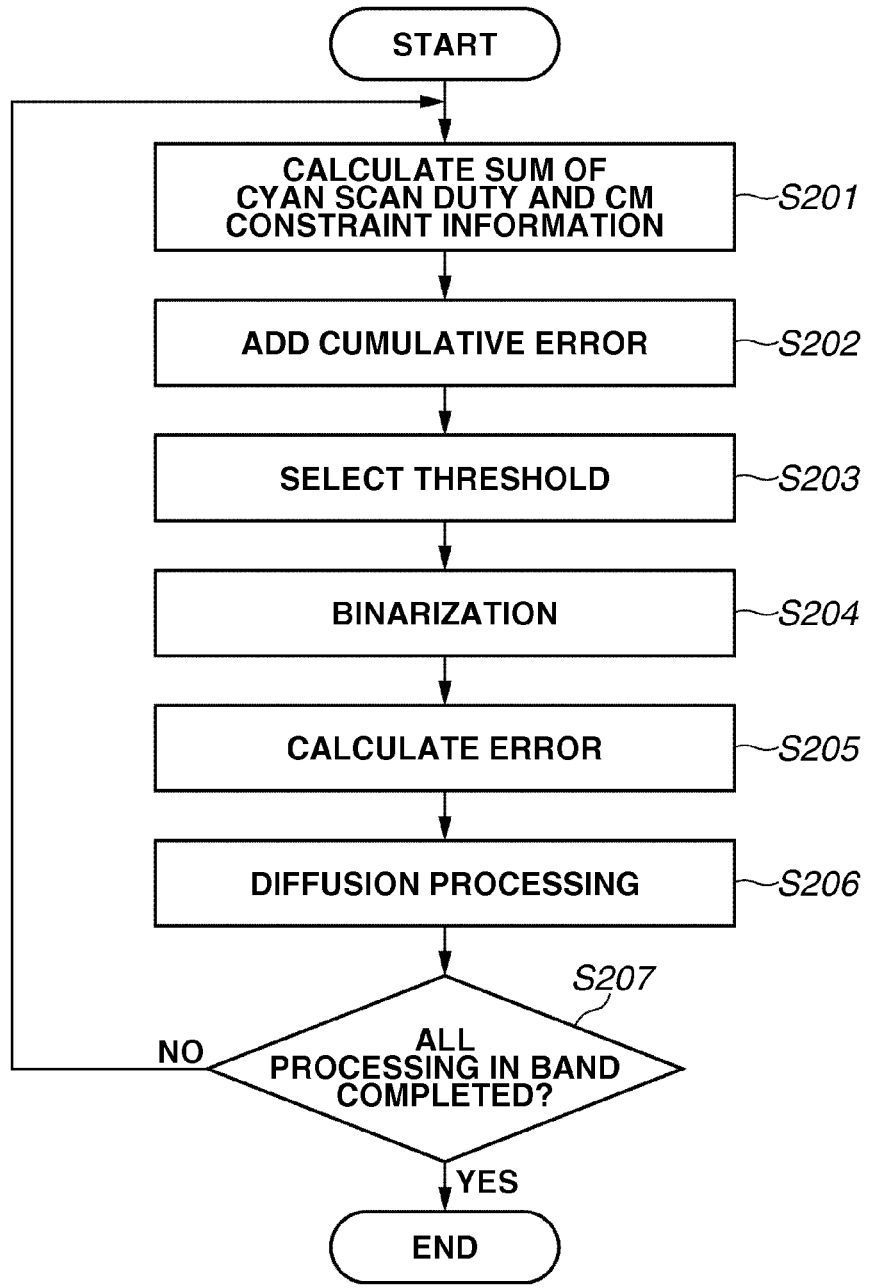
FIG. 14 is a flowchart illustrating an example of detailed cyan halftone processing that can be performed by the halftone processing unit.

To simplify the following description, an example of the cyan halftone processing to be performed during the 4-pass printing in a case where the scan number k is 1 is described below. FIG. 13 illustrates an example of a detailed configuration of the cyan halftone processing that can be performed by the halftone processing unit 108. FIG. 14 is a flowchart illustrating an example of detailed cyan halftone processing that can be performed by the halftone processing unit 108.

First, in step S201 illustrated in FIG. 14, a constraint information adding unit 301 illustrated in FIG. 13 inputs a sum of cyan scan duty and constraint information. More specifically, the constraint information adding unit 301 calculates "pixel data Ic of a target pixel", which indicates a sum value of cyan scan duty C_d and CM constraint information CM_r (i.e., constraint information commonly used for cyan and magenta), according to the following formula (21). However, all values of the constraint information CM_r are set to 0 when the scan number k is 1 (i.e., k=1).

$$Ic=C\_d+CM\_r \quad (21)$$

Figure 15:
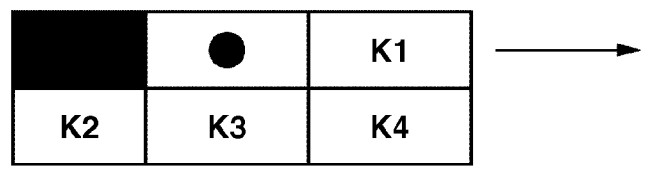
FIG. 15 illustrates an example of error diffusion coefficients.

In step S202, a cumulative error adding unit 306 adds a cumulative error to be used for error diffusion processing. An example of cumulative error addition processing is described below in detail. FIG. 15 illustrates an example of error diffusion coefficients. In FIG. 15, "●" represents the target pixel and "→" represents the processing direction. As illustrated in FIG. 15, four error diffusion coefficients K1 to K4 are provided as error diffusion coefficients to be used in the error diffusion processing. For example, K1=7/16, K2=3/16, K3=5/16, and K4=1/16. However, the error diffusion coefficients K1 to K4 need not be fixed and can be changed according to the gradation. Moreover, the error diffusion coefficients are not limited to the above-described four coefficients. The number of the error diffusion coefficients can be increased appropriately. To diffuse and accumulate errors using the error diffusion coefficients K1 to K4, the halftone processing unit 108 includes four sets of cyan cumulative error line buffers 302 to 305 and selects an appropriate one of the cumulative error line buffers 302 to 305 to be used for each scan number in the following manner.

More specifically, when the scan number k is 1, 5, ..., 4n+1 (n is an integer equal to or greater than 0), the halftone processing unit 108 uses the cyan (4n+1) cumulative error line buffer 302. When the scan number k is 2, 6, ..., 4n+2, the halftone processing unit 108 uses the cyan (4n+2) cumulative error line buffer 303. When the scan number k is 3, 7, ..., 4n+3, the halftone processing unit 108 uses the cyan (4n+3) cumulative error line buffer 304. When the scan number k is 4, 8, ..., 4n+4, the halftone processing unit 108 uses the cyan (4n+4) cumulative error line buffer 305.

FIGS. 16A and 16B schematically illustrate an example of storage areas in the cumulative error line buffer. As illustrated in FIG. 16A, the cumulative error line buffers 302 to 305 have four storage areas 1501 to 1504. More specifically, the cumulative error line buffers 302 to 305 have four sets of the storage areas 1501 to 1504 of "Ec1_0, Ec1(x)", "Ec2_0, Ec2(x)", "Ec3_0, Ec3(x)", and "Ec4_0, Ec4(x)." For example, the cyan (4n+1) cumulative error line buffer 302 has a single storage area Ec1_0 and a plurality of storage areas Ec1_(x) (x=1 to W) the number of which is equal to the number W of pixels of input image data in the horizontal direction. The cyan cumulative error line buffers 302 to 305 are all initialized to 0 in the processing starting when the scan number k is 1, 2, 3, 4 (k=1, 2, 3, 4). For example, in the processing starting when the scan number k is 5, the cyan (4n+1) cumulative error line buffer 302 is not initialized. In the present exemplary embodiment, the above-described four cumulative error line buffers 302 to 305 are required to perform the 4-pass printing of one color. As described below, four sets of cumulative error line buffers are required to process magenta data.

In a case where the scan number k is 1 (i.e., k=1), the halftone processing unit 108 executes error diffusion processing using the cyan (4n+1) cumulative error line buffer 302. More specifically, the cumulative error adding unit 306 adds an error Ec1(x) corresponding to a pixel position x of an input pixel data in the horizontal direction to the sum value of the cyan scan duty and the CM constraint information. More specifically, the following formula (23) can be established when Ic represents the pixel data of a target pixel input from the constraint information adding unit 301, and Ic' represents the pixel data of the target pixel having been added with the cumulative error.

$$Ic'=Ic+Ec1(x) \quad (22)$$

In step S203, a threshold selection unit 307 selects a threshold T. For example, the threshold T can be set according to the following formula (23).

$$T=128 \quad (23)$$

Alternatively, to eliminate any delay in dot generation, the threshold T can be finely set according to the following formula (24) so that the threshold T changes according to the cyan scan duty (C_d) to reduce an average quantization error.

$$T=f(C\_d) \quad (24)$$

In step S204, a quantization unit 308 compares pixel data Ic' of the error added target pixel with the threshold T and determines an output pixel value Out_c as a dot binarization result according to the following rules defined by formulae (25) and (26).

If Ic'<T, then $$\text{Out}\_c=0 \quad (25)$$

If Ic'≧T, then $$\text{Out}\_c=255 \quad (26)$$

In step S205, an error calculation unit 309 calculates a difference Err_c between the pixel data Ic' (i.e., error added pixel data Ic) of the target pixel and the output pixel value Out_c according to the following formula (27).

$$\text{Err}\_c(x)=Ic'-\text{Out}\_c \quad (27)$$

In step S206, an error diffusion unit 310 diffuses the error. More specifically, the error diffusion unit 310 performs processing for diffusing the error Err_c(x) at the pixel position x in the horizontal direction, using the cyan (4n+1) cumulative error line buffer 302, according to the following formula (28).

$$Ec1(x+1) \leftarrow Ec1(x+1)+\text{Err}\_c(x) \times 7/16 (x<W)$$

$$Ec1(x-1) \leftarrow Ec1(x-1)+\text{Err}\_c(x) \times 3/16 (x>1)$$

$$Ec1(x) \leftarrow Ec1\_0+\text{Err}\_c(x) \times 5/16 (1<x<W)$$

$$Ec1(x) \leftarrow Ec1\_0+\text{Err}\_c(x) \times 8/16 (x=1)$$

$$Ec1(x) \leftarrow Ec1\_0+\text{Err}\_c(x) \times 13/16 (x=W)$$

$$Ec1\_0 \leftarrow \text{Err}\_c(x) \times 1/16 (x<W)$$

$$Ec1\_0 \leftarrow 0 (x=W) \quad (28)$$

Through the above-described processing, the halftone processing unit 108 can complete binarization (quantization value=0 or 255) of a cyan pixel in the forward path, i.e., when the scan number k is 1 (i.e., k=1). In step S207, it is determined whether the above-described processing in steps S201 to S206 has been completed for all pixels (addresses (0, 0) to (W−1, Nzzl−1)) in a band. When the processing in steps S201 to S206 has been completed for all pixels in the band (YES in step S207), the halftone processing unit 108 can determine a dot position of cyan halftone data, i.e., ON/OFF of each cyan dot.

Figure 17:
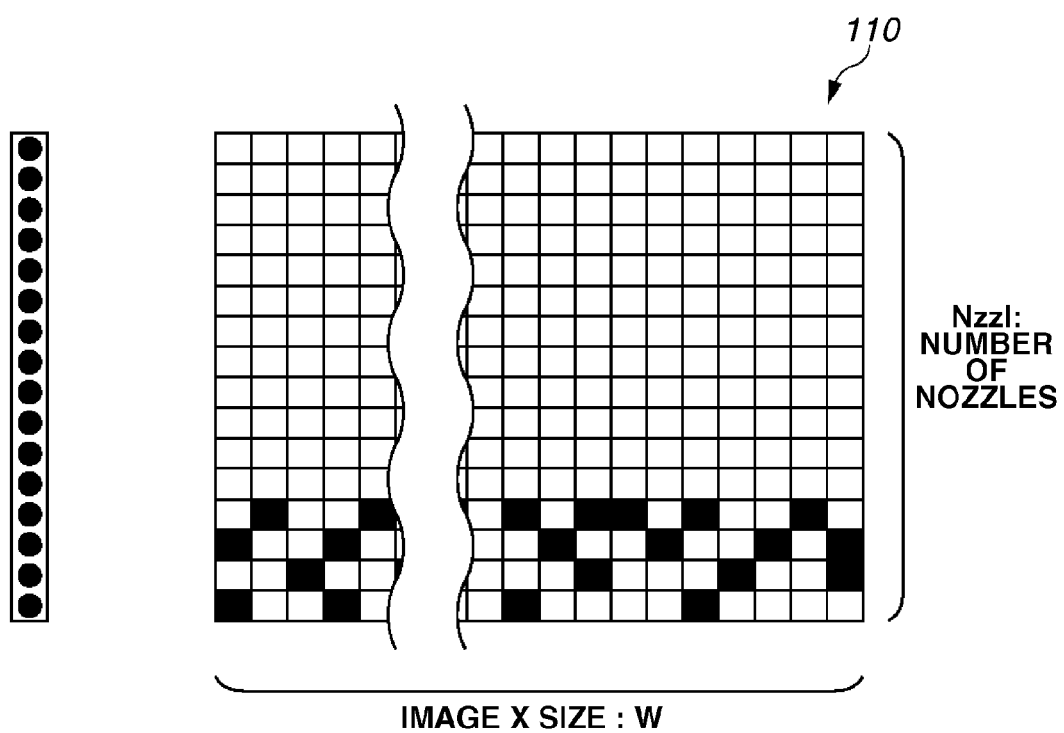
FIG. 17 schematically illustrates a result of the halftone processing performed on cyan scan duty in a case where a scan number k is 1, which is stored in a halftone image storage buffer.

Referring back to FIG. 4, after completing the cyan halftone processing in step S106, the halftone processing unit 108 performs the following processing. More specifically, in step S107, the halftone processing unit 108 stores "binary image data of cyan" obtained by executing the halftone processing in the halftone image storage buffer 110. FIG. 17 schematically illustrates a result of the halftone processing performed on the cyan scan duty in a case where the scan number k is 1 (i.e., k=1), which is stored in the halftone image storage buffer 110. As illustrated in FIG. 17, the halftone image storage buffer 110 stores "binary image data of the number of nozzles (Nzzl)×image size in the X-axis direction (image X size: W)" corresponding to the pixel position of the scan duty.

In step S108, the image output terminal 112 transfers "halftone band data of cyan (binary image data)" having a vertical size corresponding to the number of nozzles and a horizontal size corresponding to the image X size, which is a part of the band data stored in the halftone image storage buffer 110, to an external device. In step S109, the constraint information calculation unit 111 calculates CM constraint information based on a cyan dot layout. Although described below in detail, in the present exemplary embodiment, the constraint information calculation unit 111 calculates the CM constraint information based on the cyan dot layout and then determines a magenta dot layout based on the CM constraint information. Then, the constraint information calculation unit 111 updates the CM constraint information based on the determined magenta dot layout to obtain constraint information corresponding to the next scan number.

Figure 18:
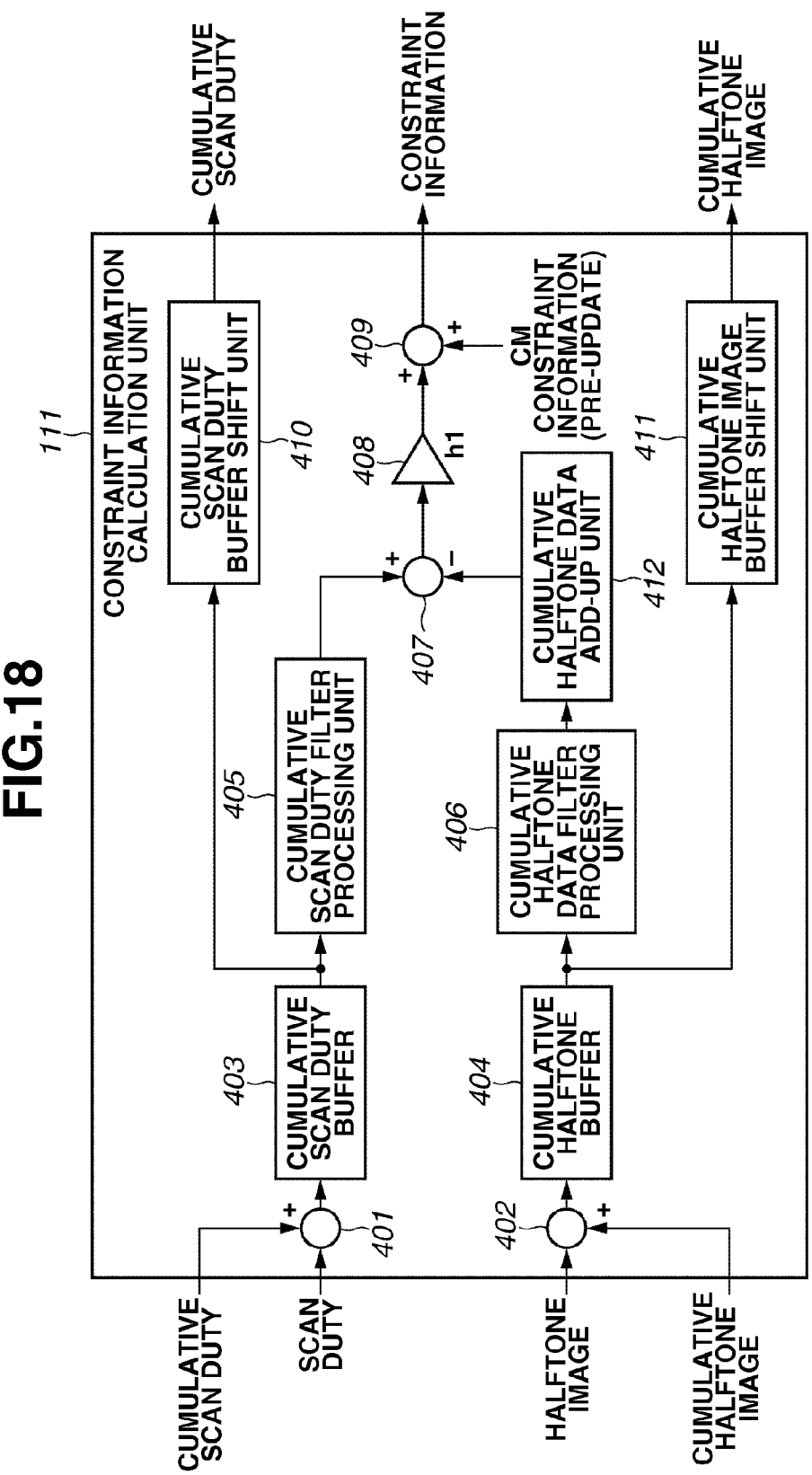
FIG. 18 illustrates an example of a detailed configuration of cyan processing that can be performed by a constraint information calculation unit.
Figure 19:
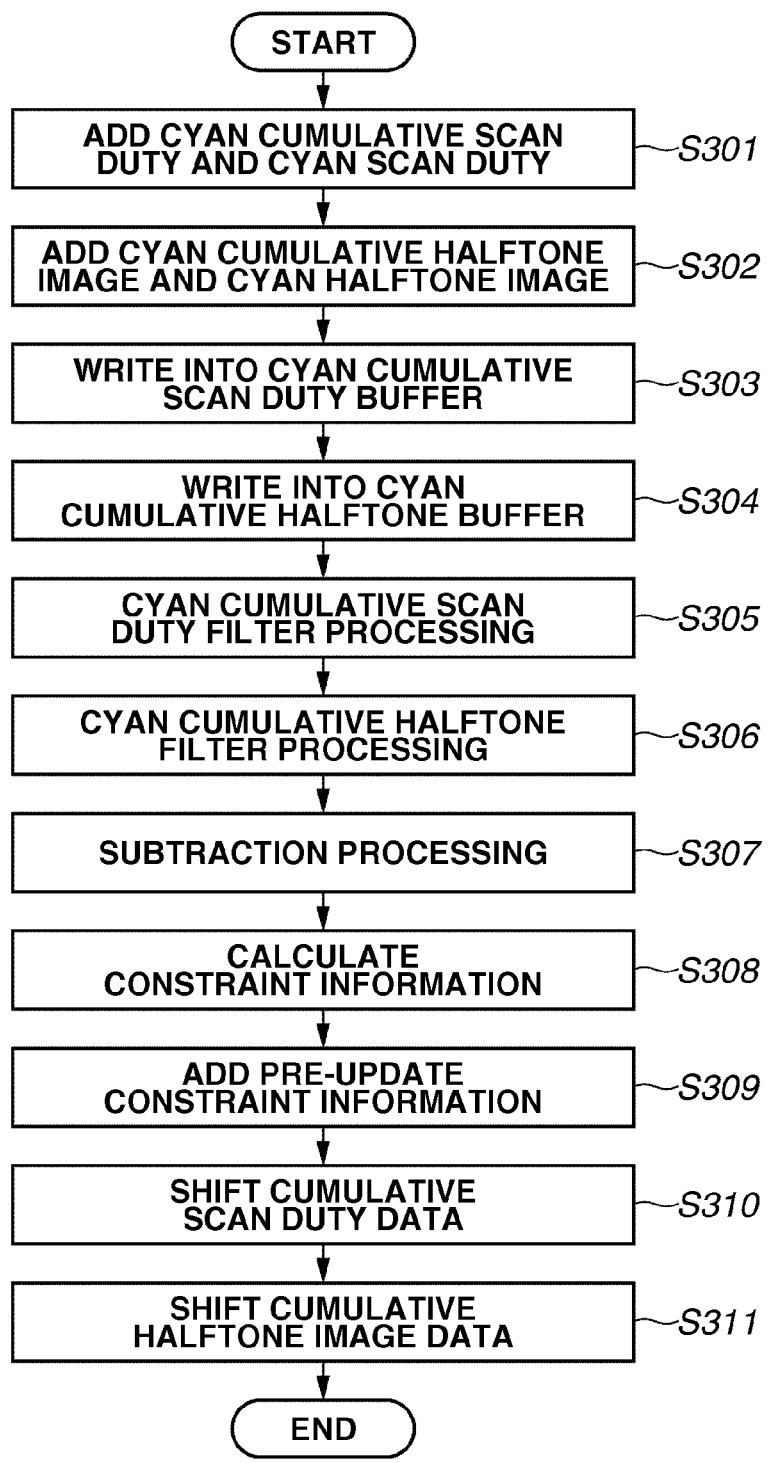
FIG. 19 is a flowchart illustrating an example of detailed processing for calculating CM constraint information that can be performed by the constraint information calculation unit.

An example of the processing in step S109, i.e., the processing for calculating the CM constraint information based on the cyan dot layout, is described below in more detail. FIG. 18 illustrates an example of a detailed configuration of cyan processing that can be performed by the constraint information calculation unit 111. FIG. 19 is a flowchart illustrating an example of detailed processing for calculating the CM constraint information that can be performed by the constraint information calculation unit 111.

First, in step S301 illustrated in FIG. 19, an adding unit 401 illustrated in FIG. 18 adds cyan scan duty data in the scan duty buffer 107 and data stored in a cumulative scan duty buffer 403. In this state, the cumulative scan duty buffer 403 stores an initial value (=0). When the scan number k is 1 (i.e., k=1), respective color data can be described using the following formulae (29) to (34).

In the following formulae, CM_sum_d(X, Y), Lc_sum_d(X, Y), Lm_sum_d(X, Y), Y_sum_d(X, Y), and K_sum_d(X, Y) represent color data of the cumulative scan duty buffer at the address (X, Y). Further, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied.

$$C\_\text{sum}\_d(nx,ny)=0 \quad (29)$$

$$Lc\_\text{sum}\_d(nx,ny)=0 \quad (30)$$

$$M\_\text{sum}\_d(nx,ny)=0 \quad (31)$$

$$Lm\_\text{sum}\_d(nx,ny)=0 \quad (32)$$

$$Y\_\text{sum}\_d(nx,ny)=0 \quad (33)$$

$$K\_\text{sum}\_d(nx,ny)=0 \quad (34)$$

Regarding the cyan processing in the forward path, a cumulative scan duty data C_sum_d', which is obtained by the addition processing in step S301, can be calculated using the following formula (35).

$$C\_\text{sum}\_d'=C\_d+C\_\text{sum}\_d \quad (35)$$

In step S302, an adding unit 402 adds the "binary image data of cyan" stored in the halftone image storage buffer 110 and data stored in a cumulative halftone buffer 404. In this state, the cumulative halftone buffer 404 stores an initial value (=0). When the scan number k is 1 (i.e., k=1), respective color data can be expressed using the following formulae (36) to (47). The following formulae express C, Lc, M, Lm, Y, and K "data stored in the cumulative halftone buffer 404" at the address (X, Y) in a case where the scan number k is n (i.e., k=n).

More specifically, the following formulae represent Out_c_sum(X, Y, (n % 4)), Out_lc_sum(X, Y, (n % 4)), Out_m_sum(X, Y, (n % 4)), Out_lm_sum(X, Y, (n % 4)), Out_y_sum(X, Y, (n % 4)), and Out_k_sum(X, Y, (n % 4)). In the following formulae, % indicates a residue operator. The third subscript specifies a cumulative halftone buffer to be used, which can be selected from four cumulative halftone buffers 404. Further, each cumulative halftone buffer 404 stores time TM (n % 4) having elapsed after the halftone processing. Furthermore, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied.

$$\text{Out\_}c\_\text{sum}(nx,ny,0)=0 \tag{36}$$

$$\text{Out\_}lc\_\text{sum}(nx,ny,0)=0 \tag{37}$$

$$\text{Out\_}m\_\text{sum}(nx,ny,0)=0 \tag{38}$$

$$\text{Out\_}lm\_\text{sum}(nx,ny,0)=0 \tag{39}$$

$$\text{Out\_}y\_\text{sum}(nx,ny,0)=0 \tag{40}$$

$$\text{Out\_}k\_\text{sum}(nx,ny,0)=0 \tag{41}$$

$$TMc(0)=0 \tag{42}$$

$$TMlc(0)=0 \tag{43}$$

$$TMm(0)=0 \tag{44}$$

$$TMlm(0)=0 \tag{45}$$

$$TMy(0)=0 \tag{46}$$

$$TMk(0)=0 \tag{47}$$

Regarding the cyan processing, in step S302, the following formula (48) can be used to calculate cumulative halftone data (binary image data) Out_c_sum(0) in a case where the scan number k is 1 (i.e., k=1).

$$\text{Out\_}c\_\text{sum}(0) \leftarrow \text{Out\_}c \tag{48}$$

In formula (48), a subscript of each variable indicates a buffer number and corresponds to the third variable in the above-described Out_c_sum. Cumulative halftone data Out_c has a value of 0 or 255.

In step S303, the adding unit 401 writes the cumulative scan duty data C_sum_d' calculated according to formula (35) in the cumulative scan duty buffer 403. Thus, the following formula (49) can be established.

$$C\_\text{sum}\_d \leftarrow C\_\text{sum}\_d' \tag{49}$$

In step 304, the adding unit 402 writes the cumulative halftone data Out_c_sum calculated according to formula (48) into the cumulative halftone buffer 404.

In step S305, a cumulative scan duty filter processing unit 405 performs filter processing on the cumulative scan duty data C_sum_d stored in the cumulative scan duty buffer 403. In this filter processing, the cumulative scan duty filter processing unit 405 uses a two-dimensional Gaussian filter F_m (t, x, y), which is variable depending on a time difference t existing before an impact of a magenta dot in the same pass. Then, the cumulative scan duty filter processing unit 405 calculates cumulative scan duty data C_sum_df having been subjected to the filter processing according to the following formula (50).

$$C\_\text{sum}\_df = C\_\text{sum}\_d * F\_m(t,x,y) \tag{50}$$

In formula (50), * indicates convolution and t represents an impact time difference between a preceding impact of a cyan dot and a subsequent impact of a magenta dot. In the present exemplary embodiment, the two-dimensional Gaussian filter F_m can take two values according to the impact time difference t.

For example, in a case where the following magenta dot is printed together with the preceding cyan dot in the same scanning operation, the cumulative scan duty filter processing unit 405 uses a two-dimensional Gaussian filter F_m corresponding to t<0.1. On the other hand, in a case where the following magenta dot is printed in the next scanning operation, the cumulative scan duty filter processing unit 405 uses a two-dimensional Gaussian filter F_m corresponding to t≧0.1.

In the present exemplary embodiment, the cumulative scan duty filter processing unit 405 uses two Gaussian filters according to the impact time difference t. However, the cumulative scan duty filter processing unit 405 can use three or more Gaussian filters. The two-dimensional Gaussian filter F_m can be defined by the following formula (51).

$$F\_m = F'\_m / \text{Sum}\_m \tag{51}$$

In formula (51), Sum_m represents a sum value of F'_m coefficient and F'_m can be expressed using the following formula (52).

$$F'\_m(t, x, y) = \frac{1}{2\pi\sigma_x(t)\sigma_y(t)} \cdot \exp\left[-\frac{1}{2}\left\{\left(\frac{x}{\sigma_x(t)}\right)^2 - 2\left(\frac{x}{\sigma_x(t)}\right)\left(\frac{y}{\sigma_y(t)}\right) + \left(\frac{y}{\sigma_y(t)}\right)^2\right\}\right] \tag{52}$$

Figure 20:
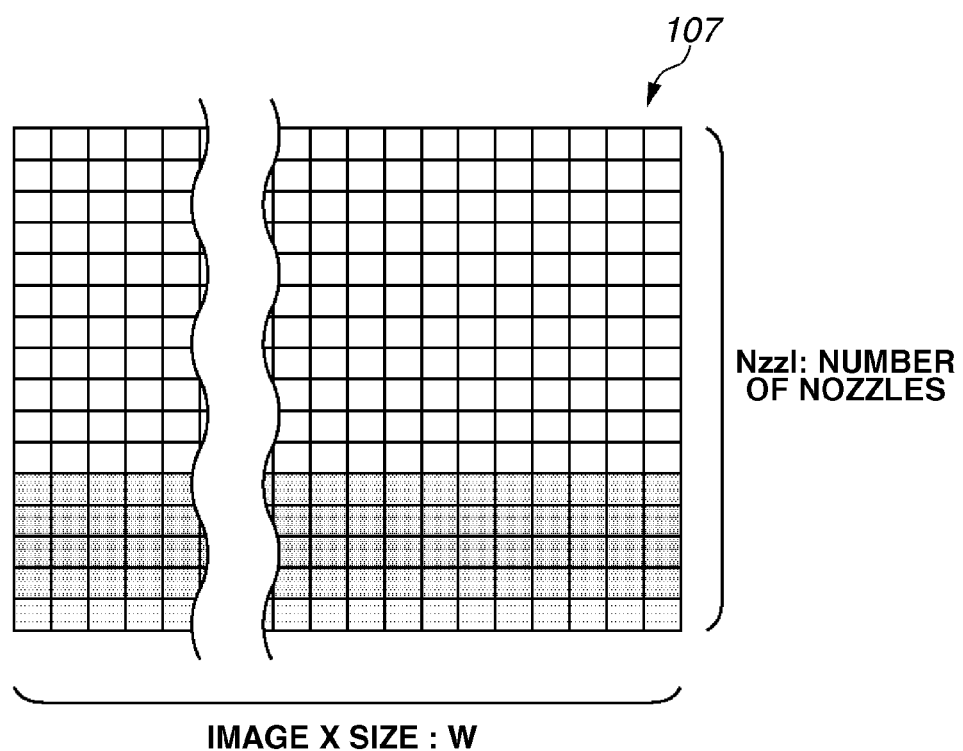
FIG. 20 schematically illustrates an example of scan duty data having been subjected to filter processing.

In formula (52), σx(t) and σy(t) are variable depending on the above-described impact time difference t. The impact time difference t can be determined by referring to time TMc accompanying the cumulative halftone data Out_c_sum. FIG. 20 schematically illustrates an example of the scan duty data having been subjected to the filter processing. FIG. 21A illustrates an example of the two-dimensional Gaussian filter F_m that can be used for the cyan processing. As illustrated in FIG. 21A, a filter 2001 has a square shape having a size of 3×3, although the size of the filter 2001 can be arbitrarily changed. For example, the filter 2001 may have a square shape having an appropriate size selected from the group including 5×5, 7×7, and 9×9 or a rectangular shape having an appropriate size selected from the group including 3×5, 5×7, and 5×9.

In step S306, a cumulative halftone data filter processing unit 406 performs filter processing on the cumulative halftone data Out_c_sum(0) to Out_c_sum(3) stored in the cumulative halftone buffer 404. As described above, a subscript of Out_c_sum specifies the buffer number and corresponds to the third variable in the cumulative halftone data Out_c_sum defined by formulae (36) to (41).

Further, in this filter processing, the cumulative halftone data filter processing unit 406 uses a two-dimensional Gaussian filter LPF_b(t, x, y) that is variable depending on the impact time difference t. Then, the cumulative halftone data filter processing unit 406 calculates cumulative halftone data Out_c_sum_LPF having been subjected to the filter processing according to the following formula (53).

$$\text{Out\_}c\_\text{sum}\_LPF(n) = \text{Out\_}c\_\text{sum}(n) * LPF\_b(n)(n: 0 \text{ to } 3) \tag{53}$$

In formula (53), * indicates convolution. A two-dimensional Gaussian filter LFP_b can be expressed using the following formula (54).

$$LPF\_b = LPF'\_b / \text{Sum}\_b \tag{54}$$

In formula (54), Sum_b represents a sum value of LPF'_b coefficient, and LPF'_b can be expressed using the following formula (55).

$$LPF'\_b(t, x, y) = \frac{1}{2\pi\sigma_x(t)\sigma_y(t)} \cdot \exp\left[-\frac{1}{2}\left\{\left(\frac{x}{\sigma_x(t)}\right)^2 - 2\left(\frac{x}{\sigma_x(t)}\right)\left(\frac{y}{\sigma_y(t)}\right) + \left(\frac{y}{\sigma_y(t)}\right)^2\right\}\right] \quad (55)$$

In formula (55), σx(t) and σy(t) are variable depending on the above-described impact time difference t. The impact time difference t can be determined by referring to time TMc accompanying the cumulative halftone data Out_c_sum. FIG. 21B schematically illustrates an example of the two-dimensional Gaussian filter LPF_b. Similar to the filter 2001, a filter 2002 has a square shape having a size of 3×3, although the size of the filter 2002 can be arbitrarily changed. For example, the filter 2002 may have a square shape having an appropriate size selected from the group including 5×5, 7×7, and 9×9 or a rectangular shape having an appropriate size selected from the group including 3×5, 5×7, and 5×9. However, to obtain sufficient effects, it is desired that the variables σx(t) and σy(t) have smaller values when the impact time difference t becomes smaller.

Figure 22:
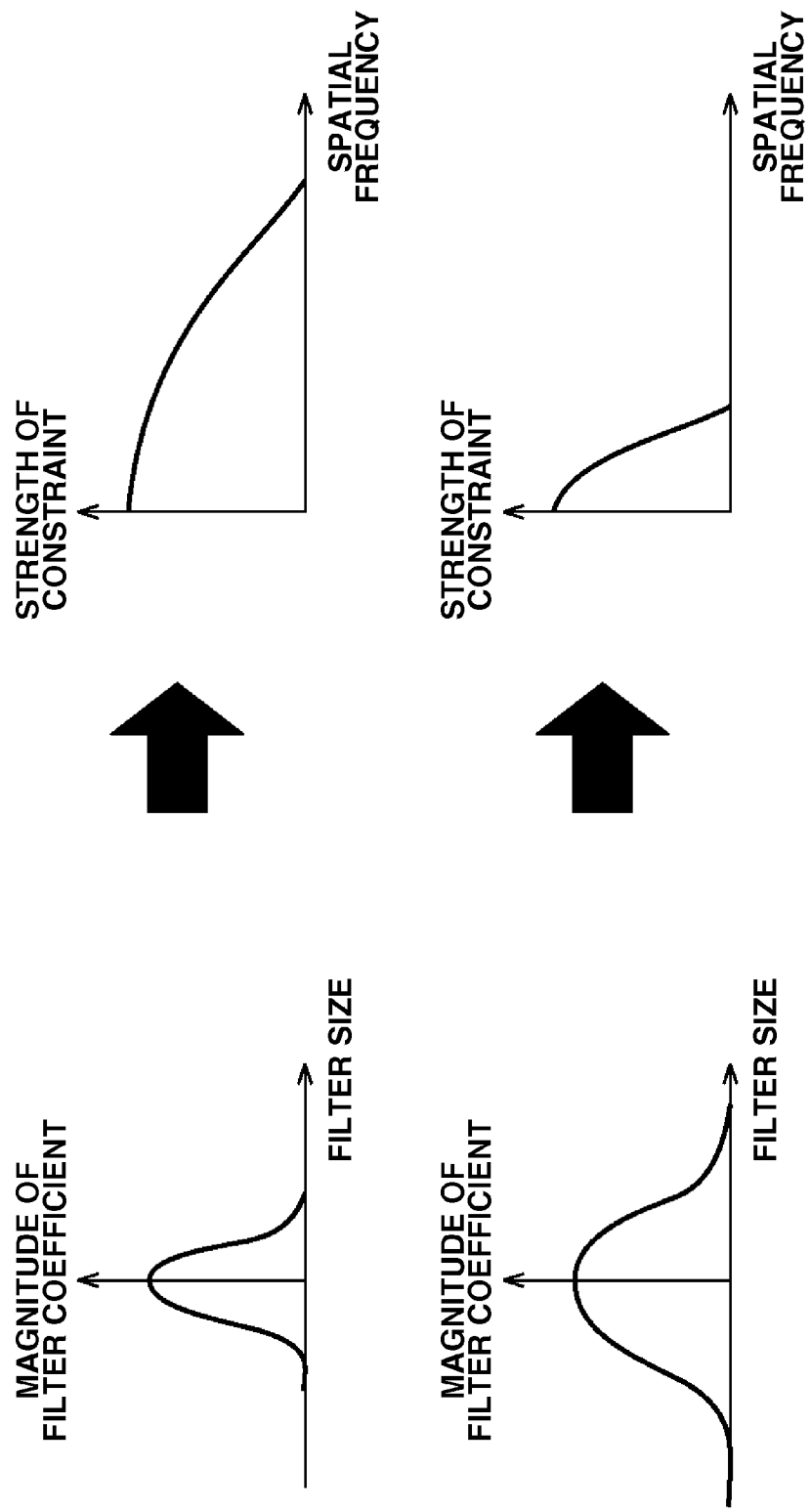
FIG. 22 schematically illustrates an example of a relationship between filter coefficient magnitude and constraint strength.

FIG. 22 schematically illustrates an example of a relationship between filter coefficient magnitude and constraint strength. As illustrated in FIG. 22, when a constraint range on an image of the filter is small, a constraint range in a frequency space becomes larger. As a result, a constraint frequency range becomes greater. Therefore, as described above, it is desired that the variables σx(t) and σy(t) have smaller values when the impact time difference t becomes smaller.

In general, in a case where printing of different colors in a predetermined scanning area is performed, there is only a very small difference in impact time between two dots of different colors formed on a sheet. In this case, if impact positions of these dots of different colors are substantially the same, these dots of different colors are mixed with each other. This is because the following dot is immediately formed after the preceding dot in the same scanning area in a state where the preceding dot is not completely dried on the sheet. To avoid this situation, it is necessary to enhance the constraint when the printing of different colors is performed in the same scanning area, compared to that in an ordinary printing, to separate an impact of a preceding dot from an impact of the following different color dot.

As illustrated in FIGS. 21A and 21B, similar to the two-dimensional Gaussian filter F_m (i.e., the filter 2001), the two-dimensional Gaussian filter LFP_b (i.e., the filter 2002) has filter coefficients variable depending on the impact time difference t existing before an impact of a next magenta dot. Although the two-dimensional Gaussian filters F_m and LPF_b (i.e., the filters 2001 and 2002) illustrated in FIGS. 21A and 21B use the same filter coefficients, these filters can use different filter coefficients. For example, the filter coefficients can be set in such a manner that the strength of a constraint according to constraint information applied to the rearward path scanning can be enhanced over the strength of a constraint according to constraint information applied to the forward path scanning.

Then, the cumulative halftone data add-up unit 412 adds cumulative halftone data Out_c_sum_LPF(0) to Out_c_sum_LPF(3) having been subjected to the filter processing and obtains cumulative halftone image data Out_c_sum_LPF. More specifically, the cumulative halftone data filter processing unit 406 performs calculation according to the following formula (56).

$$\text{Out\_C\_sum\_LPF} = \sum_{i=0}^{3} \text{Out\_C\_sum\_LPF}(i) \quad (56)$$

In step S307, a subtraction unit 407 subtracts the data calculated by the cumulative halftone data filter processing unit 406 from the data calculated by the cumulative scan duty filter processing unit 405. More specifically, the subtraction unit 407 subtracts cumulative halftone image data Out_c_sum_LPF from the cumulative scan duty data C_sum_df. In step S308, a weight multiplication unit 408 multiplies the value calculated in step 307 with a weight coefficient h1 (real number) to obtain constraint information CM_r. The above-described processing in steps S307 and S308 can be expressed using the following formula (57).

$$CM\_r \leftarrow (-\text{Out}\_c\_\text{sum}\_LPF + C\_\text{sum}\_df) \times h1 \quad (57)$$

In step S309, a constraint information data buffer adding unit 409 adds the constraint information CM_r data obtained by formula (57) to pre-update CM constraint information data to obtain constraint information CM_r reflecting the cyan dot layout. Then, the constraint information data buffer adding unit 409 stores the constraint information CM_r as constraint information of the magenta halftone processing.

In step S310, a cumulative scan duty data shift unit 410 shifts the cumulative scan duty data C_sum_d stored in the cumulative scan duty buffer 403 upward by an amount corresponding to one sheet feed amount LF (=Nzzl/Pass=16/4=4). In this case, the following formula (58) can be used to calculate the shifted cumulative scan duty data C_sum_d. Further, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied.

$$C\_\text{sum}\_d(nx,ny) = C\_\text{sum}\_d(nx,ny+LF) \quad (58)$$

In formula (58), if ny+LF≧Nzzl, then C_sum_d(nx, ny)=0. More specifically, C_sum_d(nx, ny) is set to 0 for the lower-end nozzles corresponding to the sheet feed amount LF (in this case, four nozzles).

In step S311, a cumulative halftone data shift unit 411 increments by one the subscript of each cumulative halftone data Out_c_sum(0) to Out_c_sum(2) to replace the content of the cumulative halftone buffer 404 (see formula (59)). Further, to replace the value of the elapsed time TM, the cumulative halftone data shift unit 411 adds a time t existing before an impact of the following magenta dot to the elapsed time TM accompanying each cumulative halftone data. In this case, the elapsed time TM about cyan is synchronized with the elapsed time TM about magenta (see formulae (60) and (61)), because the constraint information is commonly used for cyan and magenta.

$$\text{Out}\_c\_\text{sum}(n) \leftarrow \text{Out}\_c\_\text{sum}(n-1) \quad (59)$$

$$TMc(n) \leftarrow TMc(n-1)+t \quad (60)$$

$$TMm(n) \leftarrow TMm(n-1)+t \quad (61)$$

where n=1 to 3.

Through the above-described processing, the constraint information calculation unit 111 terminates the constraint information calculation processing in step S109 illustrated in FIG. 4. In step S110, the constraint information calculation unit 111 updates the CM constraint information (i.e., the constraint information buffer 109) commonly used for cyan and magenta based on a calculation result of the CM constraint information.

In step S111, the halftone processing unit 108 performs magenta halftone processing. The magenta halftone processing is performed for converting a sum value of "magenta scan duty data" stored in the scan duty buffer 107 and the constraint information stored in the constraint information buffer 109 into a 2-level gradation value (i.e., binary data) As the constraint information buffer 109 according to the present exemplary embodiment is commonly used for cyan and magenta, the constraint information buffer 109 has a buffer configuration illustrated in FIG. 12.

Figure 23:
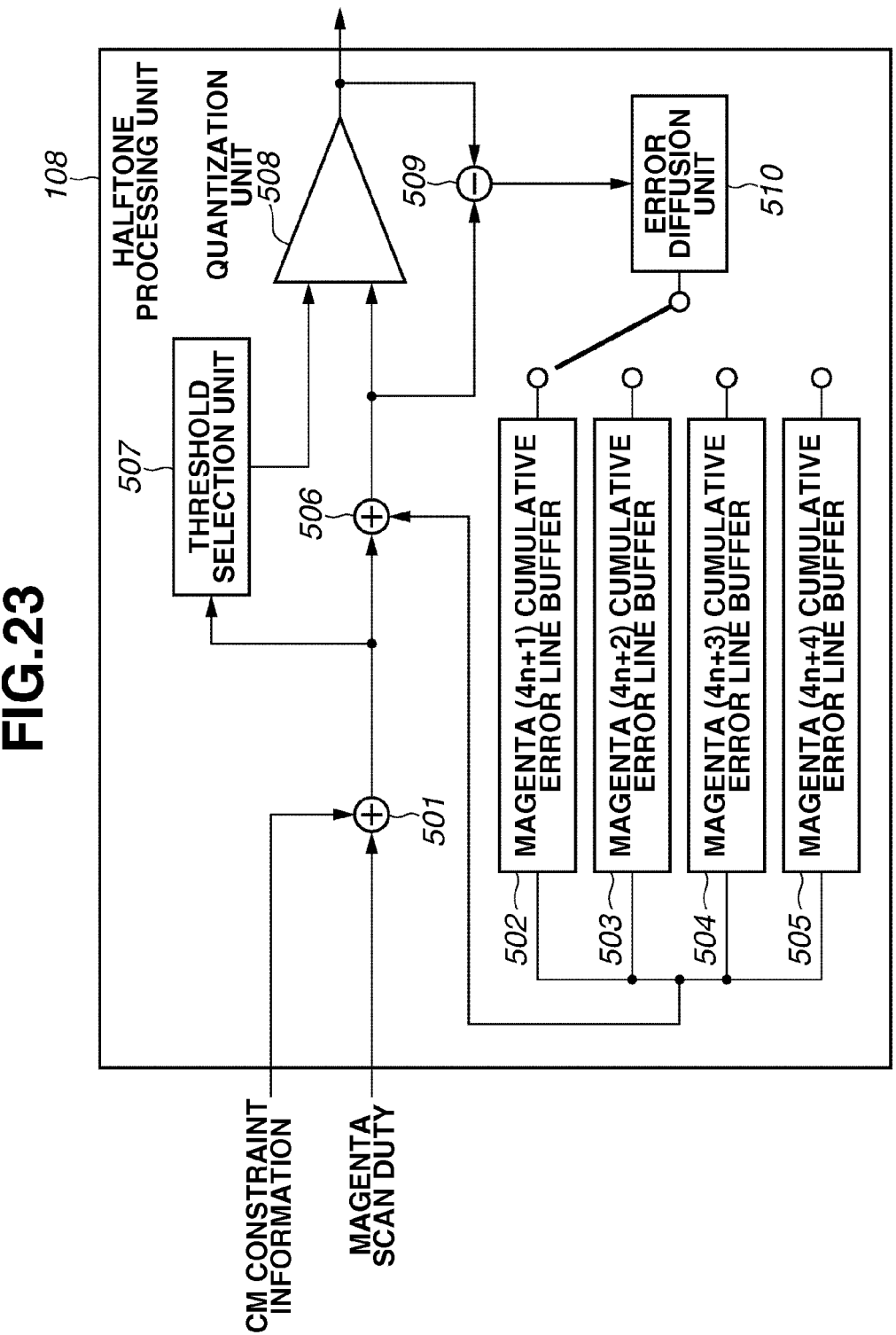
FIG. 23 illustrates an example of a detailed configuration of magenta halftone processing that can be performed by the halftone processing unit.
Figure 24:
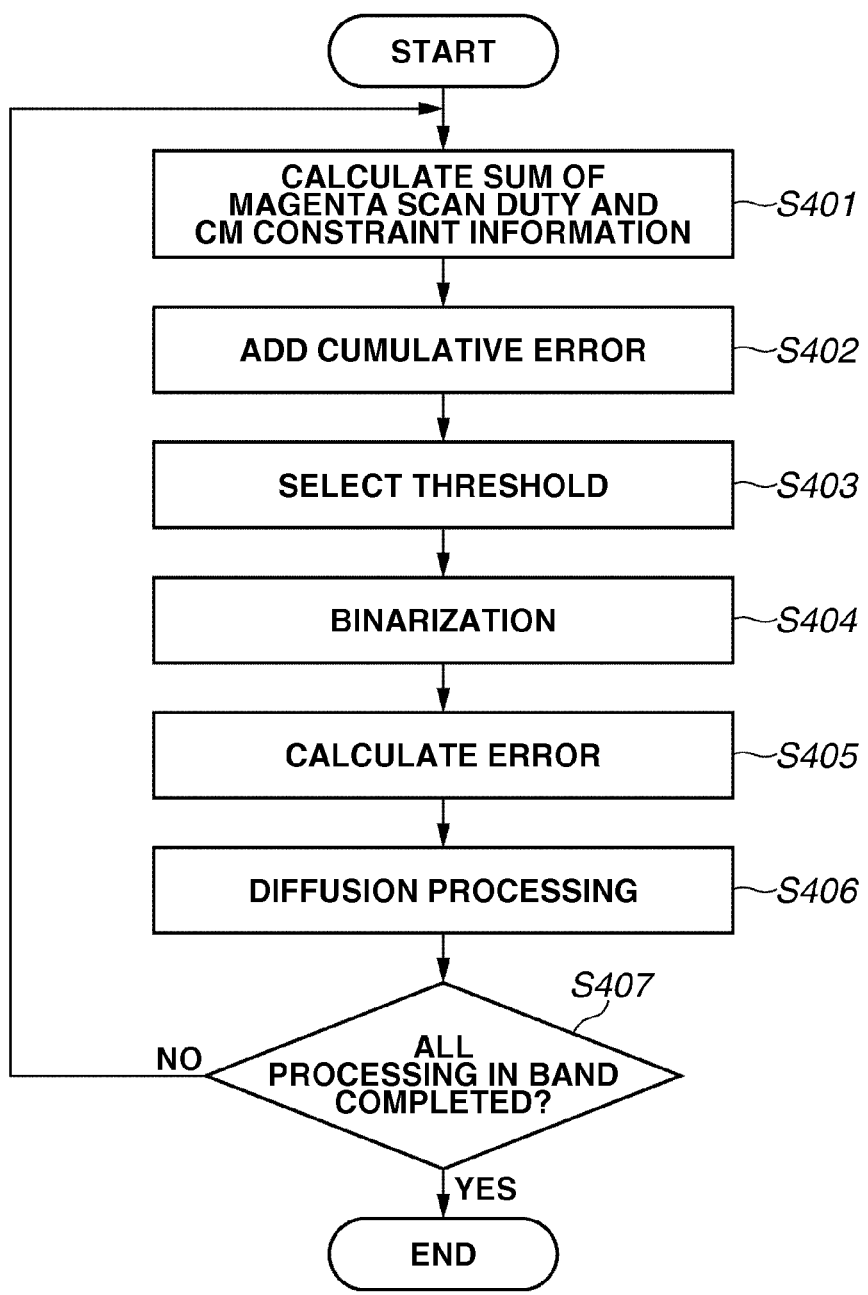
FIG. 24 is a flowchart illustrating an example of detailed magenta halftone processing that can be performed by the halftone processing unit.

The magenta halftone processing is described below in detail. FIG. 23 illustrates an example of a detailed configuration of the magenta processing that can be performed by the halftone processing unit 108. FIG. 24 is a flowchart illustrating an example of detailed magenta halftone processing that can be performed by the halftone processing unit 108.

First, in step S401 illustrated in FIG. 24, a constraint information adding unit 501 illustrated in FIG. 23 inputs a sum of magenta scan duty and constraint information. More specifically, the constraint information adding unit 501 calculates "pixel data Im of a target pixel" as a sum value of magenta scan duty (M_d) and constraint information commonly used for cyan and magenta (i.e., CM constraint information) CM_r according to the following formula (62). However, the constraint information CM_r input in this case reflects the cyan constraint information as defined in formula (57).

$$Im = M\_d + CM\_r \quad (62)$$

In step S402, a cumulative error adding unit 506 adds a cumulative error for the error diffusion processing. An example of cumulative error addition processing is described below in detail. In the present exemplary embodiment, four error diffusion coefficients K1 to K4 illustrated in FIG. 15 can be used for the error diffusion processing. To diffuse and accumulate errors using the error diffusion coefficients K1 to K4, the halftone processing unit 108 includes four sets of magenta cumulative error line buffers 502 to 505 and selects an appropriate one of the cumulative error line buffers 502 to 505 to be used for each scan number in the following manner.

More specifically, when the scan number k is 1, 5, ..., 4n+1 (n is an integer equal to or greater than 0), the halftone processing unit 108 uses the magenta (4n+1) cumulative error line buffer 502. When the scan number k is 2, 6, ..., 4n+2, the halftone processing unit 108 uses the magenta (4n+2) cumulative error line buffer 503. When the scan number k is 3, 7, ..., 4n+3, the halftone processing unit 108 uses the magenta (4n+3) cumulative error line buffer 504. When the scan number k is 4, 8, ..., 4n+4, the halftone processing unit 108 uses the magenta (4n+4) cumulative error line buffer 505.

Each of the cumulative error line buffers 502 to 505 has four sets of storage areas 1505 to 1508 as illustrated in FIG. 16B. More specifically, each of the cumulative error line buffers 502 to 505 has four storage areas 1505 to 1508 of "Em1_0, Em1($x$)", "Em2_0, Em2($x$)", "Em3_0, Em3($x$)", and "Em4_0, Em4($x$)." For example, the magenta (4n+1) cumulative error line buffer 502 has a single storage area Em1_0 and a plurality of storage areas Em1_($x$) ($x$=1 to W) the number of which is equal to the number W of pixels of input image data in the horizontal direction. The magenta cumulative error line buffers 502 to 505 are all initialized to 0 in the processing starting when the scan number k is 1, 2, 3, 4 (k=1, 2, 3, 4). For example, in the processing starting when the scan number k is 5, the magenta (4n+1) cumulative error line buffer 502 is not initialized.

In a case where the scan number k is 1 (i.e., k=1), the halftone processing unit 108 executes error diffusion processing using the magenta (4n+1) cumulative error line buffer 502. More specifically, the cumulative error adding unit 506 adds an error Em1($x$) corresponding to a pixel position x of an input pixel data in the horizontal direction to the sum value of the magenta scan duty and the CM constraint information. More specifically, the following formula (63) can be established when Im represents the pixel data of a target pixel input from the constraint information adding unit 501 and Im' represents the pixel data of the target pixel having been added with the cumulative error.

$$Ic' = Ic + Ec1(x) \quad (63)$$

In step S403, a threshold selection unit 507 selects a threshold T. For example, the threshold T can be set according to the following formula (64).

$$T = 128 \quad (64)$$

Alternatively, to eliminate any delay in dot generation, the threshold T can be finely set according to the following formula (65) so that the threshold T changes according to the magenta scan duty (M_d) to reduce an average quantization error.

$$T = f(M\_d) \quad (65)$$

In step S404, a quantization unit 508 compares pixel data Im' of the error added target pixel with the threshold T and determines an output pixel value Out_m as a dot binarization result according to the following rules defined by formulae (66) and (67).

If Im'<T, then $$Out\_m = 0 \quad (66)$$

If Im'>T, then $$Out\_m = 255 \quad (67)$$

In step S405, an error calculation unit 509 calculates a difference Err_m between the pixel data Im' (i.e., error added pixel data Im) of the target pixel and the output pixel value Out_m according to the following formula (68).

$$Err\_m(x) = Im' - Out\_m \quad (68)$$

In step S406, an error diffusion unit 510 diffuses the error. More specifically, the error diffusion unit 510 performs processing for diffusing the error Err_m(x) at the pixel position x in the horizontal direction, using the magenta (4n+1) cumulative error line buffer 502, according to the following formula (69).

$$Em1(x+1) \leftarrow Em1(x+1) + Err\_m(x) \times 7/16 \, (x<W)$$

$$Em1(x-1) \leftarrow Em1(x-1) + Err\_m(x) \times 3/16 \, (x>1)$$

$$Em1(x) \leftarrow Em1\_0 + Err\_m(x) \times 5/16 \, (1<x<W)$$

$$Em1(x) \leftarrow Em1\_0 + Err\_m(x) \times 8/16 \, (x=1)$$

$$Em1(x) \leftarrow Em1\_0 + Err\_m(x) \times 13/16 \, (x=W)$$

$$Em1\_0 \leftarrow Err\_m(x) \times 1/16 \, (x<W)$$

$$Em1\_0 \leftarrow 0 \, (x=W) \quad (69)$$

Through the above-described processing, the halftone processing unit 108 can complete binarization (quantization value=0 or 255) of a magenta pixel, i.e., when the scan number k is 1 (i.e., k=1). In step S407, it is determined whether the above-described processing in steps S401 to S406 has been completed for all pixels in a band. When the processing in steps S401 to S406 has been completed for all pixels in the band (YES in step S407), the halftone processing unit 108 can determine a dot position of magenta halftone data, i.e., ON/OFF of each magenta dot.

Figure 25:
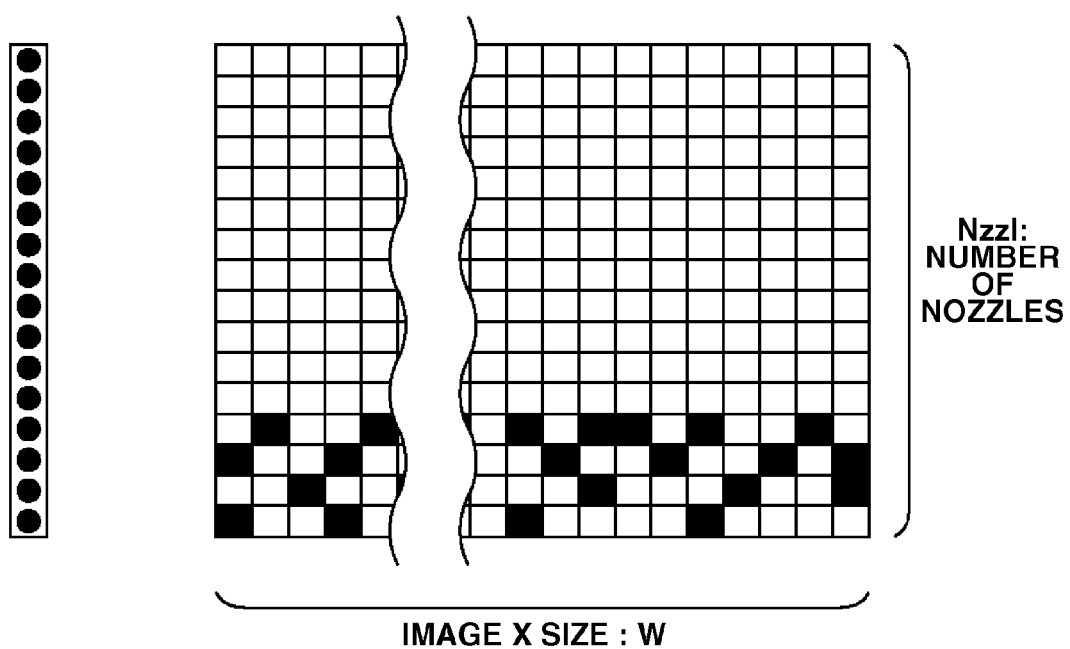
FIG. 25 schematically illustrates a result of the halftone processing performed on the magenta scan duty in a case where the scan number k is 1, which is stored in the halftone image storage buffer.

Referring back to FIG. 4, after completing the magenta halftone processing in step S111, the halftone processing unit 108 performs the following processing. More specifically, in step S112, the halftone processing unit 108 stores the "binary image data of magenta" obtained by executing the halftone processing in the halftone image storage buffer 110. FIG. 25 schematically illustrates a result of the halftone processing performed on the magenta scan duty in a case where the scan number k is 1 (i.e., k=1), which is stored in the halftone image storage buffer 110. As illustrated in FIG. 25, the halftone image storage buffer 110 stores "binary image data of the number of nozzles (Nzzl)×image size in the X-axis direction (image X size: W)" corresponding to the pixel position of the scan duty.

In step S113, the image output terminal 112 transfers "halftone band data of magenta (binary image data)" having a vertical size corresponding to the number of nozzles and a horizontal size corresponding to the image X size, which is a part of the band data stored in the halftone image storage buffer 110, to an external device. In step S114, the constraint information calculation unit 111 calculates CM constraint information based on a magenta dot layout.

Figure 26:
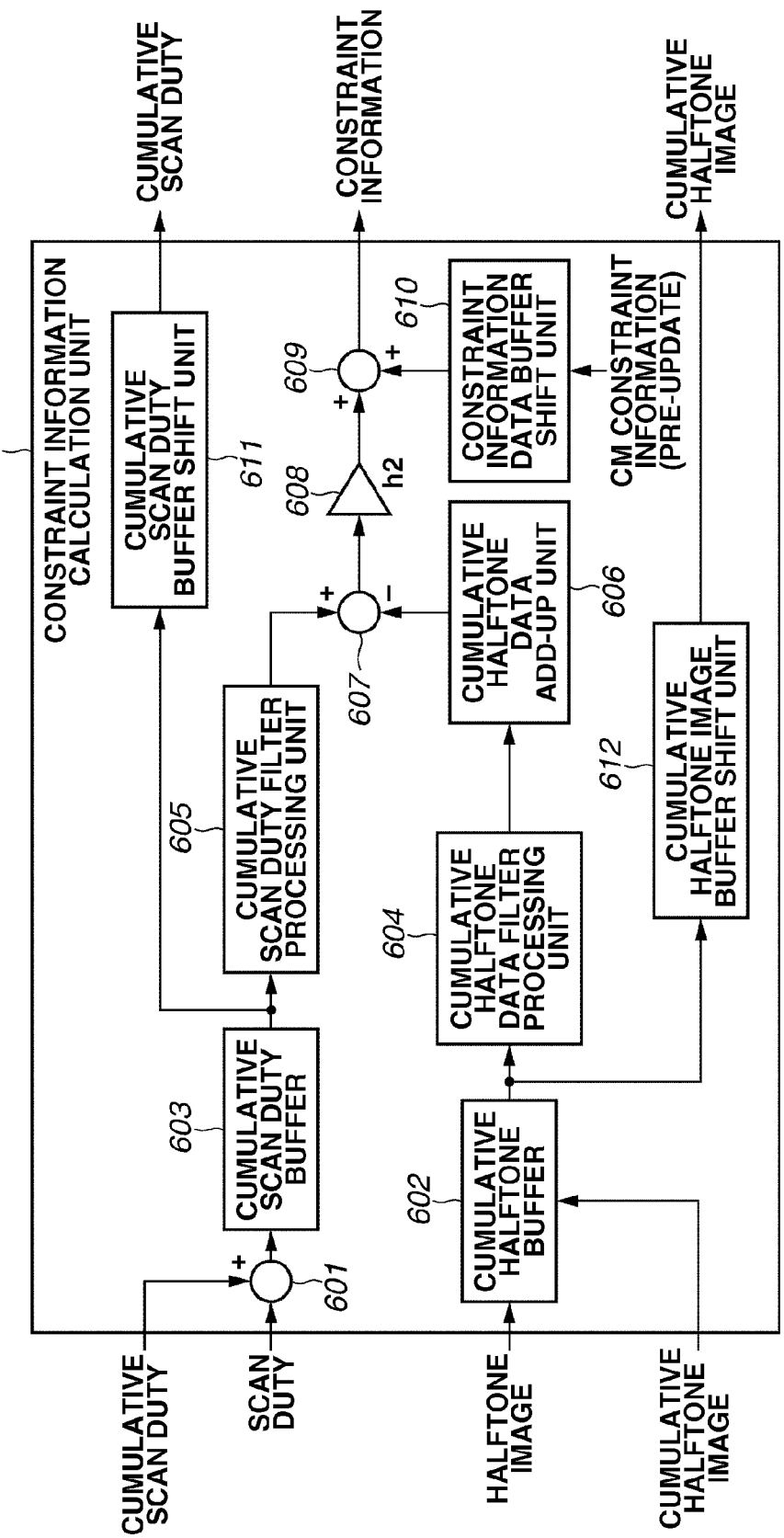
FIG. 26 illustrates an example of a detailed configuration of magenta processing that can be performed by the constraint information calculation unit.
Figure 27:
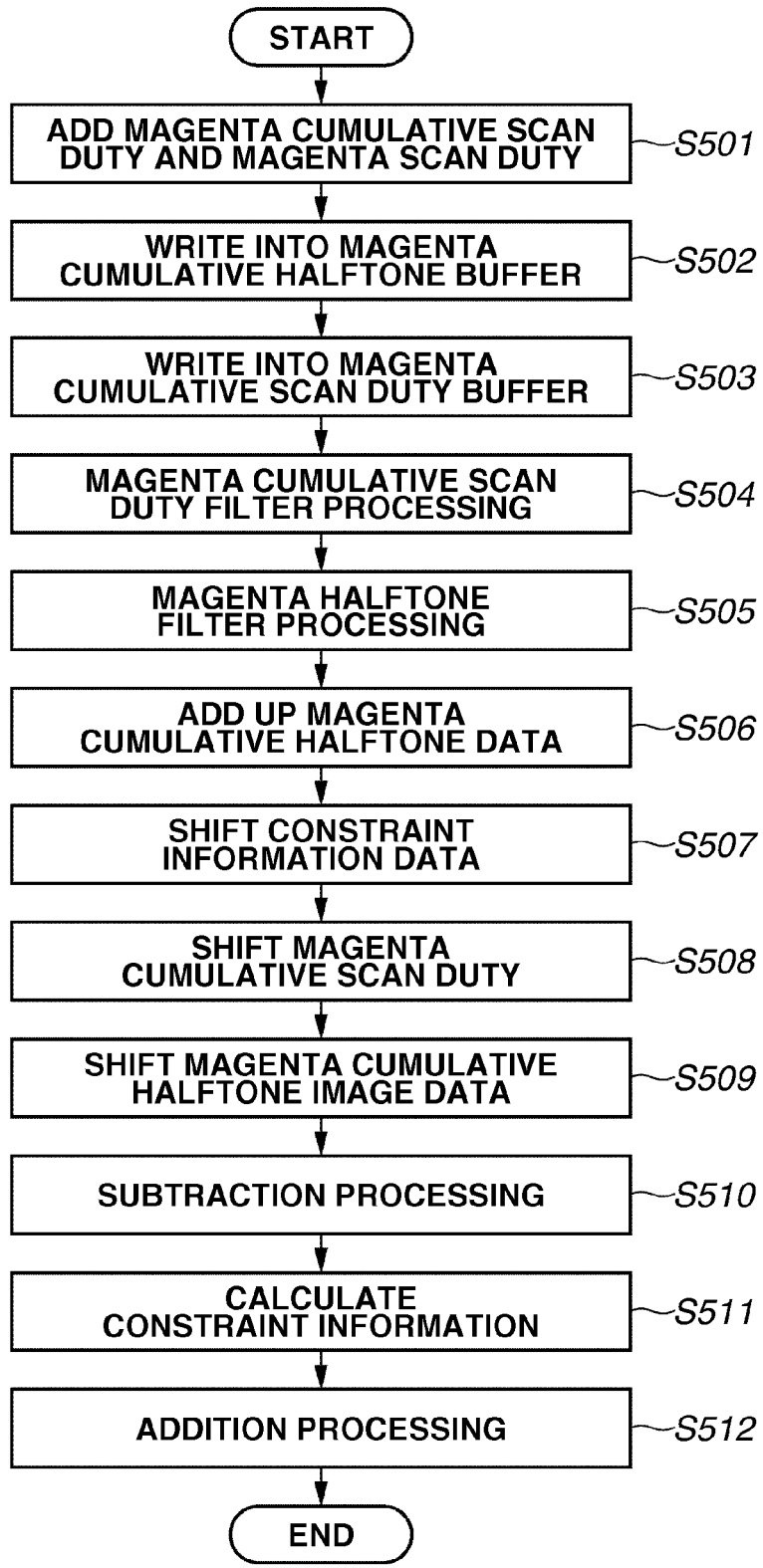
FIG. 27 is a flowchart illustrating an example of detailed processing for calculating the CM constraint information that can be performed by the constraint information calculation unit.

An example of the processing in step S114, i.e., the processing for calculating the CM constraint information based on the magenta dot layout, is described below in more detail. FIG. 26 illustrates an example of a detailed configuration of magenta processing that can be performed by the constraint information calculation unit 111. FIG. 27 is a flowchart illustrating an example of detailed processing for calculating the CM constraint information that can be performed by the constraint information calculation unit 111. The configuration illustrated in FIG. 26 may further include a unit corresponding to the adding unit 402.

First, in step S501 illustrated in FIG. 27, an adding unit 601 illustrated in FIG. 26 adds magenta scan duty data in the scan duty buffer 107 and data stored in a cumulative scan duty buffer 603. Regarding the magenta processing in the forward path, the following formula (70) can be used to calculate the cumulative scan duty data M_sum_d' having been processed in step S501 (i.e., addition processing).

$$M\_sum\_d' = M\_d + M\_sum\_d \quad (70)$$

In step S502, a cumulative halftone buffer 602 adds halftone image data to cumulative halftone image data. In step S503, the adding unit 601 writes the cumulative scan duty data M_sum_d' calculated according to formula (70) in the cumulative scan duty buffer 603. Thus, the following formula (71) can be established.

$$M\_sum\_d \leftarrow M\_sum\_d' \quad (71)$$

In step S504, a cumulative scan duty filter processing unit 605 performs filter processing on M_sum_d stored in the cumulative scan duty buffer 603. In this filter processing, the cumulative scan duty filter processing unit 605 uses a two-dimensional Gaussian filter F_m(t, x, y) that is variable depending on a time difference t existing before an impact of a cyan dot of the next pass. Then, the cumulative scan duty filter processing unit 605 calculates cumulative scan duty data M_sum_df having been subjected to the filter processing according to the following formula (73).

$$M\_sum\_df = M\_sum\_d * F\_m(t,x,y) \quad (73)$$

In formula (73), * indicates convolution and t represents an impact time difference between a preceding impact of a magenta dot and a subsequent impact of a cyan dot. In the present exemplary embodiment, the two-dimensional Gaussian filter F_m can take two values according to the impact time difference t. For example, in a case where the following cyan dot is printed together with the preceding magenta dot in the same scanning operation, the cumulative scan duty filter processing unit 605 uses a two-dimensional Gaussian filter F_m corresponding to t<0.1. On the other hand, in a case where the following cyan dot is printed in the next scanning operation, the cumulative scan duty filter processing unit 605 uses a two-dimensional Gaussian filter F_m corresponding to t≧0.1.

In the present exemplary embodiment, the cumulative scan duty filter processing unit 605 uses two Gaussian filters according to the impact time difference t. However, the cumulative scan duty filter processing unit 605 can use three or more Gaussian filters. The two-dimensional Gaussian filter F_m can be expressed using the above-described formulas (51) and (52) and t can be determined by referring to time TMm accompanying the cumulative halftone data Out_m_sum.

Figure 28:
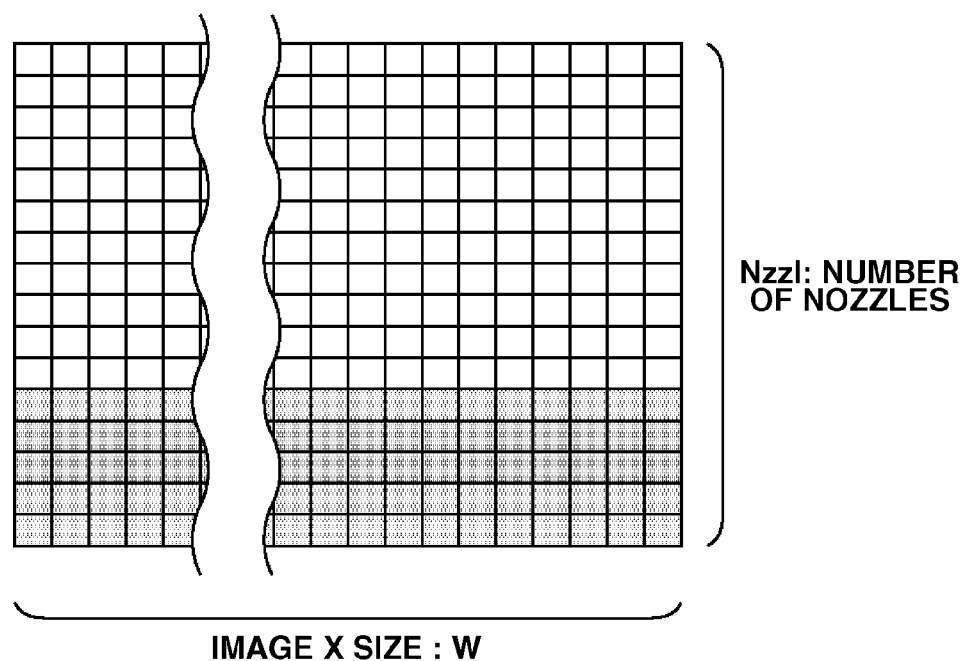
FIG. 28 schematically illustrates an example of scan duty data having been subjected to the filter processing.

FIG. 28 schematically illustrates an example of the scan duty data having been subjected to the filter processing. As described above, FIG. 21A illustrates an example of the two-dimensional Gaussian filter F_m that can be used in the magenta processing. To simplify the following description, a filter 2003 has a square shape having a size of 5×5, although the size of the filter 2003 can be arbitrarily changed. For example, the filter 2003 may have a square shape having an appropriate size selected from the group including 7×7 and 9×9 or a rectangular shape having an appropriate size selected from the group including 3×5, 5×7, and 5×9.

In step S505, a cumulative halftone data filter processing unit 604 performs filter processing on Out_m_sum(0) to Out_m_sum(3) stored in the cumulative halftone buffer 602. In this filter processing, the cumulative halftone data filter processing unit 604 uses the two-dimensional Gaussian filter LPF_b(t, x, y) that is variable depending on the impact time difference t. More specifically, the cumulative halftone data filter processing unit 604 calculates the cumulative halftone data Out_m_sum_LPF(0) to Out_m_sum_LPF(3) having been subjected to the filter processing according to the above-described formulae (53) to (55). In this case, t can be determined referring to time TMm accompanying the cumulative halftone data Out_m_sum.

The filter illustrated in FIG. 21B is an example of the two-dimensional Gaussian filter LPF_b. Similar to the filter 2003, the filter 2004 has a square shape having a size of 5×5, although the size of the filter 2004 can be arbitrarily changed. For example, the filter 2004 may have a square shape having an appropriate size selected from the group including 7×7 or 9×9 or a rectangular shape having an appropriate size selected from the group including 3×5, 5×7, and 5×9. However, to obtain sufficient effects, it is desired that the variables σx(t) and σy(t) have smaller values when the impact time difference t becomes larger. It is desired that the two-dimensional Gaussian filter LPF_b has low-pass characteristics.

As illustrated in FIGS. 21A and 21B, similar to the two-dimensional Gaussian filter F_m (i.e., the filter 2003), the two-dimensional Gaussian filter LFP_b (i.e., the filter 2004) has filter coefficients variable depending on the impact time difference t existing before an impact of a next cyan dot. Although the two-dimensional Gaussian filters F_m and LPF_b (i.e., the filters 2003 and 2004) illustrated in FIGS.

21A and 21B use the same filter coefficients, these filters can use different filter coefficients.

In step S506, a cumulative halftone data add-up unit 606 adds up the cumulative halftone data Out_m_sum_LPF(0) to Out_m_sum_LPF(3) having been subjected to the filter processing (see step S505) according to formula (56). Then, the cumulative halftone data add-up unit 606 obtains a cumulative halftone image data Out_m_sum_LPF.

In step S507, a constraint information data buffer shift unit 610 shifts the constraint information CM_r written in the constraint information buffer 109 upward by an amount corresponding to one sheet feed amount LF (=Nzzl/Pass=16/4=4). In this case, the following formula (74) can be used to calculate the shifted constraint information. Further, two conditions $0 \leq nx <$ image X size (i.e., image size in the X-axis direction (i.e., the horizontal direction=the head moving direction)) and $0 \leq ny < Nzzl$ (i.e., total number of nozzles constituting the nozzle array=16) are both satisfied.

$$CM\_r(nx,ny)=CM\_r(nx,ny+LF) \quad (74)$$

In formula (74), if $ny+LF \geq Nzzl$, then CM_r(nx, ny)=0. More specifically, CM_r(nx, ny) is set to 0 for the lower-end nozzles corresponding to the sheet feed amount LF (in this case, four nozzles).

As described above, to calculate constraint information for the next scan number k, it is necessary to relatively shift the sheet feed amount LF upward and further input 0 to the constraint information CM_r for the lower-end nozzles corresponding to the sheet feed amount LF. In the magenta processing, the reason why the constraint information CM_r is shifted by an amount equivalent to the sheet feed amount LF is because both cyan and magenta halftone image (i.e., binary image) data in the same scan number k are already processed. Further, in the present exemplary embodiment, the constraint information is commonly used for cyan and magenta. Therefore, after both the cyan and magenta dot layouts in the same scan number k are determined, the constraint information CM_r is shifted upward by the amount equivalent to the sheet feed amount LF.

In step S508, a cumulative scan duty data shift unit 611 shifts the cumulative scan duty data M_sum_d stored in the cumulative scan duty buffer 603 upward by an amount corresponding to one sheet feed amount LF (=Nzzl/Pass=16/4=4). In this case, the following formula (75) can be used to calculate the shifted cumulative scan duty data M_sum_d. Further, two conditions $0 \leq nx <$ image X size (i.e., image size in the X-axis direction (i.e., the horizontal direction=the head moving direction)) and $0 \leq ny < Nzzl$ (i.e., total number of nozzles constituting the nozzle array=16) are both satisfied.

$$M\_sum\_d(nx,ny)=M\_sum\_d(nx,ny+LF) \quad (75)$$

Figure 29:
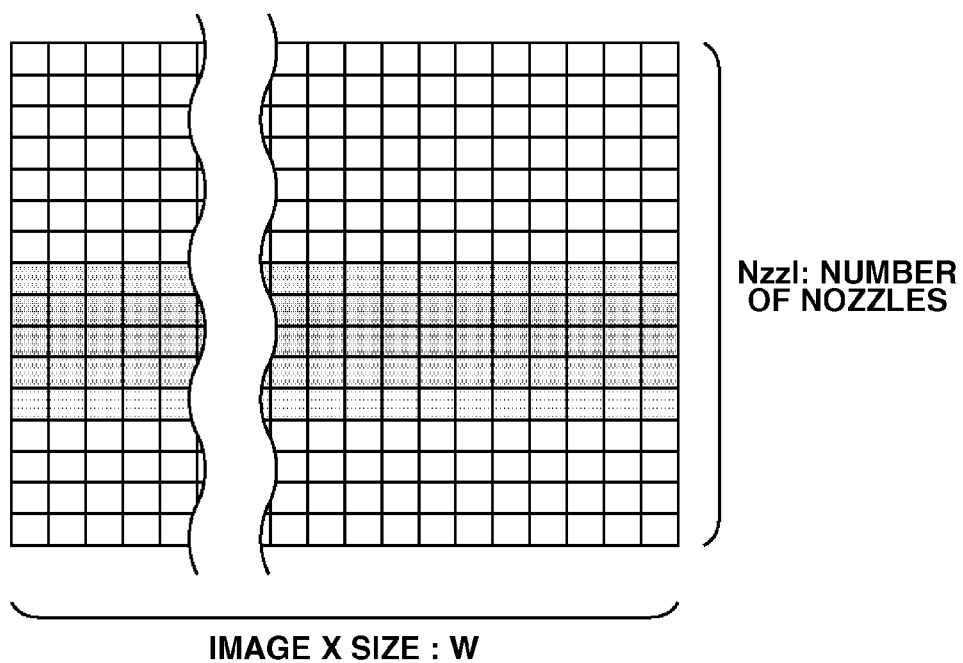
FIG. 29 schematically illustrates an example of shifted scan duty data.

In formula (75), if $ny+LF \geq Nzzl$, then M_sum_d(nx, ny)=0. More specifically, M_sum_d(nx, ny) is set to 0 for the lower-end nozzles corresponding to the sheet feed amount LF (in this case, four nozzles). FIG. 29 schematically illustrates an example of shifted scan duty data.

In step S509, a cumulative halftone data shift unit 612 increments the subscript of each cumulative halftone data Out_m_sum(0) to Out_m_sum(2) to replace the content of the cumulative halftone buffer 602 (see formula (76)). Further, the cumulative halftone data shift unit 612 adds a time t existing before an impact of the following cyan dot to the elapsed time TM accompanying each cumulative halftone image data. Furthermore, the cumulative halftone data shift unit 612 replaces the value of the elapsed time TM. In this case, the elapsed time TM about cyan is synchronized with the elapsed time TM about magenta (see formulae (77) and (78)), because the constraint information is commonly used for cyan and magenta.

$$\text{Out}\_m\_sum(n) \leftarrow \text{Out}\_m\_sum(n-1) \quad (76)$$

$$TMm(n) \leftarrow TMm(n-1)+t \quad (77)$$

$$TMc(n) \leftarrow TMc(n-1)+t \quad (78)$$

However, n=1 to 3.

Figure 30:
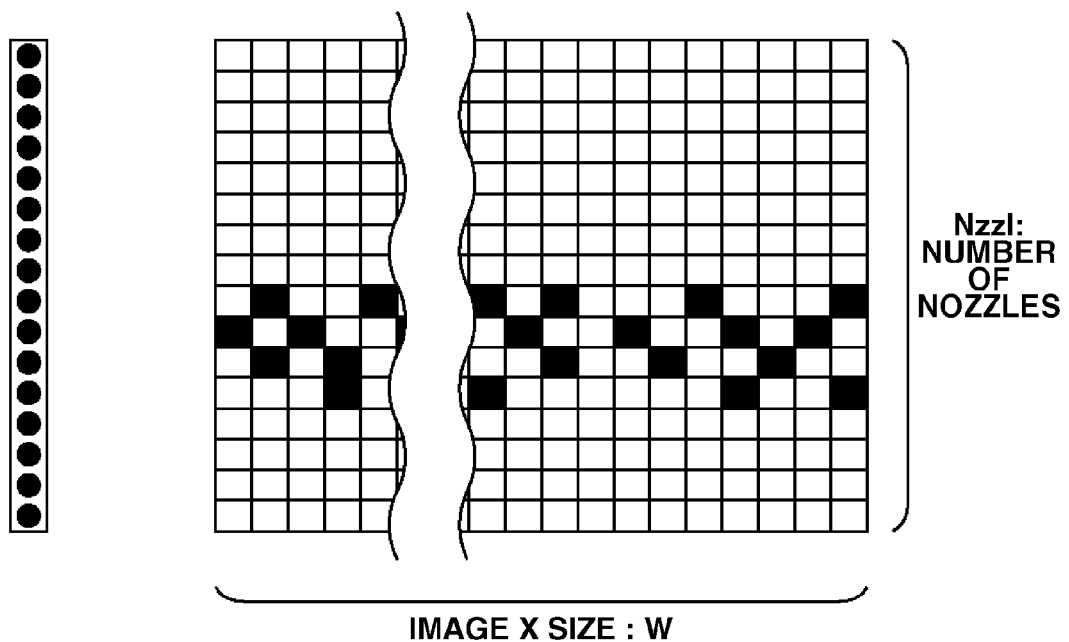
FIG. 30 schematically illustrates an example of shifted halftone image data.

FIG. 30 schematically illustrates an example of shifted halftone image data.

In step S510, a subtraction unit 607 subtracts the data calculated by the cumulative halftone data filter processing unit 604 from the data calculated by the cumulative scan duty filter processing unit 605. More specifically, the subtraction unit 407 subtracts the cumulative halftone image data Out_m_sum_LPF from the cumulative scan duty data M_sum_df. In step S511, a weight multiplication unit 608 multiplies the value calculated in step 510 with a weight coefficient h2 (real number) to obtain constraint information CM_r. The above-described processing in steps S510 and S511 can be expressed using the following formula (79).

$$CM\_r \leftarrow (-\text{Out}\_m\_sum\_LPF+M\_sum\_df) \times h2 \quad (79)$$

In step S512, a constraint information data buffer adding unit 609 adds the constraint information CM_r data obtained by formula (79) to the shifted CM constraint information data (i.e., pre-update CM constraint information). Thus, the constraint information data buffer adding unit 609 obtains constraint information CM_r reflecting the cyan/magenta dot layout. The following formula (80) can be used to calculate the constraint information CM_r reflecting the cyan/magenta dot layout, through the above-described steps S510 to S512.

$$CM\_r \leftarrow (-\text{Out}'\_m\_LPF+M'\_df) \times h2+CM'\_r \quad (80)$$

Through the above-described processing, the constraint information calculation unit 111 terminates the processing in step S114 illustrated in FIG. 4, i.e., the processing for calculating the CM constraint information based on the magenta dot layout.

In step S115, the constraint information calculation unit 111 updates the CM constraint information (i.e., the constraint information buffer 109) commonly used for cyan and magenta based on a calculation result of the CM constraint information. The updated CM constraint information can be referred to as information to be used to determine a dot layout in the next scanning operation corresponding to the scan number k+1 and subsequent scanning operations.

In step S116, the printer 2 having received the halftone image data (i.e., binary image data) from the image processing apparatus 1 selects an ink color that accords with the image data and starts a printing operation. In step S116, the printer 2 performs forward path main scanning one time by moving the recording head 201 from left to right on a paper sheet or another sheet-like recording medium while driving each nozzle at predetermined driving intervals to record an image on the recording medium. Further, after the forward path main scanning is completed, the printer 2 performs sub scanning one time in a direction perpendicular to the main scanning.

In step S117, the scan duty setting unit 105 increments the scan number k by one. Then, the scan duty setting unit 105 sets the incremented scan number k and the segmenting position (i.e., color separation data segmenting position) Ycut(k) of the image data again.

In step S118, the scan duty setting unit 105 sets a duty value for the rearward path scanning based on the scan duty setting LUT 106 and each color separated image data. In the present exemplary embodiment, similar to the above-described printing operation in the forward path printing, if a corresponding nozzle is positioned outside an address area of the image in the Y-axis direction, the scan duty value is set to 0.

The above-described setting of the scan duty performed by the scan duty setting unit 105 can be expressed for cyan C(X, Y) using the above-described formulae (9) to (15). In this case, C_d(X,Y) indicates a scan duty at the address (X, Y) and S_LUT(Y) indicates a value of the scan duty setting LUT 106 at the address Y. Further, two conditions $0 \leq nx < $ image X size (i.e., image size in the X-axis direction (i.e., the horizontal direction=the head moving direction)) and $0 \leq ny < Nzzl$ (i.e., total number of nozzles constituting the nozzle array=16) are both satisfied. Moreover, in addition to the above-described threshold D_Th3, smaller thresholds D_Th2 and D_Th1 (D_Th3>D_Th2>D_Th1) are defined as another duty separation threshold.

When the value of the color separated image data is equal to or less than the duty separation threshold D_Th1, the recording head 201 is controlled to form an image by scanning one time as indicated by formulae (10) and (11). Further, when the value of the color separated image data is equal to or less than the duty separation threshold D_Th2, the recording head 201 is controlled to form an image by scanning two times as indicated by formulae (12) and (13). Furthermore, when the value of the color separated image data is equal to or less than the duty separation threshold D_Th3, the recording head 201 is controlled to form an image by scanning three times as indicated by formulae (14) and (15). Similarly, scan duty separation for Lc(X, Y), M(X, Y), Lm(X, Y), Y(X, Y), and K(X, Y) can be performed according to the above-described formulae.

As described above, in the present exemplary embodiment, scan duty values in the exceptional duty separation processing are set according to formulae (10) to (15) for the 4-pass printing. However, if any printing other than the 4-pass printing is performed, scan duty values in the exceptional duty separation processing can be set similarly. For example, if an 8-pass printing is performed, it is required to set duty separation thresholds D_Th1 to D_Th7 and set scan duty values in the exceptional duty separation processing.

In step S119, the scan duty data set by the scan duty setting unit 105 as described above is stored in the scan duty buffer 107. More specifically, the scan duty buffer 107 stores band-like scan duty data values for each color, whose Y-axis direction (i.e., the vertical direction) indicates the number of nozzles and whose X-axis direction (i.e., the horizontal direction) indicates the image size in the X-axis direction (image X size), as illustrated in FIG. 11.

Referring back to FIG. 4, in step S120, the halftone processing unit 108 performs magenta halftone processing. The magenta halftone processing is performed for converting a sum value of the "magenta scan duty data" stored in the scan duty buffer 107 and the constraint information stored in the constraint information buffer 109 into a 2-level gradation value (i.e., binary data).

As described above, in the present exemplary embodiment, the recording head 201 has cyan and magenta nozzles arrayed in this order from the left side thereof in the main scanning direction as illustrated in FIG. 2. Therefore, the color ink discharge order in the main scanning direction is reversed between the forward path scanning and the rearward path scanning. More specifically, in the rearward path scanning, the recording head 201 discharges magenta and cyan inks in this order. Therefore, in the rearward path scanning, the magenta halftone processing is first performed. On the other hand, in the forward path scanning, the cyan halftone processing is first performed.

Figure 31:
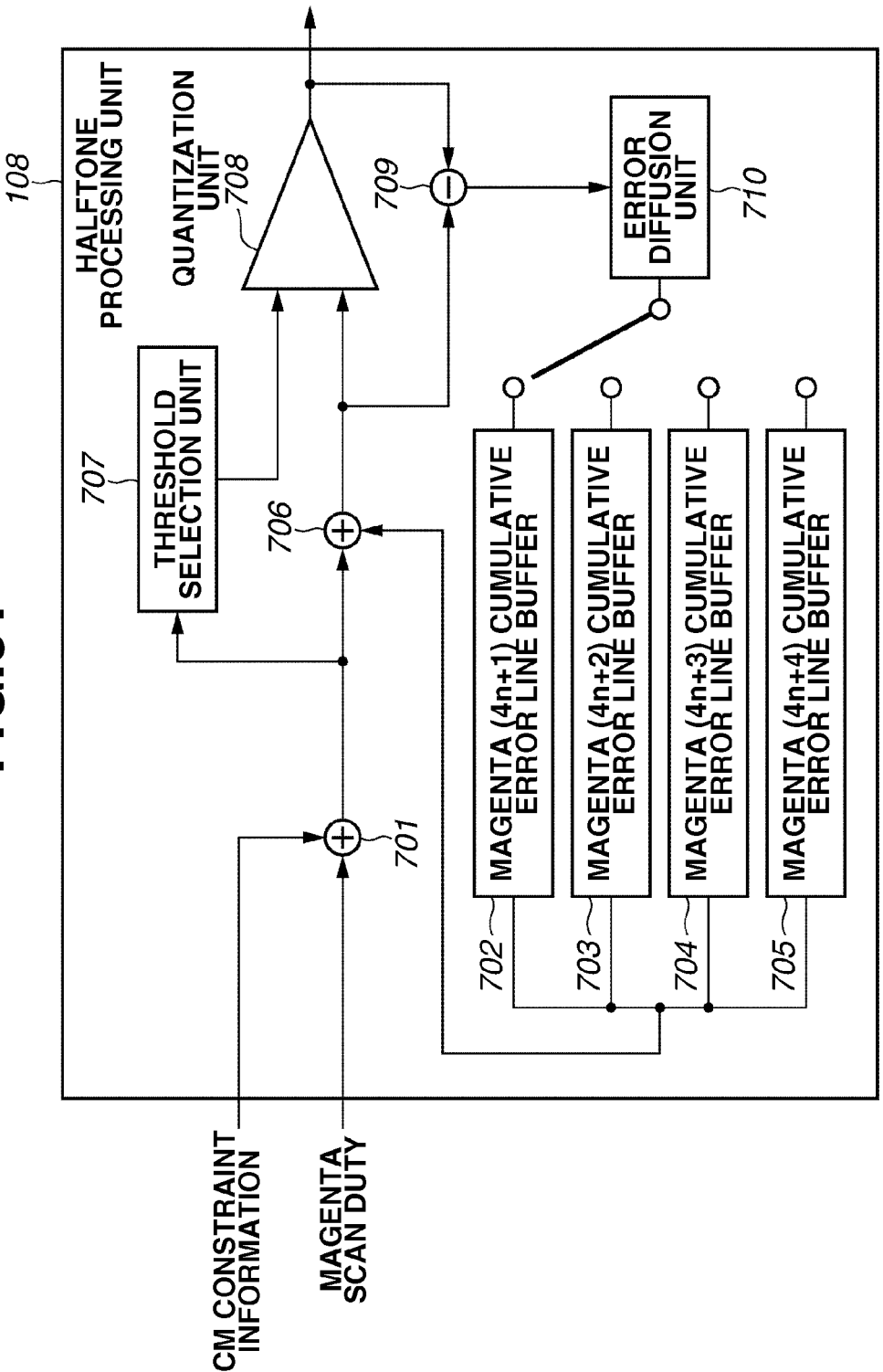
FIG. 31 illustrates an example of a detailed configuration of magenta processing that can be performed by the halftone processing unit.
Figure 32:
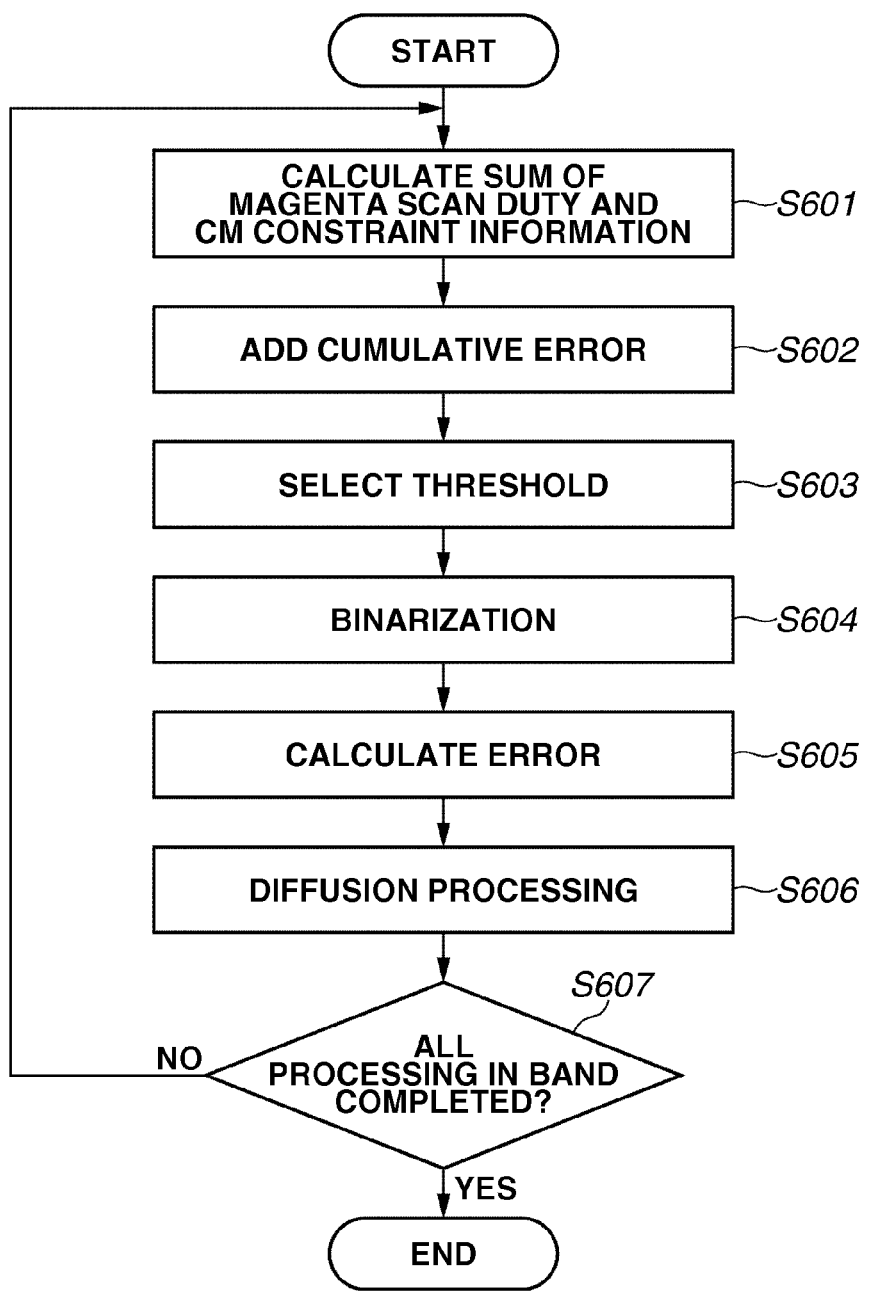
FIG. 32 is a flowchart illustrating an example of detailed magenta halftone processing that can be performed by the halftone processing unit.

Although detailed processing in the rearward path scanning is described below, processing to be applied to magenta data in the rearward path scanning is similar to the processing performed on cyan data in the forward path scanning, and processing to be applied to cyan data in the rearward path scanning is similar to the processing performed on magenta data in the forward path scanning. An example of the magenta halftone processing is described below in detail. FIG. 31 illustrates an example of a detailed configuration of magenta processing that can be performed by the halftone processing unit 108. FIG. 32 is a flowchart illustrating an example of detailed magenta halftone processing that can be performed by the halftone processing unit 108.

First, in step S601 illustrated in FIG. 32, a constraint information adding unit 701 illustrated in FIG. 31 inputs a sum of magenta scan duty and constraint information. More specifically, the constraint information adding unit 701 calculates "pixel data Im of a target pixel" as a sum value of magenta scan duty (M_d) and constraint information commonly used for cyan and magenta (i.e., CM constraint information) CM_r according to the following formula (81). However, the constraint information CM_r input in this case reflects the cyan and magenta constraint information as defined in formula (81).

$$Im = M\_d + CM\_r \tag{81}$$

In step S602, a cumulative error adding unit 706 adds a cumulative error for the error diffusion processing. An example of cumulative error addition processing is described below in detail. In the present exemplary embodiment, four error diffusion coefficients K1 to K4 illustrated in FIG. 15 can be used for the error diffusion processing. To diffuse and accumulate errors using the error diffusion coefficients K1 to K4, the halftone processing unit 108 includes four sets of magenta cumulative error line buffers 702 to 705 and selects an appropriate one of the cumulative error line buffers 702 to 705 to be used for each scan number in the following manner.

Each of the cumulative error line buffers 702 to 705 has four storage areas 1505 to 1508 as illustrated in FIG. 16B. More specifically, each of the cumulative error line buffers 702 to 705 has four storage areas 1505 to 1508 of "Em1_0, Em1(x)", "Em2_0, Em2(x)", "Em3_0, Em3(x)", and "Em4_0, Em4(x)." For example, the magenta (4n+1) cumulative error line buffer 702 has a single storage area Em1_0 and a plurality of storage areas Em1_(x) (x=1 to W) the number of which is equal to the number W of pixels of input image data in the horizontal direction.

In a case where the scan number k is 2 (i.e., k=2), the halftone processing unit 108 executes error diffusion processing using the magenta (4n+2) cumulative error line buffer 703. More specifically, the cumulative error adding unit 706 adds the error Em2(x) corresponding to the pixel position x of input pixel data in the horizontal direction to the sum value data of the magenta scan duty and the CM constraint information. More specifically, the following formula (82) can be established when Im represents the pixel data of a target pixel input from constraint information adding unit 701 and Im' represents the pixel data of the target pixel having been added with the cumulative error.

$$Im' = Im + Em2(x) \tag{82}$$

In step S603, a threshold selection unit 707 selects a threshold T. For example, the threshold T can be set according to the following formula (84).

$$T = 128 \tag{83}$$

Alternatively, to eliminate any delay in dot generation, the threshold T can be finely set according to the following formula (84) so that the threshold T changes according to the magenta scan duty (M_d) to reduce an average quantization error.

$$T = f(M\_d) \quad (84)$$

In step S604, the quantization unit 908 compares pixel data Im' of the error added target pixel with the threshold T and determines an output pixel value Out_m as a dot binarization result according to the following rules defined by formulae (85) and (86).

If Im'<T, then $$Out\_m = 0 \quad (85)$$

If Im'≧T, then $$Out\_m = 255 \quad (86)$$

In step S605, an error calculation unit 709 calculates a difference Err_m between the pixel data Im' (i.e., error added pixel data Im) of the target pixel and the output pixel value Out_m according to the following formula (87).

$$Err\_m(x) = Im' - Out\_m \quad (87)$$

In step S606, an error diffusion unit 710 diffuses the error. More specifically, the error diffusion unit 710 performs processing for diffusing the error Err_m(x) at the pixel position x in the horizontal direction, using the magenta (4n+2) cumulative error line buffer 702, according to the following formula (88).

$$Em2(x+1) \leftarrow Em2(x+1) + Err\_m(x) \times 7/16 (x<W)$$

$$Em2(x-1) \leftarrow Em2(x-1) + Err\_m(x) \times 3/16 (x>1)$$

$$Em2(x) \leftarrow Em2\_0 + Err\_m(x) \times 5/16 (1 \leq x \leq W)$$

$$Em2(x) \leftarrow Em2\_0 + Err\_m(x) \times 8/16 (x=1)$$

$$Em2(x) \leftarrow Em2\_0 + Err\_m(x) \times 13/16 (x=W)$$

$$Em2\_0 \leftarrow Err\_m(x) \times 1/16 (x<W)$$

$$Em2\_0 \leftarrow 0 (x=W) \quad (88)$$

Through the above-described processing, the halftone processing unit 108 can complete binarization (quantization value=0 or 255) of a magenta pixel, i.e., when the scan number k is 2 (i.e., k=2). In step S607, it is determined whether the above-described processing in steps S601 to S606 has been completed for all pixels in a band. When the processing in steps S601 to S606 has been completed for all pixels in the band (YES in step S607), the halftone processing unit 108 can determine a dot position of magenta halftone data, i.e., ON/OFF of each magenta dot.

Figure 33:
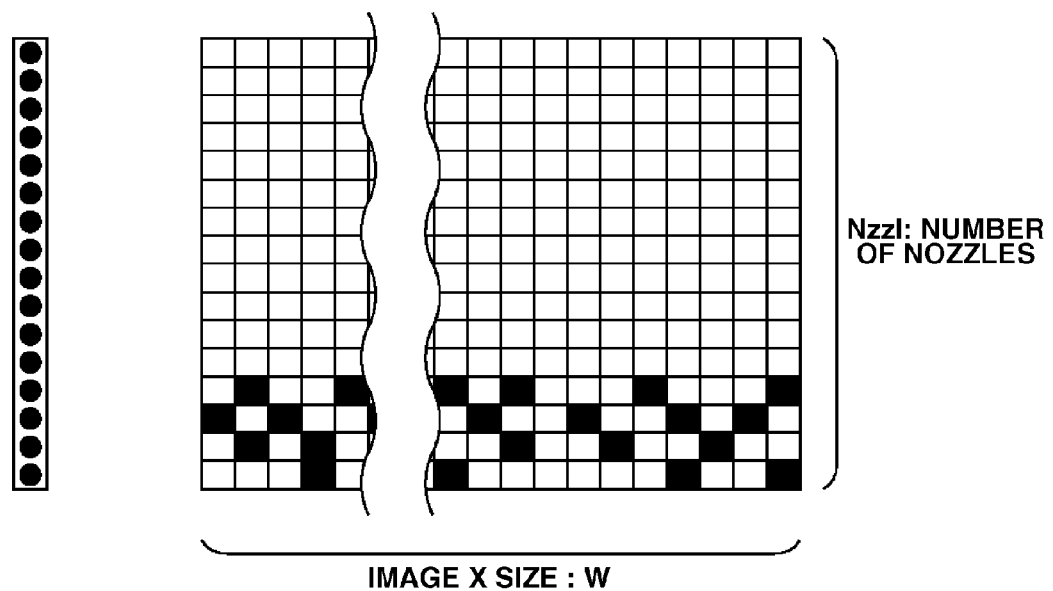
FIG. 33 schematically illustrates a result of the halftone processing performed on the magenta scan duty in a case where the scan number k is 2, which is stored in the halftone image storage buffer.

Referring back to FIG. 4, after completing the magenta halftone processing in step S120, the halftone processing unit 108 performs the following processing. More specifically, in step S121, the halftone processing unit 108 stores the "binary image data of magenta" obtained by executing the halftone processing in the halftone image storage buffer 110. FIG. 33 schematically illustrates a result of the halftone processing performed on the magenta scan duty in a case where the scan number k is 2 (i.e., k=2), which is stored in the halftone image storage buffer 110. As illustrated in FIG. 33, the halftone image storage buffer 110 stores "binary image data of the number of nozzles (Nzzl)×image size in the X-axis direction (image X size: W)" corresponding to the pixel position of the scan duty.

In step S122, the image output terminal 112 transfers "halftone band data of magenta (binary image data)" having a vertical size corresponding to the number of nozzles and a horizontal size corresponding to the image X size, which is a part of the band data stored in the halftone image storage buffer 110, to an external device. In step S123, the constraint information calculation unit 111 calculates CM constraint information based on a magenta dot layout.

As described above, the constraint information calculation unit 111 calculates CM constraint information based on the dot layout in the forward path and then determines the magenta dot layout in the rearward path based on the calculated CM constraint information. Then, the constraint information calculation unit 111 updates the CM constraint information based on the determined magenta dot layout in the rearward path to obtain constraint information corresponding to the cyan dot in the rearward path.

Figure 34:
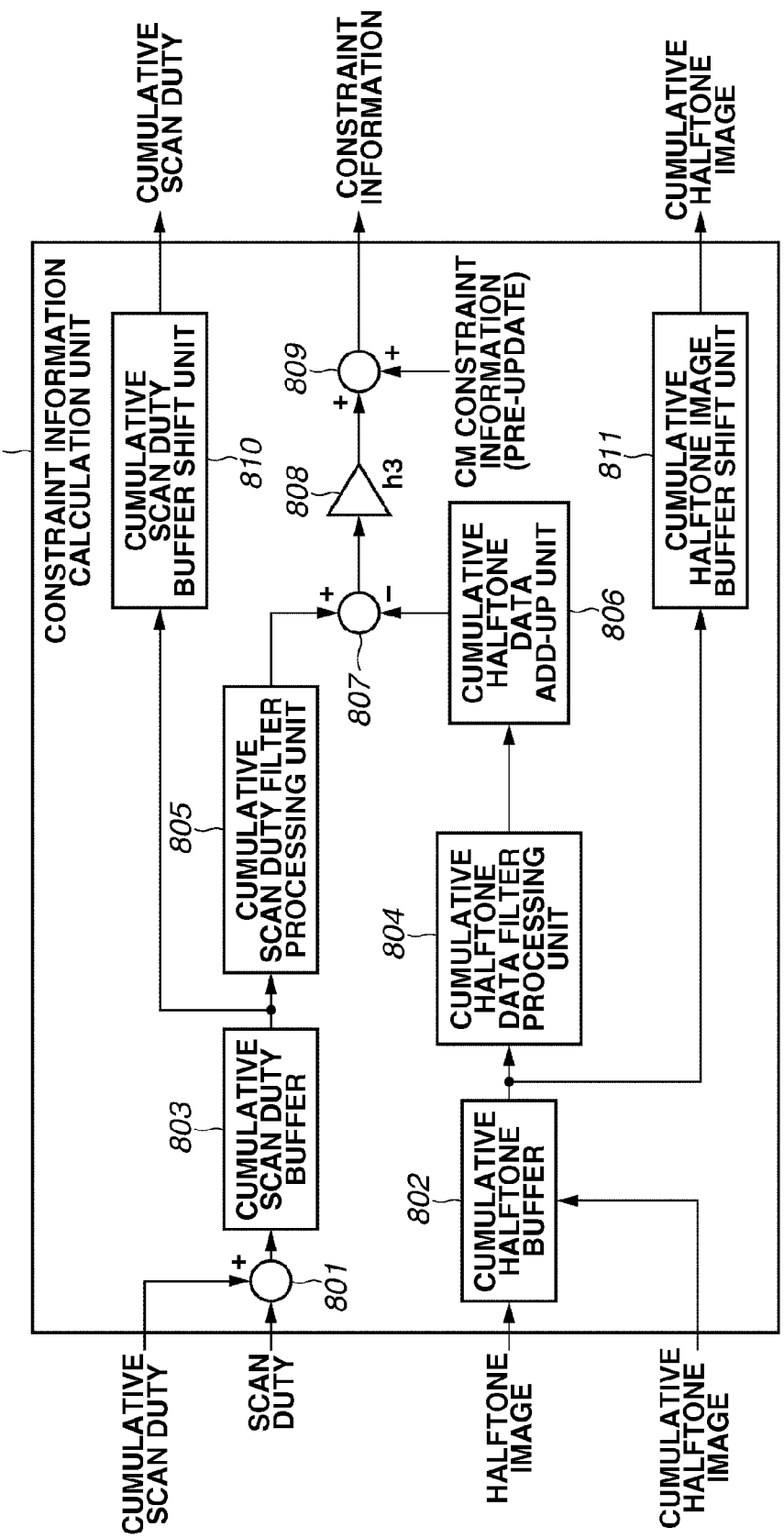
FIG. 34 illustrates an example of a detailed configuration of magenta processing that can be performed by the constraint information calculation unit.
Figure 35:
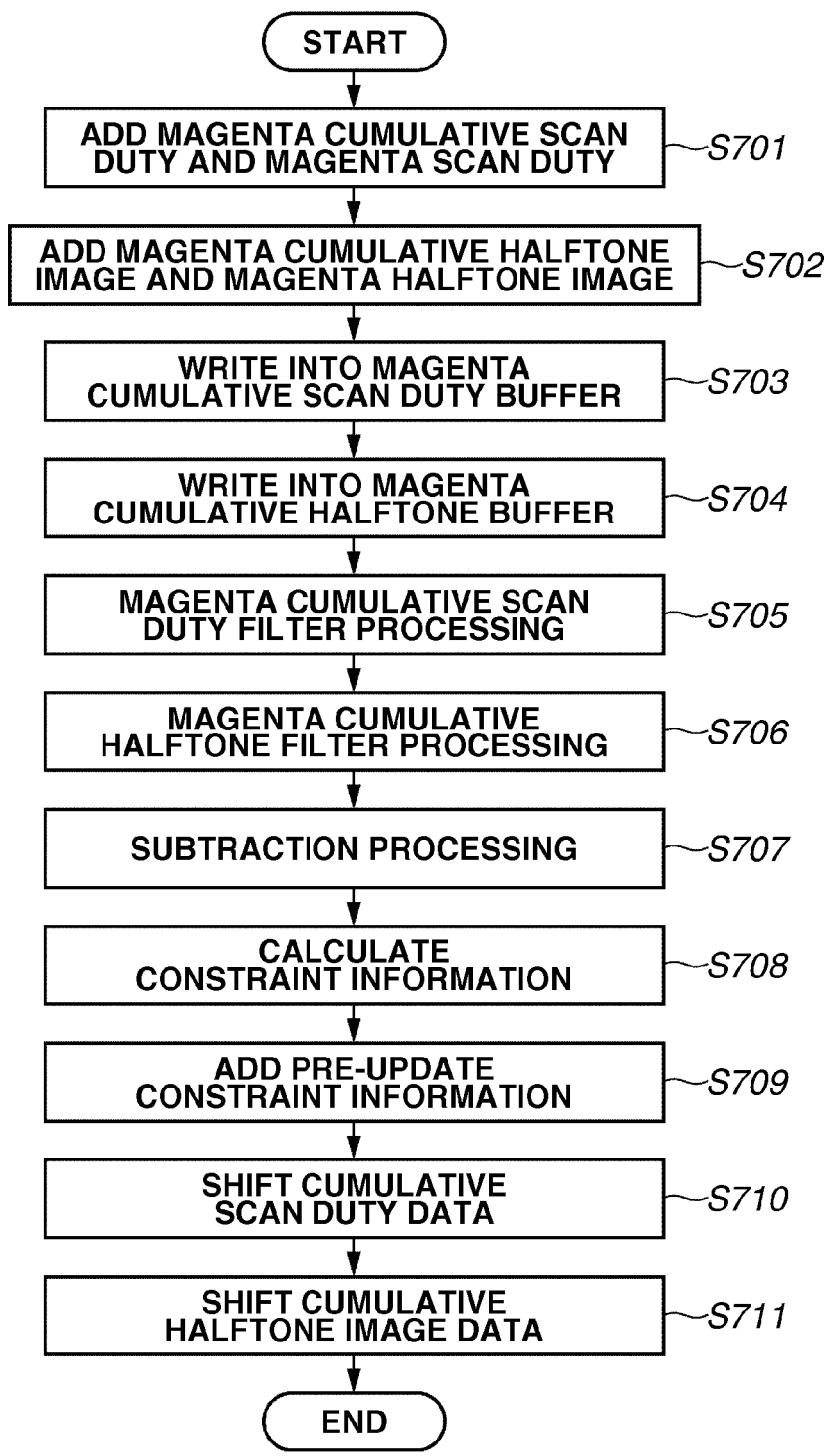
FIG. 35 is a flowchart illustrating an example of detailed processing for calculating the CM constraint information that can be performed by the constraint information calculation unit.

An example of the CM constraint information calculation processing based on the magenta dot layout in the rearward path in step S123 is described below in detail. FIG. 34 illustrates an example of a detailed configuration of magenta processing that can be performed by the constraint information calculation unit 111. FIG. 35 is a flowchart illustrating an example of detailed processing for calculating CM constraint information that can be performed by the constraint information calculation unit. The configuration illustrated in FIG. 34 may further include a unit corresponding to the adding unit 402.

First, in step S701 illustrated in FIG. 35, an adding unit 801 illustrated in FIG. 34 adds magenta scan duty data in the scan duty buffer 107 and data stored in a cumulative scan duty buffer 803. Regarding the magenta processing in the rearward path, the following formula (89) can be used to calculate the cumulative scan duty data C_sum_d' having been processed in step S701 (i.e., addition processing).

$$M\_sum\_d' = M\_d + M\_sum\_d \quad (89)$$

In step S702, a cumulative halftone buffer 802 adds halftone image data to the cumulative halftone image data. Regarding the magenta processing, in step S702, the following formula (90) can be used to calculate a cumulative halftone data (binary image data) Out_m_sum(0) in a case where the scan number k is 2 (i.e., k=2).

$$Out\_m\_sum(0) \leftarrow Out\_m \quad (90)$$

In formula (90), a subscript of each variable represents a buffer number.

In step S703, the adding unit 801 writes the cumulative scan duty data M_sum_d' calculated according to formula (89) in the cumulative scan duty buffer 803. Thus, the following formula (91) can be established.

$$M\_sum\_d \leftarrow M\_sum\_d' \quad (91)$$

In step 704, the cumulative halftone buffer 802 writes the cumulative halftone data Out_m_sum' calculated according to formula (91). Thus, the following formula (92) can be established.

$$Out\_m\_sum \leftarrow Out\_m\_sum' \quad (92)$$

In step S705, a cumulative scan duty filter processing unit 805 performs filter processing on M_sum_d stored in the cumulative scan duty buffer 803. In this filter processing, similar to the above-described printing operation in the forward path, the cumulative scan duty filter processing unit 805 uses a two-dimensional Gaussian filter F_m(t, x, y) that is variable depending on a time difference t existing before an impact of a cyan dot of the same pass. Then, the cumulative scan duty filter processing unit 805 calculates cumulative scan duty data M_sum_df having been subjected to the filter processing according to the following formula (93).

$$M\_sum\_df = M\_sum\_d * F\_m(t,x,y) \qquad (93)$$

In formula (93), * indicates convolution and t represents an impact time difference between a preceding impact of a magenta dot and a subsequent impact of a cyan dot. In the present exemplary embodiment, the two-dimensional Gaussian filter F_m can take two values according to the impact time difference t.

For example, in a case where the following cyan dot is printed together with the preceding magenta dot in the same scanning operation, the cumulative scan duty filter processing unit 805 uses a two-dimensional Gaussian filter F_m corresponding to t<0.1. On the other hand, in a case where the following cyan dot is printed in the next scanning operation, the cumulative scan duty filter processing unit 805 uses a two-dimensional Gaussian filter F_m corresponding to t≧0.1.

Figure 36:
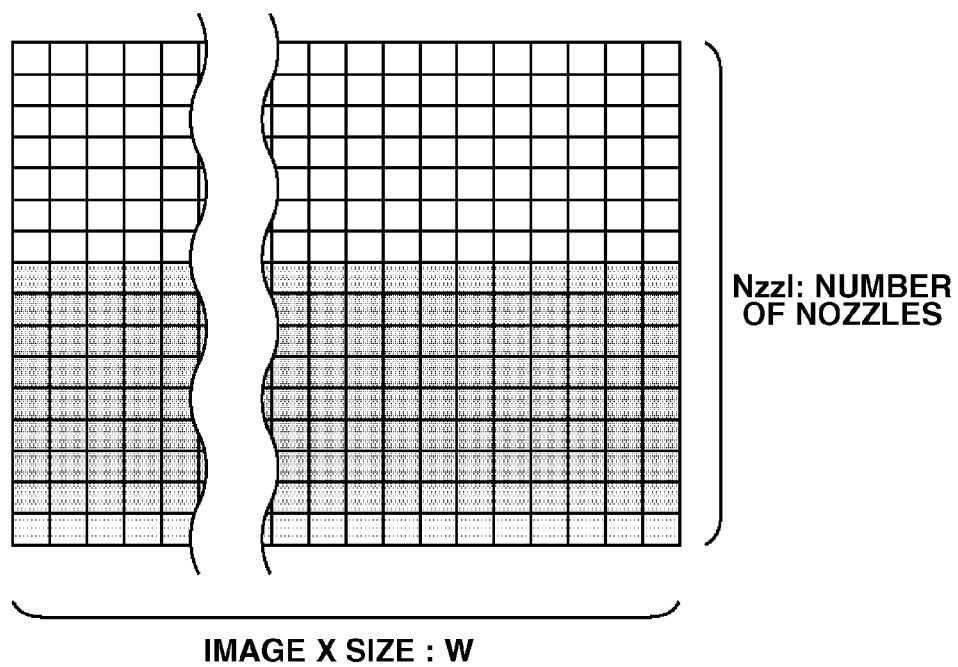
FIG. 36 schematically illustrates an example of scan duty data having been subjected to the filter processing.

In the present exemplary embodiment, the cumulative scan duty filter processing unit 805 uses two Gaussian filters according to the impact time difference t. However, the cumulative scan duty filter processing unit 805 can use three or more Gaussian filters. The two-dimensional Gaussian filter F_m can be expressed using the above-described formulas (51) and (52) and t can be determined by referring to time TMm accompanying the cumulative halftone data. FIG. 36 schematically illustrates an example of scan duty data having been subjected to the filter processing.

The filter 2001 illustrated in FIG. 21A is an example of the two-dimensional Gaussian filter F_m. To simplify the following description, the filter 2001 has a square shape having a size of 3×3, although the size of the filter 2001 can be arbitrarily changed. For example, the filter 2001 may have a square shape having an appropriate size selected from the group including 5×5, 7×7, and 9×9 or a rectangular shape having an appropriate size selected from the group including 3×5, 5×7, and 5×9. The filter 2001 can be a filter having low-pass characteristics, band-pass characteristics, or high-pass characteristics.

In step S706, a cumulative halftone data filter processing unit 804 performs filter processing on cumulative halftone data Out_m_sum(0) to Out_m_sum(3) stored in the cumulative halftone buffer 802. In this filter processing, the cumulative halftone data filter processing unit 804 uses the two-dimensional Gaussian filter LPF_b(t, x, y) that is variable depending on the impact time difference t. Then, the cumulative halftone data filter processing unit 804 calculates the cumulative halftone data Out_m_sum_LPF having been subjected to the filter processing according to the above-described formulae (53) to (55). In this case, t can be determined referring to time TMm accompanying the cumulative halftone data.

The filter 2002 illustrated in FIG. 21B is an example of the two-dimensional Gaussian filter LPF_b. Similar to the filter 2001, the filter 2002 has a square shape having a size of 3×3, although the size of the filter 2002 can be arbitrarily changed. For example, the filter 2002 may have a square shape having an appropriate size selected from the group including 5×5, 7×7, and 9×9 or a rectangular shape having an appropriate size selected from the group including 3×5, 5×7, and 5×9. However, to obtain sufficient effects, it is desired that the variables σx(t) and σy(t) have smaller values when the impact time difference t becomes smaller.

Figure 37:
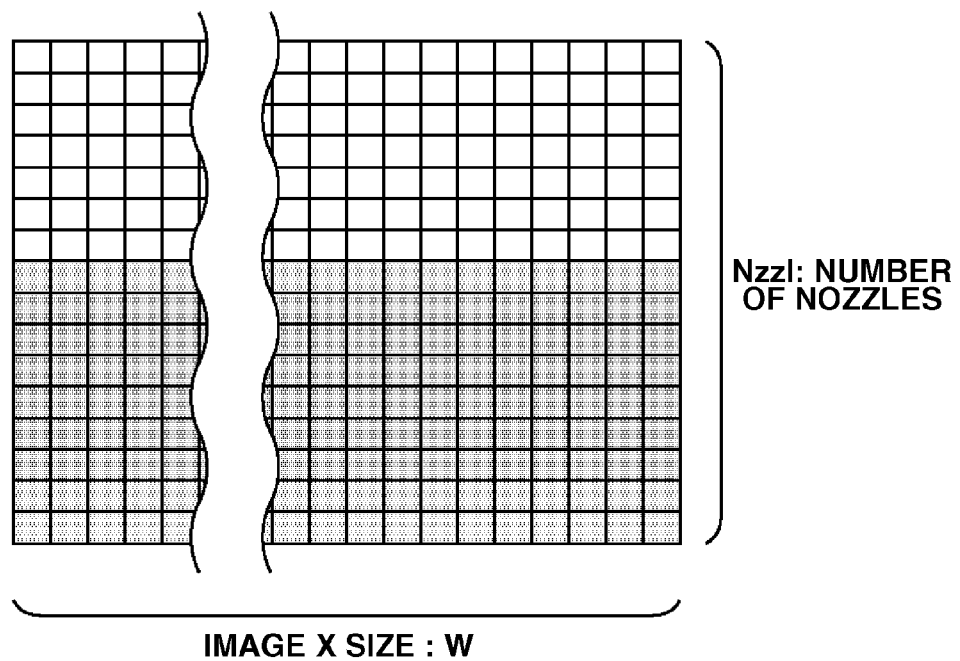
FIG. 37 schematically illustrates an example of halftone image data having been subjected to the filter processing.

Then, a cumulative halftone data add-up unit 806 adds up the cumulative halftone data Out_m_sum_LPF(0) to Out_m_sum_LPF(3) having been subjected to the filter processing to obtain one cumulative halftone image data Out_m_sum_LPF. FIG. 37 schematically illustrates an example of halftone image data having been subjected to the filter processing.

In step S707, a subtraction unit 807 subtracts the data calculated by the cumulative halftone data filter processing unit 804 from the data calculated by the cumulative scan duty filter processing unit 805. In step S708, a weight multiplication unit 808 multiplies the value calculated in step 707 with a weight coefficient h3 (real number) to obtain constraint information CM_r. The above-described processing in steps S707 and S708 can be expressed using the following formula (94).

$$CM\_r \leftarrow (-Out\_m\_sum\_LPF + M\_sum\_df) \times h3 \qquad (94)$$

In step S709, a constraint information data buffer adding unit 809 adds the constraint information CM_r data obtained by formula (94) to the pre-update CM constraint information data. Thus, the constraint information data buffer adding unit 809 obtains constraint information CM_r reflecting the magenta dot layout. The constraint information data buffer adding unit 809 stores the obtained constraint information CM_r as constraint information for the cyan halftone processing.

In step S710, a cumulative scan duty data shift unit 810 shifts the cumulative scan duty data M_sum_d stored in the cumulative scan duty buffer 803 upward by an amount corresponding to one sheet feed amount LF (=Nzzl/Pass=16/4=4). In this case, the following formula (95) can be used to calculate the shifted cumulative scan duty data M_sum_d. Further, two conditions 0≦nx<image X size (i.e., image size in the X-axis direction (i.e., the horizontal direction=the head moving direction)) and 0≦ny<Nzzl (i.e., total number of nozzles constituting the nozzle array=16) are both satisfied.

$$M\_sum\_d(nx,ny) = M\_sum\_d(nx,ny+LF) \qquad (95)$$

In formula (95), if ny+LF≧Nzzl, then M_sum_d(nx, ny)=0. More specifically, M_sum_d(nx, ny) is set to 0 for the lower-end nozzles corresponding to the sheet feed amount LF (in this case, four nozzles).

In step S711, a cumulative halftone data shift unit 811 increments by one the subscript of each cumulative halftone data Out_m_sum(0) to Out_m_sum(2) to replace the content of the cumulative halftone buffer 802 (see formula (96)). Further, to replaces the value of the elapsed time TM, the cumulative halftone data shift unit 811 adds a time t existing before an impact of the following magenta dot to the elapsed time TM accompanying each cumulative halftone data. In this case, the elapsed time TM about cyan is synchronized with the elapsed time TM about magenta (see formulae (97) and (98)), because the constraint information are commonly used for cyan and magenta.

$$Out\_m\_sum(n) \leftarrow Out\_m\_sum(n-1) \qquad (96)$$

$$TMm(n) \leftarrow TMm(n-1)+t \qquad (97)$$

$$TMc(n) \leftarrow TMc(n-1)+t \qquad (98)$$

where n=1 to 3.

Through the above-described processing, the constraint information calculation unit 111 terminates the constraint information calculation processing in step S123 illustrated in FIG. 4.

In step S124, the constraint information calculation unit 111 updates the CM constraint information (i.e., the constraint information buffer 109) commonly used for cyan and magenta based on a calculation result of the CM constraint information.

In step S125, the halftone processing unit 108 performs cyan halftone processing. The cyan halftone processing is performed for converting a sum value of "cyan scan duty data" stored in the scan duty buffer 107 and the constraint information stored in the constraint information buffer 109 into a 2-level gradation value (i.e., binary data).

Figure 38:
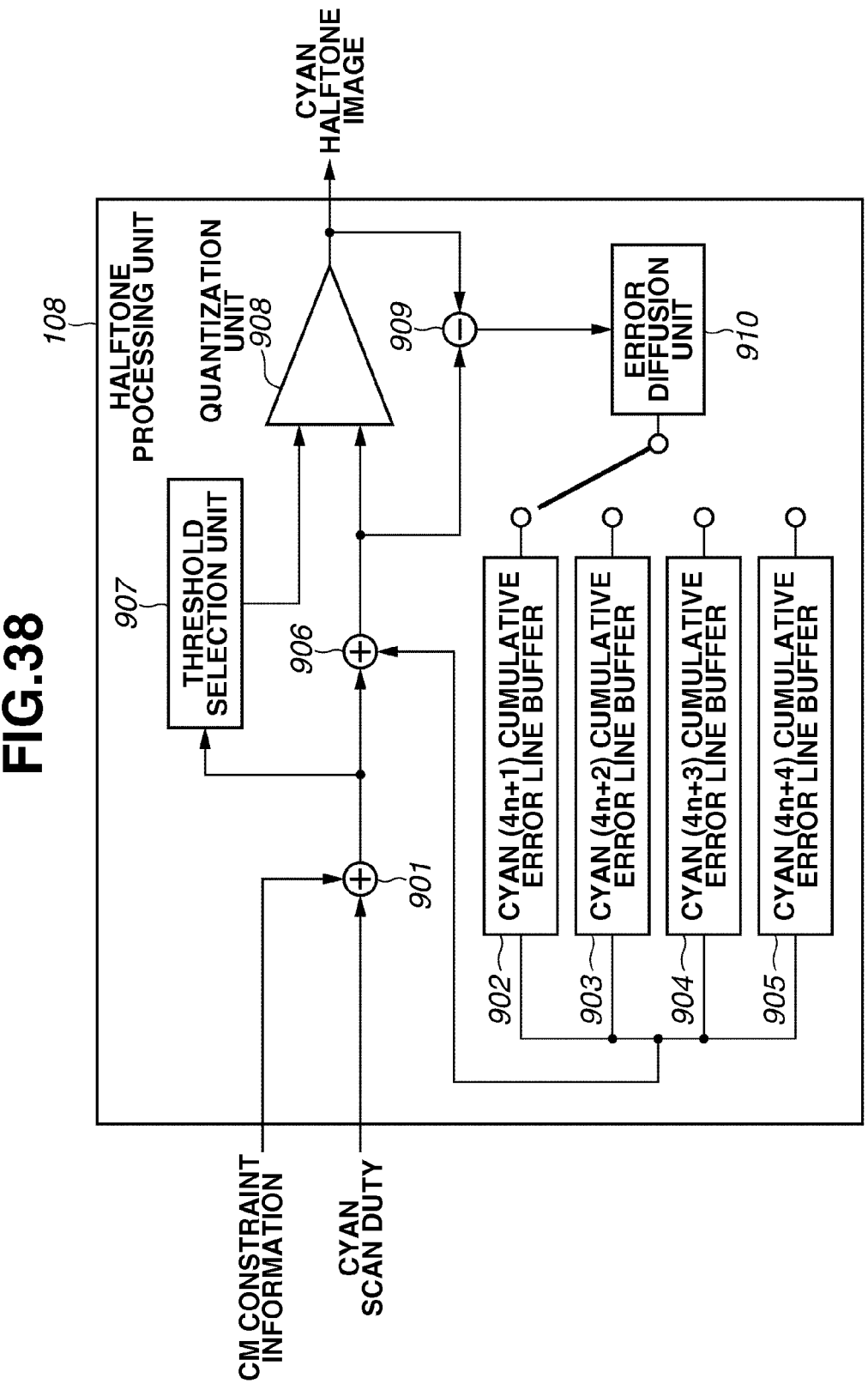
FIG. 38 illustrates an example of a detailed configuration of cyan processing that can be performed by the halftone processing unit.
Figure 39:
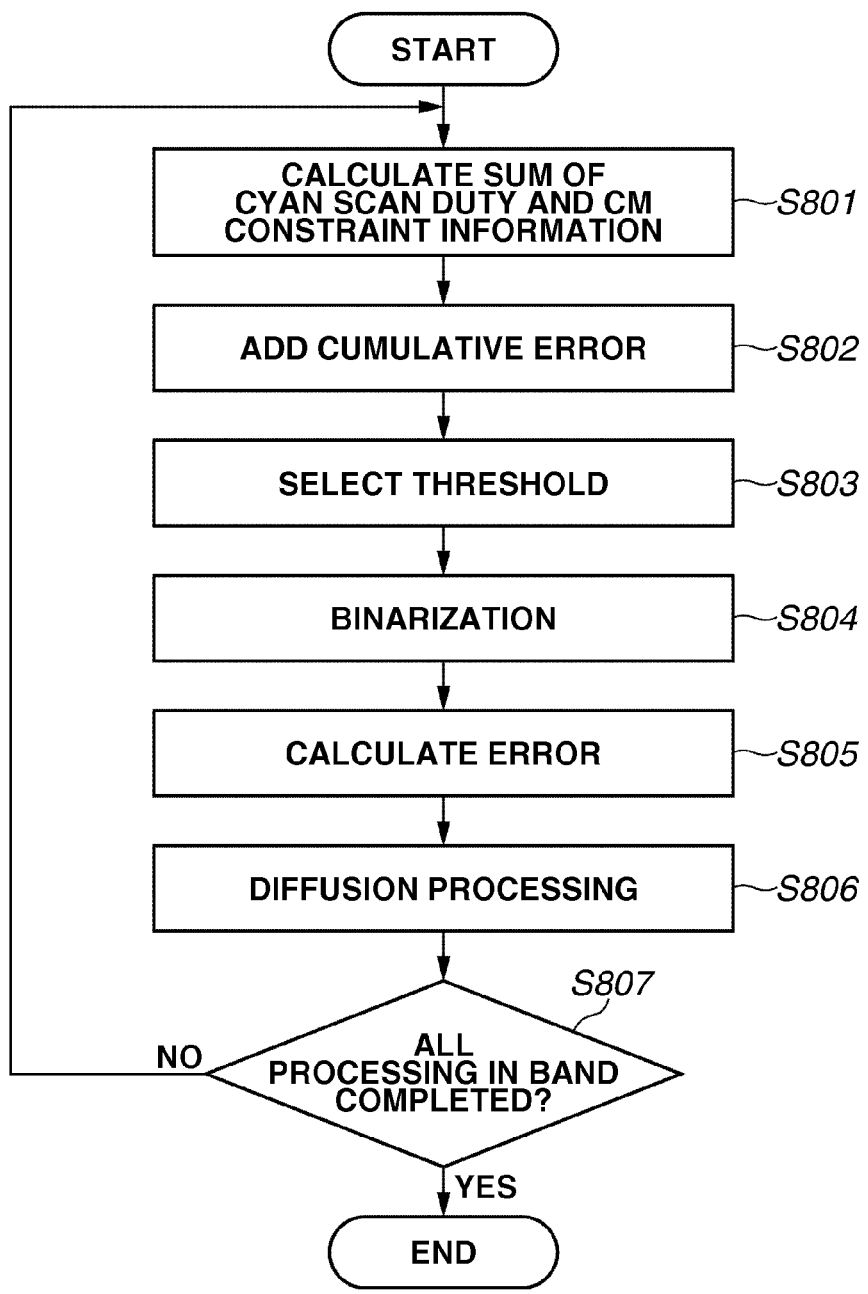
FIG. 39 is a flowchart illustrating an example of detailed cyan halftone processing that can be performed by the halftone processing unit.

The cyan halftone processing is described below in detail. FIG. 38 illustrates an example of a detailed configuration of the cyan processing that can be performed by the halftone processing unit 108. FIG. 39 is a flowchart illustrating an example of detailed cyan halftone processing that can be performed by the halftone processing unit 108.

First, in step S801 illustrated in FIG. 39, a constraint information adding unit 901 illustrated in FIG. 38 inputs a sum of cyan scan duty and constraint information. More specifically, the constraint information adding unit 901 calculates "pixel data Ic of a target pixel" as a sum value of cyan scan duty (C_d) and constraint information commonly used for cyan and magenta (i.e., CM constraint information) CM_r according to the following formula (99). However, when the scan number k is 1 (i.e., k=1), all values of constraint information C_r are equal to 0.

$$Ic = C\_d + CM\_r \quad (99)$$

In step S802, a cumulative error adding unit 906 adds a cumulative error for the error diffusion processing. As illustrated in FIG. 15, four error diffusion coefficients K1 to K4 are provided as error diffusion coefficients to be used in the error diffusion processing. For example, K1=7/16, K2=3/16, K3=5/16, and K4=1/16. However, the error diffusion coefficients K1 to K4 need not be fixed and can be changed according to the gradation. Moreover, the error diffusion coefficients are not limited to the above-described four coefficients. The number of the error diffusion coefficients can be increased appropriately.

To diffuse and accumulate errors using the error diffusion coefficients K1 to K4, the halftone processing unit 108 includes four sets of cyan cumulative error line buffers 902 to 905 and selects an appropriate one of the cumulative error line buffers 902 to 905 to be used for each scan number in the following manner.

More specifically, when the scan number k is 1, 5, ..., 4n+1 (n is an integer equal to or greater than 0), the halftone processing unit 108 uses the cyan (4n+1) cumulative error line buffer 902. When the scan number k is 2, 6, ..., 4n+2, the halftone processing unit 108 uses the cyan (4n+2) cumulative error line buffer 903. When the scan number k is 3, 7, ..., 4n+3, the halftone processing unit 108 uses the cyan (4n+3) cumulative error line buffer 904. When the scan number k is 4, 8, ..., 4n+4, the halftone processing unit 108 uses the cyan (4n+4) cumulative error line buffer 905.

Each of the cumulative error line buffers 902 to 905 has four sets of storage areas 1501 to 1504 as illustrated in FIG. 16A. More specifically, each of the cumulative error line buffers 902 to 905 has four storage areas 1501 to 1504 of "Ec1_0, Ec1(x)", "Ec2_0, Ec2(x)", "Ec3_0, Ec3(x)", and "Ec4_0, Ec4(x)." For example, the cyan (4n+2) cumulative error line buffer 903 has a single storage area Ec2_0 and a plurality of storage areas Ec2_(x) (x=1 to W) the number of which is equal to the number W of pixels of input image data in the horizontal direction. In the present exemplary embodiment, to perform the 4-pass printing, the above-described four sets of cumulative error line buffers 902 to 905 are required for each color.

In a case where the scan number k is 2 (i.e., k=2), the halftone processing unit 108 executes error diffusion processing using the cyan (4n+2) cumulative error line buffer 903.

More specifically, the cumulative error adding unit 906 adds an error Ec2(x) corresponding to a pixel position x of an input pixel data in the horizontal direction to the sum value of cyan scan duty and the CM constraint information. More specifically, the following formula (100) can be established when Ic represents the pixel data of a target pixel input from the constraint information adding unit 901 and Ic' represents the pixel data of the target pixel having been added with the cumulative error.

$$Ic' = Ic + Ec1(x) \quad (100)$$

In step S803, a threshold selection unit 907 selects a threshold T. For example, the threshold T can be set according to the following formula (101).

$$T = 128 \quad (101)$$

Alternatively, to eliminate any delay in dot generation, the threshold T can be finely set according to the following formula (102) so that the threshold T changes according to the cyan scan duty (C_d) to reduce an average quantization error.

$$T = f(C\_d) \quad (102)$$

In step S804, the quantization unit 908 compares pixel data Ic' of the error added target pixel with the threshold T and determines an output pixel value Out_c as a dot binarization result according to the following rules defined by formulae (103) and (104).

If Ic' < T, then $$Out\_c = 0 \quad (103)$$

If Ic' ≥ T, then $$Out\_c = 255 \quad (104)$$

In step S805, an error calculation unit 909 calculates a difference Err_c between the pixel data Ic' (i.e., error added pixel data Ic) of the target pixel and the output pixel value Out_c according to the following formula (105).

$$Err\_c(x) = Ic' - Out\_c \quad (105)$$

In step S806, an error diffusion unit 910 diffuses the error. More specifically, the error diffusion unit 910 performs processing for diffusing the error Err_c(x) at the pixel position x in the horizontal direction, using the cyan (4n+2) cumulative error line buffer 902, according to the following formula (106).

$$Ec2(x+1) \leftarrow Ec2(x+1) + Err\_c(x) \times 7/16 \, (x < W)$$

$$Ec2(x-1) \leftarrow Ec2(x-1) + Err\_c(x) \times 3/16 \, (x > 1)$$

$$Ec2(x) \leftarrow Ec2\_0 + Err\_c(x) \times 5/16 \, (1 < x < W)$$

$$Ec2(x) \leftarrow Ec2\_0 + Err\_c(x) \times 8/16 \, (x = 1)$$

$$Ec2(x) \leftarrow Ec2\_0 + Err\_c(x) \times 13/16 \, (x = W)$$

$$Ec2\_0 \leftarrow Err\_c(x) \times 1/16 \, (x < W)$$

$$Ec2\_0 \leftarrow 0 \, (x = W) \quad (106)$$

Through the above-described processing, the halftone processing unit 108 can complete binarization (quantization value=0 or 255) of a cyan pixel, i.e., when the scan number k is 2 (i.e., k=2). In step S807, it is determined whether the above-described processing in steps S801 to S806 has been completed for all pixels (addresses (0, 0) to (W−1, Nzzl−1)) in a band. When the processing in steps S801 to S806 has been completed for all pixels in the band (YES in step S807), the halftone processing unit 108 can determine a dot position of cyan halftone image data, i.e., ON/OFF of each cyan dot.

Figure 40:
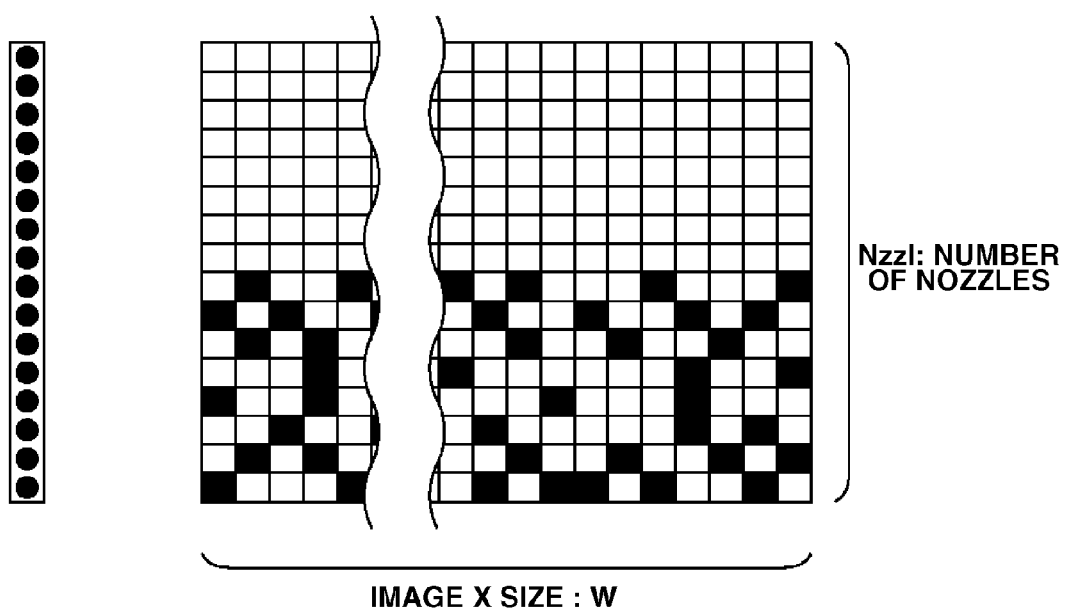
FIG. 40 schematically illustrates an example of a result of the halftone processing performed on the cyan scan duty in a case where the scan number k is 2, which is stored in the halftone image storage buffer.

Referring back to FIG. 4, after completing the cyan halftone processing in step S125, the halftone processing unit 108 performs the following processing. More specifically, in step S126, the halftone processing unit 108 stores the "binary image data of cyan" obtained by executing the halftone processing in the halftone image storage buffer 110. FIG. 40 schematically illustrates a result of the halftone processing performed on the cyan scan duty in a case where the scan number k is 2 (i.e., k=2), which is stored in the halftone image storage buffer 110. As illustrated in FIG. 40, the halftone image storage buffer 110 stores "binary image data of the number of nozzles (Nzzl)×image size in the X-axis direction (image X size: W)" corresponding to the pixel position of the scan duty.

In step S127, the image output terminal 112 transfers "halftone band data of cyan (binary image data)" having a vertical size corresponding to the number of nozzles and a horizontal size corresponding to the image X size, which is a part of the band data stored in the halftone image storage buffer 110, to an external device. In step S128, the constraint information calculation unit 111 calculates CM constraint information based on a cyan dot layout.

Figure 41:
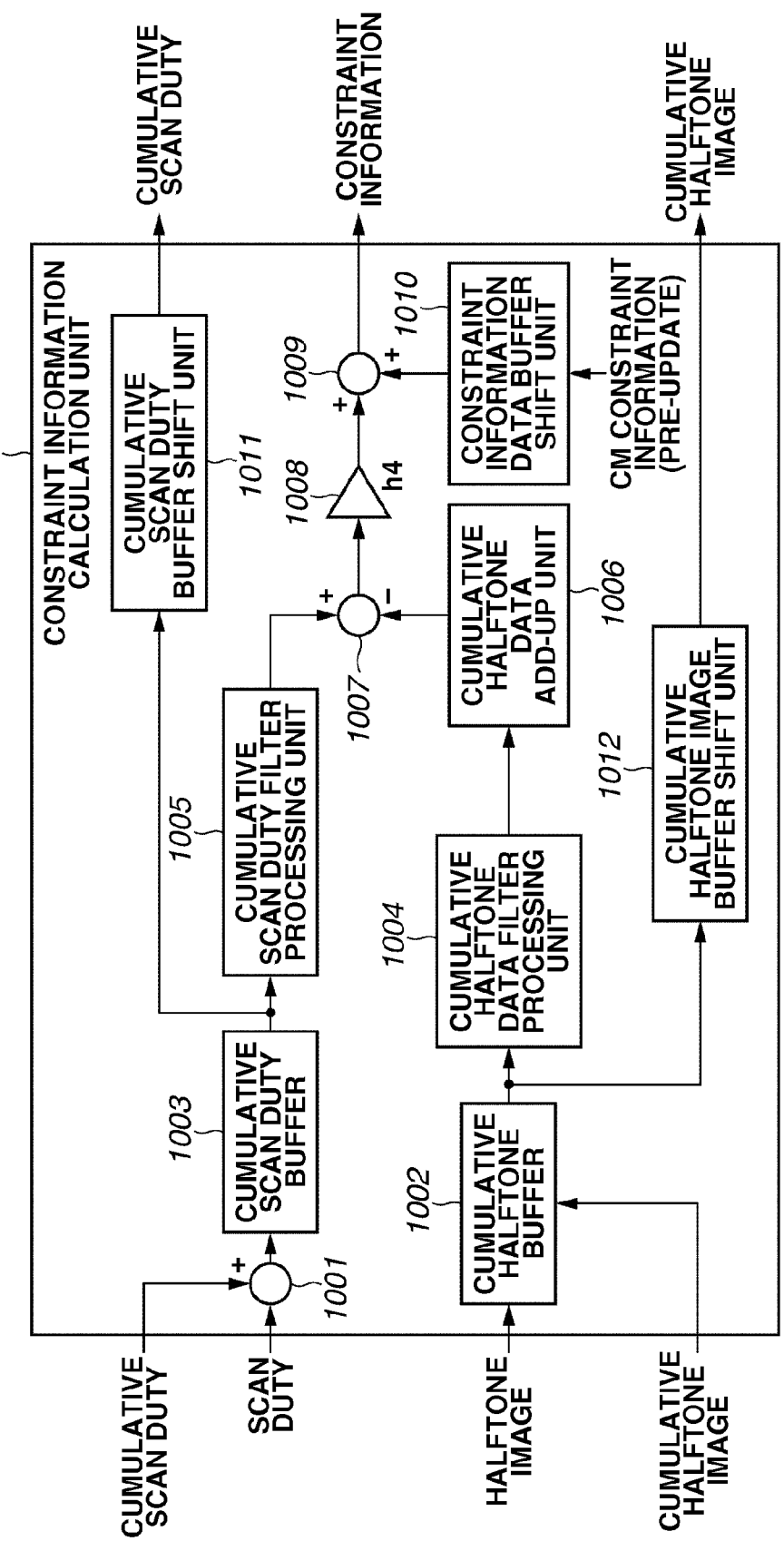
FIG. 41 is a block diagram illustrating an example of a detailed configuration of cyan processing that can be performed by the constraint information calculation unit.
Figure 42:
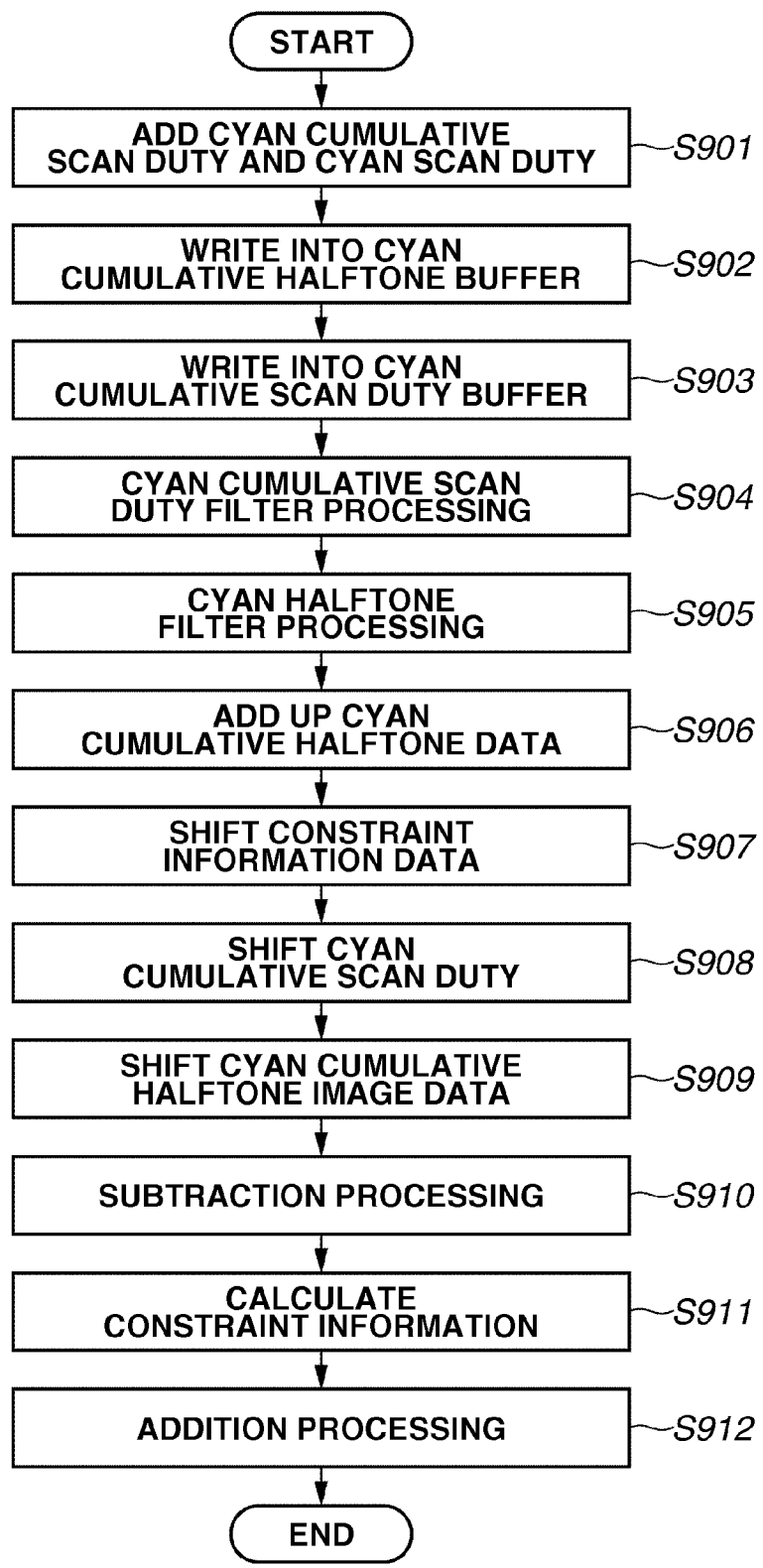
FIG. 42 is a flowchart illustrating an example of detailed processing for calculating the CM constraint information that can be performed by the constraint information calculation unit.

An example of the CM constraint information calculation processing in step S128, which is performed based on the cyan dot layout in the rearward path, is described below in more detail. FIG. 41 is a block diagram illustrating an example of a detailed configuration of cyan processing that can be performed by the constraint information calculation unit 111. FIG. 42 is a flowchart illustrating an example of detailed processing for calculating the CM constraint information that can be performed by the constraint information calculation unit 111. The configuration illustrated in FIG. 41 may further include a unit corresponding to the adding unit 402.

First, in step S901 illustrated in FIG. 42, an adding unit 1001 illustrated in FIG. 41 adds cyan scan duty data in the scan duty buffer 107 and data stored in the cumulative scan duty buffer 1003. Regarding the cyan processing in the rearward path, the following formula (107) can be used to calculate cumulative scan duty data C_sum_d' having been processed in step S901 (i.e., addition processing).

$$C\_sum\_d' = C\_d + C\_sum\_d \quad (107)$$

In step S902, a cumulative halftone buffer 1002 adds halftone image data to cumulative halftone image data. In step S903, the adding unit 1001 writes the cumulative scan duty data C_sum_d' calculated according to formula (107) in the cumulative scan duty buffer 1003. Thus, the following formula (108) can be established.

$$C\_sum\_d \leftarrow C\_sum\_d' \quad (108)$$

In step S904, a cumulative scan duty filter processing unit 1005 performs filter processing on C_sum_d stored in the cumulative scan duty buffer 1003. In this filter processing, the cumulative scan duty filter processing unit 1005 uses a two-dimensional Gaussian filter F_m(t, x, y) that is variable depending on a time difference t existing before an impact of a cyan dot of the next pass. Then, the cumulative scan duty filter processing unit 1005 calculates a cumulative scan duty data C_sum_df having been subjected to the filter processing according to the following formula (109).

$$C\_sum\_df = C\_sum\_d * F\_m(t,x,y) \quad (109)$$

However, * indicates convolution and t represents an impact time difference between a preceding impact of a cyan dot and a subsequent impact of a magenta dot. In the present exemplary embodiment, the two-dimensional Gaussian filter F_m can take two values according to the impact time difference t.

For example, in a case where the following magenta dot is printed together with the preceding cyan dot in the same scanning operation, the cumulative scan duty filter processing unit 1005 uses a two-dimensional Gaussian filter F_m corresponding to t<0.1. On the other hand, in a case where the following magenta dot is printed in the next scanning operation, the cumulative scan duty filter processing unit 1005 uses a two-dimensional Gaussian filter F_m corresponding to t≧0.1.

In the present exemplary embodiment, the cumulative scan duty filter processing unit 1005 uses two Gaussian filters according to the impact time difference t. However, the cumulative scan duty filter processing unit 1005 can use three or more Gaussian filters. The two-dimensional Gaussian filter F_m can be represented by the above-described formulae (51) to (52). In this case, t can be determined referring to time TMm accompanying cumulative halftone data Out_c_sum.

Figure 43:
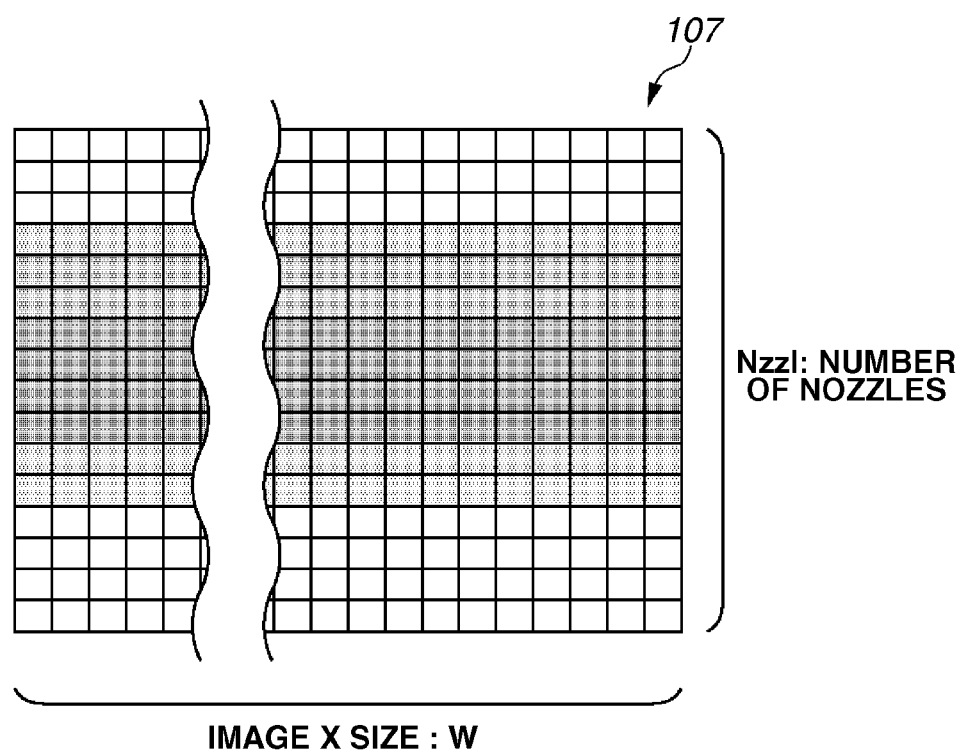
FIG. 43 schematically illustrates an example of scan duty data having been subjected to the filter processing.

FIG. 43 schematically illustrates an example of the scan duty data having been subjected to the filter processing. The filter 2003 illustrated in FIG. 21A is an example of the two-dimensional Gaussian filter F_m. To simplify the following description, the filter 2003 has a square shape having a size of 5×5, although the size of the filter 2003 can be arbitrarily changed. For example, the filter 2003 may have a square shape having an appropriate size selected from the group including 7×7 and 9×9 or a rectangular shape having a size selected from the group including 3×5, 5×7, and 5×9. The filter 2003 is not limited to the type having low-pass characteristics and can be a filter having band-pass characteristics or high-pass characteristics.

In step S905, a cumulative halftone data filter processing unit 1004 performs filter processing on Out_c_sum(0) to Out_C_sum(3) stored in the cumulative halftone buffer 1002. In this filter processing, the cumulative halftone data filter processing unit 1004 uses the two-dimensional Gaussian filter LPF_b(t, x, y) that is variable depending on the impact time difference t. More specifically, the cumulative halftone data filter processing unit 1004 calculates the cumulative halftone data Out_c_sum_LPF(0) to Out_c_sum_LPF(3) having been subjected to the filter processing according to the above-described formulae (53) to (55). In this case, t can be determined by referring to time TMc accompanying the cumulative halftone data Out_c_sum.

The filter 2004 illustrated in FIG. 21B is an example of the two-dimensional Gaussian filter LPF_b. Similar to the filter 2003, the filter 2004 has a square shape having a size of 5×5, although the size of the filter 2004 can be arbitrarily changed. For example, the filter 2004 may have a square shape having an appropriate size selected from the group including 7×7 and 9×9 or a rectangular shape having a size selected from the group including 3×5, 5×7, and 5×9. However, to obtain sufficient effects, it is desired that the variables σx(t) and σy(t) have smaller values when the impact time difference t becomes larger. It is desired that that the two-dimensional Gaussian filter LPF_b has low-pass characteristics.

Figure 44:
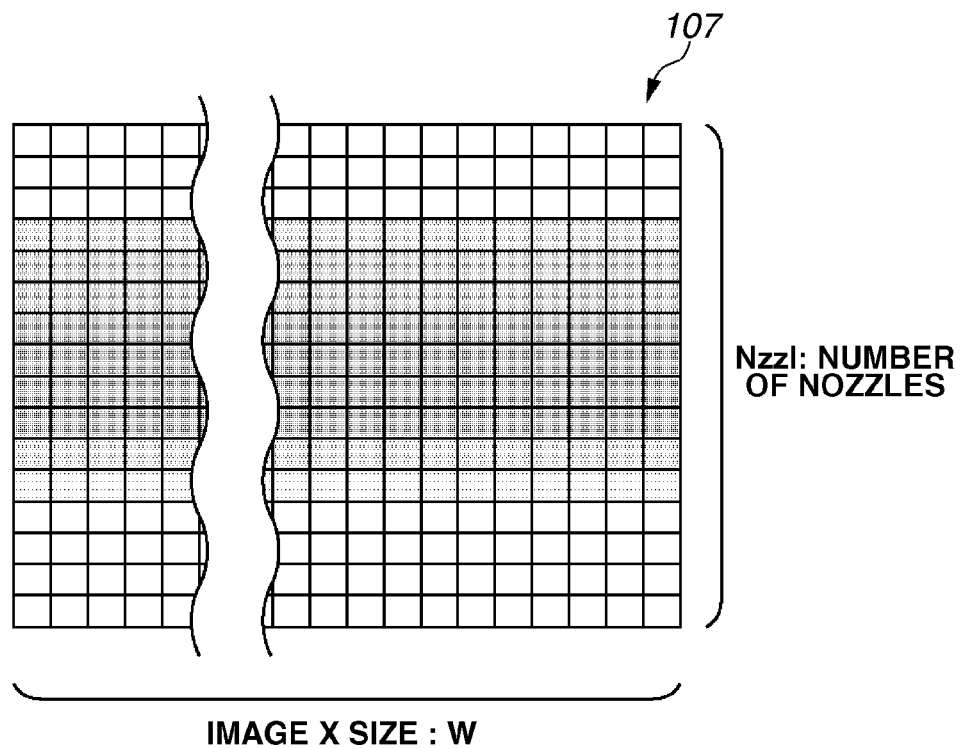
FIG. 44 schematically illustrates an example of halftone image data having been subjected to the filter processing.

As illustrated in FIGS. 21A and 21B, similar to the two-dimensional Gaussian filter F_m (i.e., the filter 2003), the two-dimensional Gaussian filter LFP_b (i.e., the filter 2004) has filter coefficients variable depending on the impact time difference t existing before an impact of a next magenta dot. Although the two-dimensional Gaussian filters F_m and LPF_b (i.e., the filters 2003 and 2004) illustrated in FIGS. 21A and 21B use the same filter coefficients, these filters can use different filter coefficients. FIG. 44 schematically illustrates an example of halftone image data having been subjected to the filter processing.

In step S906, a cumulative halftone data add-up unit 1006 adds up the cumulative halftone data Out_c_sum_LPF(0) to Out_c_sum_LPF(3) having been subjected to the filter processing in step S905 according to formula (56) to obtain one cumulative halftone image data Out_c_sum_LPF.

In step S907, a constraint information data buffer shift unit 1010 shifts the constraint information CM_r written in the constraint information buffer 109 upward by an amount corresponding to one sheet feed amount LF (=Nzzl/Pass=16/4=4). In this case, the following formula (110) can be used to calculate the shifted constraint information. Further, two conditions $0 \leq nx <$ image X size (i.e., image size in the X-axis direction (i.e., the horizontal direction=the head moving direction)) and $0 \leq ny < Nzzl$ (i.e., total number of nozzles constituting the nozzle array=16) are both satisfied.

$$CM\_r(nx,ny) = CM\_r(nx,ny+LF) \qquad (110)$$

In the present exemplary embodiment, the constraint information is commonly used for cyan and magenta. Therefore, similar to the above-described case where the scan number k is 1 (i.e., k=1), the constraint information CM_r is shifted upward by the amount equivalent to the sheet feed amount LF after both the cyan and magenta dot layouts are determined.

In step S908, a cumulative scan duty data shift unit 1011 shifts the cumulative scan duty data C_sum_d stored in the cumulative scan duty buffer 1003 upward by an amount corresponding to one sheet feed amount LF (=Nzzl/Pass=16/4=4). In this case, the following formula (III) can be used to calculate the shifted cumulative scan duty data C_sum_d. Further, two conditions $0 \leq nx <$ image X size (i.e., image size in the X-axis direction (i.e., the horizontal direction=the head moving direction)) and $0 \leq ny < Nzzl$ (i.e., total number of nozzles constituting the nozzle array=16) are both satisfied.

$$C\_sum\_d(nx,ny) = C\_sum\_d(nx,ny+LF) \qquad (111)$$

In formula (III), if $ny+LF \geq Nzzl$, then C_sum_d(nx, ny)=0. More specifically, C_sum_d(nx, ny) is set to 0 for the lower-end nozzles corresponding to the sheet feed amount LF (in this case, four nozzles).

In step S909, a cumulative halftone data shift unit 1012 increments by one the subscript of each cumulative halftone data Out_c_sum(0) to Out_c_sum(2) to replace the content of the cumulative halftone buffer 1002 (see formula (112)). Further, to replaces the value of the elapsed time TM, the cumulative halftone data shift unit 1012 adds a time t existing before an impact of the following magenta dot to the elapsed time TM accompanying each cumulative halftone image data. In this case, the elapsed time TM about cyan is synchronized with the elapsed time TM about magenta (see formulae (113) and (114)), because the constraint information are commonly used for cyan and magenta.

$$Out\_c\_sum(n) \leftarrow Out\_c\_sum(n-1) \qquad (112)$$

$$TMc(n) \leftarrow TMc(n-1)+ \qquad (113)$$

$$TMm(n) \leftarrow TMm(n-1)+t \qquad (114)$$

where n=1 to 3.

In step S910, a subtraction unit 1007 subtracts the data calculated by the cumulative halftone data filter processing unit 1004 from the data calculated by the cumulative scan duty filter processing unit 1005. In step S911, a weight multiplication unit 1008 multiplies the value calculated in step 910 with a weight coefficient h4 (real number) to obtain constraint information CM_r. The above-described processing in steps S910 and S911 can be expressed using the following formula (115).

$$CM\_r \leftarrow (-Out\_c\_sum\_LPF + C\_sum\_df) \times h4 \qquad (115)$$

In step S912, a constraint information data buffer adding unit 1009 adds the constraint information CM_r data obtained in formula (115) and the shifted CM constraint information data (i.e., pre-update CM constraint information). Thus, the constraint information data buffer adding unit 1009 obtains constraint information CM_r reflecting the cyan/magenta dot layout.

The following formula (116) can be used to calculate the constraint information CM_r reflecting the cyan/magenta dot layout, through the above-described steps S910 to S912.

$$CM\_r \leftarrow (-Out'\_c\_LPF + C'\_df) \times h4 + CM'\_r \qquad (116)$$

Through the above-described processing, the constraint information calculation unit 111 terminates the processing in step S128 illustrated in FIG. 4, i.e., the processing for calculating the CM constraint information based on the cyan dot layout.

In the present exemplary embodiment, the weight coefficients h1 to h4 are adjusted in such a manner that a constraint range of the constraint information CM_r applied to the same scanning operation is greater than a constraint range of the constraint information CM_r applied to different scanning operations (for example, between neighboring scanning operations). For example, the weight coefficients h1 and h3 can be set to be greater than the weight coefficients h2 and h4. Furthermore, the weight coefficients h1 to h4 are adjusted in such a manner that a constraint range of the constraint information CM_r applied to the rearward path scanning is greater than a constraint range of the constraint information CM_r applied to the forward path scanning. For example, the weight coefficients h1 and h2 to be used when the rearward path scanning is performed can be set to be greater than the weight coefficients h3 and h4 to be used when the forward path scanning is performed.

In step S129, the constraint information calculation unit 111 updates the CM constraint information (i.e., the constraint information buffer 109) commonly used for cyan and magenta based on a calculation result of the CM constraint information. The updated CM constraint information can be referred to as information to be used to determine a dot layout in the next scanning operation corresponding to the scan number k+1 and subsequent scanning operations.

In step S130, the printer 2 having received the halftone image data (i.e., binary image data) from the image processing apparatus 1 selects an ink color that accords with the image data and starts a printing operation. In step S130, the printer 2 performs rearward path main scanning one time by moving the recording head 201 from right to left on a paper or another sheet-like recording medium while driving each nozzle at predetermined driving intervals to record an image on the recording medium. Further, after the rearward path main scanning is completed, the printer 2 performs sub scanning one time in the direction perpendicular to the main scanning.

In step S131, the scan duty setting unit 105 determines whether the scanning operation is entirely completed. If it is determined that the scanning operation is entirely completed (YES in step S131), the above-described sequential image forming processing is accomplished and the image processing apparatus 1 terminates the processing of the flowchart illustrated in FIG. 4. On the other hand, if it is determined that the scanning operation is not entirely completed (NO in step S131), the processing returns to step S103.

As described above, the recording head 201 can realize an example of the recording element according to the present exemplary embodiment that can individually form dots of different colors on a surface of a sheet-like recording medium while relatively scanning on the recording medium. Furthermore, the image processing apparatus 1 can realize an example of a control apparatus that can control formation of color dots performed by the recording element. Moreover, the processing to be executed in steps S109, S114, S123, and S128 illustrated in FIG. 4 can realize an example of a constraint information generation unit. Additionally, the processing to be performed in steps S106, S111, S120, and S125 illustrated in FIG. 4 can realize an example of a dot pattern generation unit.

As described above, the present exemplary embodiment enhances the strength of a constraint according to cyan and magenta constraint information applied to the same scanning operation over the strength of a constraint according to cyan and magenta constraint information applied to neighboring scanning operations. In this manner, the present exemplary embodiment can change the constraint information control for the following color and for the next pass to prevent a different color dot from being formed in a neighboring area of a dot impact position of a preceding dot. Accordingly, the present exemplary embodiment can realize an appropriate dot layout on a surface of a recording medium. Therefore, the present exemplary embodiment can prevent beading of different color dots and can prevent granularity from deteriorating due to bleeding. Further, the present exemplary embodiment can realize low-frequency exclusion between colors. Therefore, the present exemplary embodiment can improve the granularity in color printing. Further, the present exemplary embodiment can improve the robustness against an impact variation. Moreover, the present exemplary embodiment can control the constraint information according to an impact time difference to reduce the bleeding of ink between different color dots, and accordingly can secure adequate granularity.

A second exemplary embodiment according to the present invention is described below. According to the above-described first exemplary embodiment, the generation order of control information is switched between the forward path scanning and the rearward path scanning of the recording head 201. Further, the generation order of binarization images through the binarization processing (i.e., halftone processing) is switched between the forward path scanning and the rearward path scanning of the recording head 201. On the other hand, in the present exemplary embodiment, the generation order of control information is not switched between the forward path scanning and the rearward path scanning of the recording head. Further, the generation order of binarization images though the binarization processing (i.e., halftone processing) is not switched between the forward path scanning and the rearward path scanning of the recording head. The present exemplary embodiment can obtain effects similar to those of the above-described first exemplary embodiment.

As described above, the present exemplary embodiment and the above-described first exemplary embodiment are different in configuration and processing for not switching the order of color inks to be discharged in the binarization processing (i.e., halftone processing) between the forward path scanning and the rearward path scanning of the recording head. Accordingly, in the following description of the present exemplary embodiment, portions and components similar to those described in the first exemplary embodiment are denoted by the same reference numerals used in FIGS. 1 to 44 and their detailed descriptions are not repeated.

Figure 45:
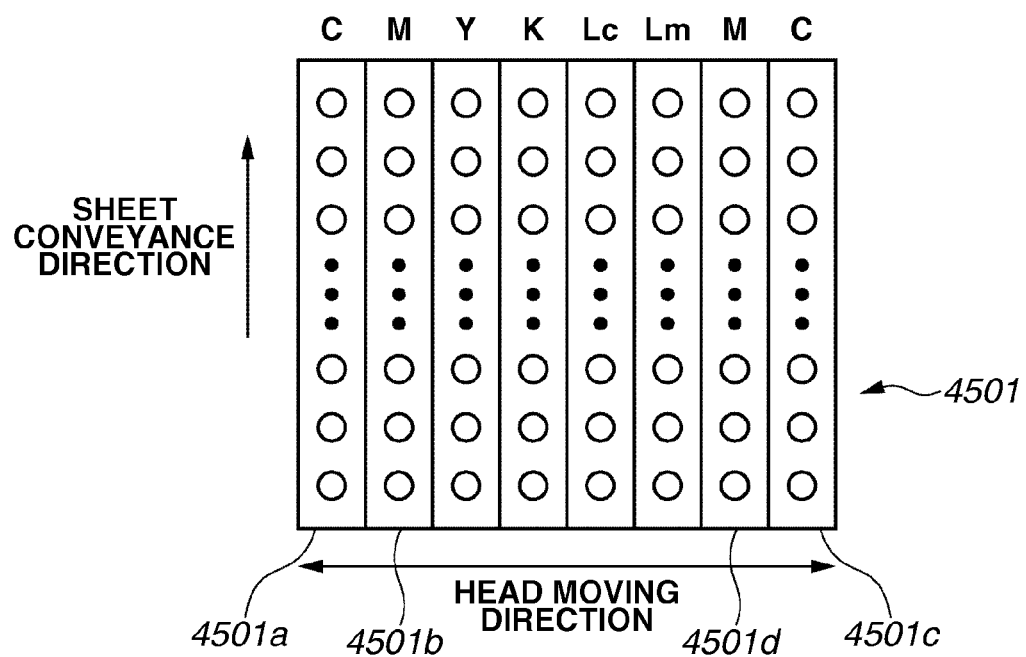
FIG. 45 illustrates an example of a configuration of the recording head.

In the present exemplary embodiment, a recording head 4501 is different in configuration from the recording head 201 described in the first exemplary embodiment. FIG. 45 illustrates an example of a configuration of the recording head 4501 according to the present exemplary embodiment. In the present exemplary embodiment, as illustrated in FIG. 45, cyan and magenta ink nozzles (i.e., two of six color nozzles of cyan (C), magenta (M), yellow (Y), black (K), light cyan (Lc), and light magenta (Lm)) are mounted on both sides of the recording head 4501. More specifically, the cyan and magenta ink nozzles are disposed in this order at a leading side of the recording head 4501 in each moving direction. Therefore, the recording head 4501 can discharge cyan and magenta inks in the same order (i.e., formation order) in the main scanning operation performed in the forward path and the rearward path.

For example, in a forward path printing operation (i.e., when the recording head 4501 moves from right to left in FIG. 45), the recording head 4501 uses nozzles 4501a and 4501b to discharge cyan and magenta inks respectively. On the other hand, in a rearward path printing operation (i.e., when recording head 4501 moves from left to right in FIG. 45), the recording head 4501 uses nozzles 4501c and 4501d to discharge cyan and magenta inks respectively. Therefore, it is unnecessary to perform constraint information related processing differently in color order for the forward path (steps S103 to 116) and the rearward path (steps S117 to S130) as illustrated in FIG. 4. More specifically, the processing to be performed in the forward path printing operation (i.e., steps S103 to S116) can be equally performed in the rearward path printing operation. Thus, the entire processing can be simplified.

FIG. 46 illustrates an example of image forming processing that can be performed by the image processing apparatus 1. In FIG. 46, processing to be performed in steps S1001 to S1016 is similar to the processing in steps S101 to S116 illustrated in FIG. 4 and processing in step S1017 is similar to the processing in step S131 illustrated in FIG. 4. Accordingly, detailed description for the flowchart illustrated in FIG. 46 is omitted.

As described above, the recording head 4501 can realize an example of the recording element according to the present exemplary embodiment. Further, the processing to be executed in steps S1009 and S1014 illustrated in FIG. 46 can realize an example of the constraint information generation unit. Moreover, the processing to be executed in steps S1006 and S1011 illustrated in FIG. 46 can realize an example of the dot pattern generation unit. Moreover, the recording head 4501 can use the nozzles 4501c and 4501d for the forward path scanning and use the nozzles 4501a and 4501b for the rearward path scanning. Additionally, the recording head 4501 can include a plurality of nozzles that can discharge color inks other than cyan and magenta. In this case, similar to the relationship between the cyan and magenta nozzles illustrated in FIG. 45, if the same color nozzles are arranged in a symmetric relationship in the moving direction of the recording head, color order differences in generation of the constraint information can be neglected between the forward path scanning and the rearward path scanning.

The inkjet type recording apparatus in each exemplary embodiment forms an image by causing the recording head having a plurality of nozzles arrayed in a predetermined direction to perform scanning on a recording medium in a direction perpendicular to the nozzle array direction while discharging an ink on the recording medium. However, the present invention is not limited to the above-described inkjet type and can be equally applied to any other recording apparatus that performs recording according to another method (e.g., a thermal transfer type or an electrophotographic type). In this case, a nozzle discharging an ink droplet corresponds to a recording element or a laser emission element configured to record a dot.

The present invention can be, for example, embodied as a system, an apparatus, a method, a program, or a storage medium (or a recording medium). More specifically, the present invention can be applied to a system including a plurality of devices (e.g., a host computer, interfaces, an image forming apparatus, and web applications) or a single device or apparatus.

The present invention includes directly or remotely supplying software programs capable of realizing functions of the above-described exemplary embodiments (e.g., programs corresponding to the flowcharts illustrated in FIGS. 3, 4, 14, 19, 24, and 27 in the above-described exemplary embodiments) to a system or an apparatus. The present invention can be realized by a computer of the system or the apparatus that reads and executes supplied program code.

Accordingly, the present invention can be realized by program code itself to be installed on a computer that can realize the functional processing of the present invention. In other words, the present invention encompasses a computer program itself that can realize the functional processing of the present invention.

In this case, equivalents of programs (e.g., object code, interpreter program, and OS script data) are usable if they possess comparable functions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-232397 filed Sep. 10, 2008, which is hereby incorporated by reference herein in its entirety.

What is claimed is:

1. An image processing apparatus for controlling a formation of dots in a recording element configured to perform scanning on a sheet-like recording medium to form dots of different colors on a surface of the recording medium, the image processing apparatus comprising:
   at least one processor coupled via a bus to a memory, the processor being programmed to control one or more of:
      a constraint information generation unit configured to generate, for each scanning of the recording element, constraint information indicating a constraint for preventing the dots of at least two of the different colors from being positioned mutually close individually for each color; and
      a dot pattern generation unit configured to perform N-valuing processing (N is an integer equal to or greater than 2) on input image data, based on the constraint information generated by the constraint information generation unit, to generate a dot pattern individually for each color for forming an image based on the image data on the surface of the recording medium,
   wherein the constraint information generation unit generates the constraint information in such a way as to make the constraint applied to a same scanning operation performed by the recording element stronger than the constraint applied to different scanning operations performed by the recording element.

2. The image processing apparatus according to claim 1, wherein the recording element moves forward and backward on the sheet-like recording medium, and switches a formation order of the dots of different colors between forward path scanning and rearward path scanning,
   wherein the constraint information generation unit switches a generation order of the constraint information for respective colors between the forward path scanning and the rearward path scanning, and
   wherein the dot pattern generation unit switches a generation order of the dot patterns of respective colors between the forward path scanning and the rearward path scanning.

3. The image processing apparatus according to claim 1, wherein the recording element moves forward and backward on the sheet-like recording medium, and does not switch a formation order of the dots of different colors between forward path scanning and rearward path scanning,
   wherein the constraint information generation unit does not switch a generation order of the constraint information for respective colors between the forward path scanning and the rearward path scanning, and
   wherein the dot pattern generation unit does not switch a generation order of the dot patterns of respective colors between the forward path scanning and the rearward path scanning.

4. The image processing apparatus according to claim 1, wherein the constraint information generation unit generates the constraint information in such a way as to differentiate the constraint applied to the dots of different colors between forward path scanning and rearward path scanning.

5. The image processing apparatus according to claim 4, wherein the constraint information generation unit generates the constraint information in such a way as to make the constraint applied to the dots of different colors in the rearward path scanning stronger than the constraint applied to the dots of different colors in the forward path scanning.

6. The image processing apparatus according to claim 1, wherein the constraint information generation unit generates the constraint information based on a result obtained by performing filter processing on halftone image data by using a low-pass filter.

7. An image processing method for controlling a formation of dots in a recording element configured to perform scanning on a sheet-like recording medium to individually form dots of different colors on a surface of the recording medium, the image processing method comprising:
   generating constraint information indicating a constraint for preventing the dots of at least two of the different colors from being positioned mutually close individually for each color;
   performing N-valuing processing (N is an integer equal to or greater than 2) on input image data, based on the generated constraint information, to generate a dot pattern individually for each color for forming an image based on the image data on the surface of the recording medium; and
   generating the constraint information in such a way as to make the constraint applied to a same scanning operation performed by the recording element stronger than the constraint applied to mutually adjacent scanning operations performed by the recording element.

8. A non-transitory computer-readable storage medium storing a computer program having computer-executable instructions for causing a computer to execute the image processing method according to claim 7.

* * * * *